United States Patent [19]

Mauney et al.

[11] Patent Number: 5,734,713
[45] Date of Patent: Mar. 31, 1998

[54] METHOD AND SYSTEM FOR REMOTE TELEPHONE CALIBRATION

[75] Inventors: Daniel Wayne Mauney, La Jolla, Calif.; David Thomas Roach, Austin, Tex.; Medford Alan Dyer; Kenneth Scott Swinson, both of San Diego, Calif.; Joseph Edward Talbot, Helendale, Calif.

[73] Assignee: Jabra Corporation, San Diego, Calif.

[21] Appl. No.: 593,953

[22] Filed: Jan. 30, 1996

[51] Int. Cl.[6] .......................... H04M 1/24; H04M 11/00
[52] U.S. Cl. .......................... 379/395; 379/6; 379/387; 379/390; 379/404
[58] Field of Search .......................... 379/395, 3, 6, 379/387, 74, 389, 390, 404, 420, 95, 102

[56] References Cited

U.S. PATENT DOCUMENTS

| | | | |
|---|---|---|---|
| 3,637,954 | 1/1972 | Anderson et al. | 179/175.31 E |
| 4,071,704 | 1/1978 | Moed | 179/15 BF |
| 4,180,709 | 12/1979 | Cosgrove et al. | 179/2 AM |
| 4,273,970 | 6/1981 | Favin et al. | 179/175.3 R |
| 4,788,708 | 11/1988 | Hendrix | 379/6 |
| 4,807,274 | 2/1989 | Kousa | 379/6 |
| 4,862,492 | 8/1989 | Zwick | 379/6 |
| 4,879,738 | 11/1989 | Petro | 379/3 |
| 4,887,288 | 12/1989 | Erving | 379/6 |
| 4,937,850 | 6/1990 | Borbas et al. | 379/6 |
| 5,073,919 | 12/1991 | Hagensick | 379/29 |
| 5,226,086 | 7/1993 | Platt | 381/8 |

*Primary Examiner*—Harry S. Hong
*Assistant Examiner*—Jacques M. Saint-Surin
*Attorney, Agent, or Firm*—Lloyd W. Sadler

[57] ABSTRACT

A method and system for remotely calibrating a headset telephone with a reliable, accurate and easy to use user interface is provided. This method makes use of the remote programmability of advanced telephone headsets and DTMF signal encoding and permits the customer-user to instigate the calibration procedure with an ordinary telephone call. The invention provides the means by which the optimum settings can be transmitted to the headset, loaded and stored in the headset, thereby improving the audio quality of telephone headsets by providing adjustment steps for such audio qualities as microphone gain (transmit level), speaker gain, background noise and echo cancellation, filter functions and diagnostics. This method also provides audio feedback to a customer service representative performing the calibration to insure that the commands and adjustments were properly received. It also incorporates a remote override and storage process, as well as a security gateway to ensure that only authorized changes are made in the programming of the headset. This invention contemplates the audio problems inherent in advanced telephone headsets and provides a user-friendly, reliable and programmable solution.

1 Claim, 7 Drawing Sheets

5,734,713

METHOD AND SYSTEM FOR REMOTE TELEPHONE CALIBRATION

BACKGROUND OF THE INVENTION

1. Field of the Invention

This invention relates to the calibration and adjustment of signal levels and noise removal in telephone equipment. More specifically, this invention relates to a method of adjusting microphone signal level, speaker volume, noise and echo cancellation and to do so remotely over the telephone lines. This invention is particularly adapted to the unique requirements of hands-free telephone headsets, in that it is designed to adapt to different ambient noise environments. This invention provides an accurate user-friendly means for calibrating hands-free telephone headsets to operate properly with most telephone base units.

2. Description of Related Art

Various approaches are currently used to adjust headsets to be used with telephone base units. Typically, multi-position switches are provided for the user to set into different positions depending on the type of telephone base unit with which the headset is being used. A list of telephones cross referenced to switch positions may be provided. These approaches range from having six switch positions to over sixteen switch positions.

Other approaches employ special purpose electronics which are connected directly to the headset and are generally used to test the headset rather than calibrate it to a particular telephone base unit.

For general background material, the reader is directed to U.S. Pat. Nos. 3,637,954, 4,071,704, 4,180,709, 4,273,970, 4,788,708, 4,807,274, 4,879,738, 4,937,850, 4,862,492, 4,887,288, 5,073,919, and 5,226,086 each of which is hereby incorporated by reference in its entirety for the material disclosed therein.

SUMMARY OF THE INVENTION

It is desirable to provide a system for the calibration of telephone headsets, adapting said headsets to telephone base units, and to do so with an easy to activate remote procedure which communicates over the telephone lines to ensure an improved signal quality for the headset user.

It is the general objective of this invention to properly calibrate telephone headsets for use with most telephone base units.

It is a further objective of this invention to provide a method of calibrating telephone headsets remotely over the telephone lines.

It is a further objective of this invention to provide a telephone headset calibration method that includes the capability of adjusting the headset microphone signal level.

It is a further objective of this invention to provide a remote telephone calibration method that includes the capability of adjusting the transmit level of the telephone headset.

It is a further objective of this invention to provide a remote telephone calibration method that can customize the telephone headset such that it adapts to an individual user's preferences and to an individual user's environment.

It is a further objective of this invention to provide a remote telephone calibration method that is capable of adjusting noise cancellation and can be adaptable to different ambient noise environments.

It is a further objective of this invention to provide a remote telephone headset calibration method capable of fine tuning echo cancellation.

It is a further objective of this invention to provide a remote telephone calibration method that is accomplished easily and without any technical intervention by the user.

These and other objectives of this invention are achieved by a method comprising the steps of: the user calling the support center using the telephone headset, activating the headset, placing the headset in programming mode, setting the headset transmit level, fine tuning the headset to eliminate the "echo", setting noise cancellation level, adjusting the frequency response, setting speaker gain, and storing the settings in the headset.

In a preferred embodiment, the method of this invention is accomplished with the aid of software programmed and stored in the headset circuitry. Also, in this preferred embodiment, the invention operates on a Jabra 1000 telephone headset with Earphone attachment. For the purposes of this disclosure, the Jabra 1000 telephone headset with Earphone attachment will be simply referred to as the Jabra 1000.

DETAILED DESCRIPTION OF THE INVENTION

Figure 1:
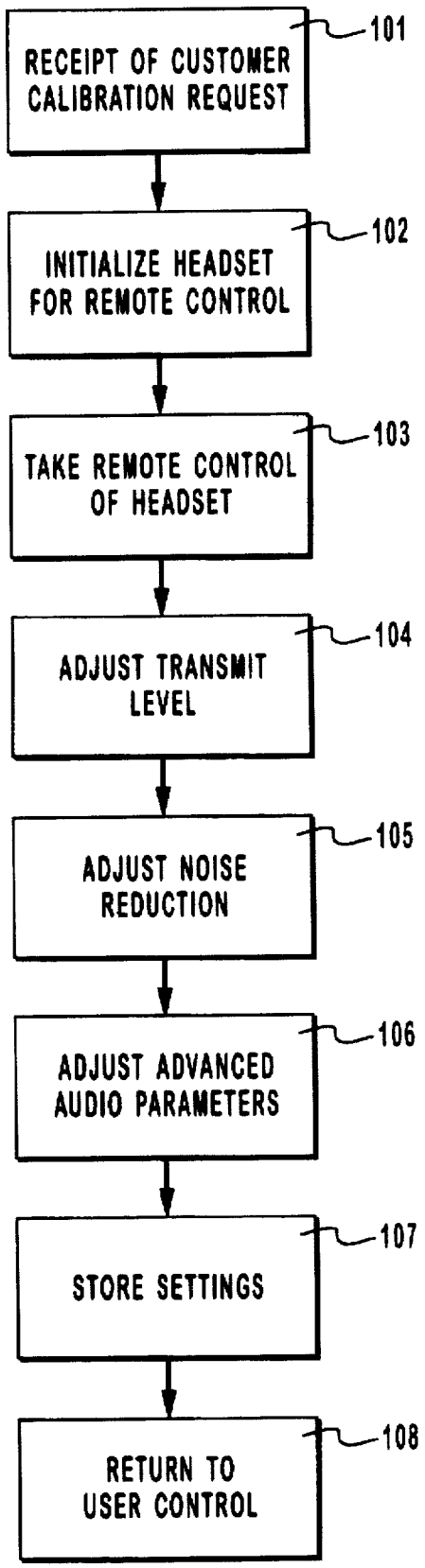
FIG. 1 is a flow diagram showing the top level steps of one preferred embodiment of the method of the invention.

FIG. 1 depicts the top level steps of the preferred embodiment of the invention. The first step of the method 101 is the receipt of a customer calibration request. In the preferred embodiment of the invention, this step is initiated by a customer telephone call to customer service. While the customer service function may be handled by automated equipment, the current best mode involves a human customer service representative. Once the customer has contacted customer service the customer is instructed to use the headset (in the preferred embodiment a Jabra 1000). Once the customer calibration request is received 101, the customer's headset is initialized for remote control 102. In this way the headset is set for control by the customer service representative, remotely over the telephone lines. Next, customer service takes remote control of the headset 103. Once customer service has control of the headset calibration can begin.

A telephone headset has many adjustable audio qualities. This invention provides a process of making these adjustments in a simple reliable remote manner. Many telephone headsets will require some but not all of the possible adjustments or calibrations. This process therefore does not require that every quality or parameter be calibrated, rather customer service is provided the means for directly calibrating each quality or parameter without interfering with qualities or parameters that do not require calibration.

Step 104 provides the capability to adjust the transmission level of the headset. The transmission level involves the audio received from the customer via a microphone in the headset. Adjustment of transmission level 104 provides the appropriate volume to the receiver of a telephone call initiated by a headset telephone user.

Adjustment of noise reduction 105 involves the compensation for background noise. An objective of a well calibrated headset is the cancellation of background noise without deteriorating the quality of the user's voice.

A variety of audio parameters are adjustable in the adjustment of advanced audio parameters step 106. In the preferred mode of this invention these audio parameters include such audio qualities as: signal attenuation, speaker gain, echo, microphone circuit adjustments, speaker circuit adjustments, and audio filter control. In the preferred embodiment these qualities are adjusted by the transmission of parameter codes and preset variables to the control software operating within the headset electronics.

After the completion of calibration of the headset, the process of the invention provides for storing of the settings and parameters 107 in the headset memory circuitry. This storage of the settings and parameters 107 insures that the headset maintains the values and adjustments for the user after the user regains control of the headset.

The return to user control step 108 ends the calibration of the headset, permitting the user to employ the headset in normal telephone communications.

Figure 2:
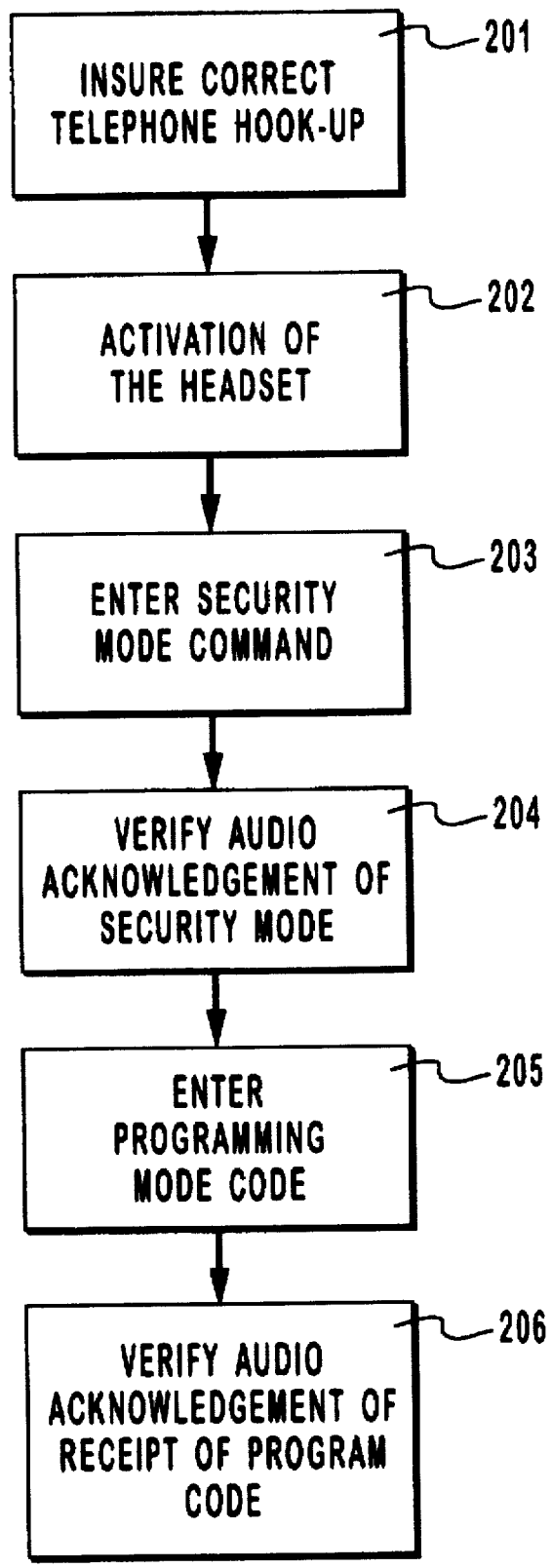
FIG. 2 is a more detailed flow diagram of the initial steps of one preferred embodiment of the invention.

FIG. 2 provides a more detailed view of the initialize headset for remote control 102 and the take control of headset step 103. Before the headset can be calibrated customer service must work with the customer to insure that the headset is correctly hooked up to the telephone base unit 201. In the preferred embodiment of this invention, using the Jabra 1000, the procedure for hooking up the headset is designated by icons on the base of the unit that show where each cord should be connected.

Once this is accomplished, customer service asks the customer to activate the headset 202. This is done in the preferred embodiment, using the Jabra 1000, by pressing on a button on the base of the headset unit. At this point, the customer puts on the Earphone and waits for approximately 45 seconds. During this, approximately 45 second, time period customer service should be able to take control of the headset 103, set the transmit level 104, enter a preset value using the adjust advanced audio parameters step 106 and to converse with the customer through the preferred Jabra 1000.

Taking control of the headset 103 in the preferred Jabra 1000 involves passing through a security mode and into the programming modes. The security mode consists to insure that inadvertent or unauthorized programming of the headset does not occur. In the preferred use of the Jabra 1000, the security mode is entered by pressing a button or combination of buttons on the control keyboard 301 to effect the entering of the security mode command 203. Once the security mode is accessed a short "machine gun" sound is produced 204 to inform customer service that the Jabra 1000 is now in security mode. An alternative means of entering security mode 203 is through a manual override, permitting the customer-user to activate security mode. Manual override is accomplished by having the customer rapidly press the activation button on the base of the Jabra 1000 a predefined number of times. An alternative method of entering manual override is by depressing the activation button a predetermined period of time. When manual override is successfully completed the "machine gun" sound is produced 203 to inform customer service that the Jabra 1000 is now in security mode. At this time, the customer will hear the Jabra 1000 vocalize "Jabra."

Once the "machine gun" sound 203 has been heard customer service enters a programming mode code 205 after which a "pink" noise, a broadband waterfall like sound, is produced 206 to inform customer service that the Jabra 1000 has entered the programming modes.

Figure 3:
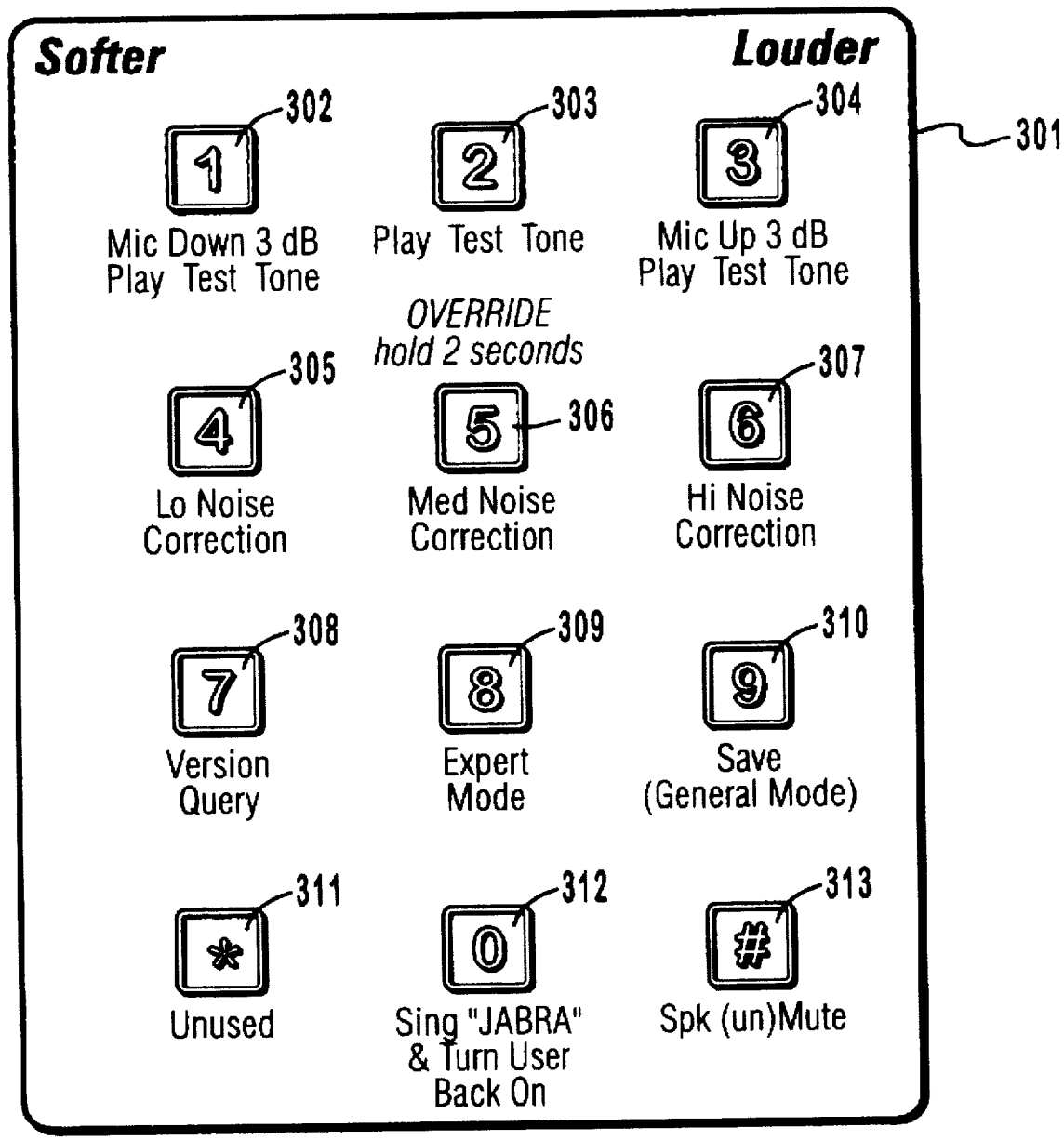
FIG. 3 is a diagram of the control keyboard used in the method of one preferred embodiment of the invention.

The programming modes consist of the general mode and the expert mode. The general mode is where the transmit levels 104 and noise cancellation levels 105 are set. The Jabra 1000, when first installed, starts up in the general mode. It will not work until it is programmed. FIG. 3 shows the control keyboard 301 used in the programming modes. The keyboard 301 is configured in a manner similar to that of a touch-tone telephone, with twelve buttons, designated 1 (302), 2 (303), 3 (304), 4 (305), 5 (306), 6 (307), 7 (308), 8 (309), 9 (310), * (311), 0 (312), and # (313). The 1 (302), 2 (303) and 3 (304) keys are used to set the transmit level. Specifically, the 1 (302) key turns the transmit level down 3 dB and causes a burst of a test tone to be played. The 2 (303) key plays a burst of a test tone at the current transmit level. The 3 (304) key turns up the transmit level 3 dB and plays a burst of a test tone. These transmit level adjustments 104 change the volume of the audio produced by the customer-user through the headset to the outside telephone connection. The burst of test tone, in the preferred embodiment sounds similar to a waterfall and will last approximately 1 or 2 seconds. If the transmit level has been adjusted to its limits, either high or low, a "machine gun" sound is produced to inform customer service that the transmit level cannot be lowered or raised respectively.

Noise cancellation level 105 is also set in the general mode. This is accomplished using the second row of keys on the control keyboard 301. Specifically, 4 (305), 5 (306), and 6 (307). Pressing the 4 (305) key sets the Jabra 1000 for the lowest amount of noise cancellation. The Jabra 1000 will play back two low frequency beeps to indicate reception of the 4 (305) key. Pressing the 5 (306) key sets the Jabra 1000 for a medium amount of noise cancellation. The Jabra 1000 will play back two medium frequency beeps to indicate reception of the 5 (306) key. Entering a 6 (307) sets the Jabra 1000 to high amount of noise cancellation. The Jabra 1000 will play back two high frequency beeps to indicate reception of the 6 (307) key.

Pressing a 0 (312) key from the general mode will return the Jabra 1000 to user control. After pressing a 0 (312) the word Jabra is vocalized.

Pressing a 7 (308) key queries the Jabra 1000 for a version number. The version number is returned as DTMF tones.

Pressing a 8 (309) key will transfer from the general mode to the expert mode.

Pressing a 9 (310) key from the general mode saves the current settings or adjustments.

Pressing the # (313) key toggles a speaker mute. A low beep sound is produced to indicate that the speaker is muted. A high beep sound is produced to indicate that the speaker is not muted.

The * (311) key is not used in the current embodiment of the invention.

Figure 4:
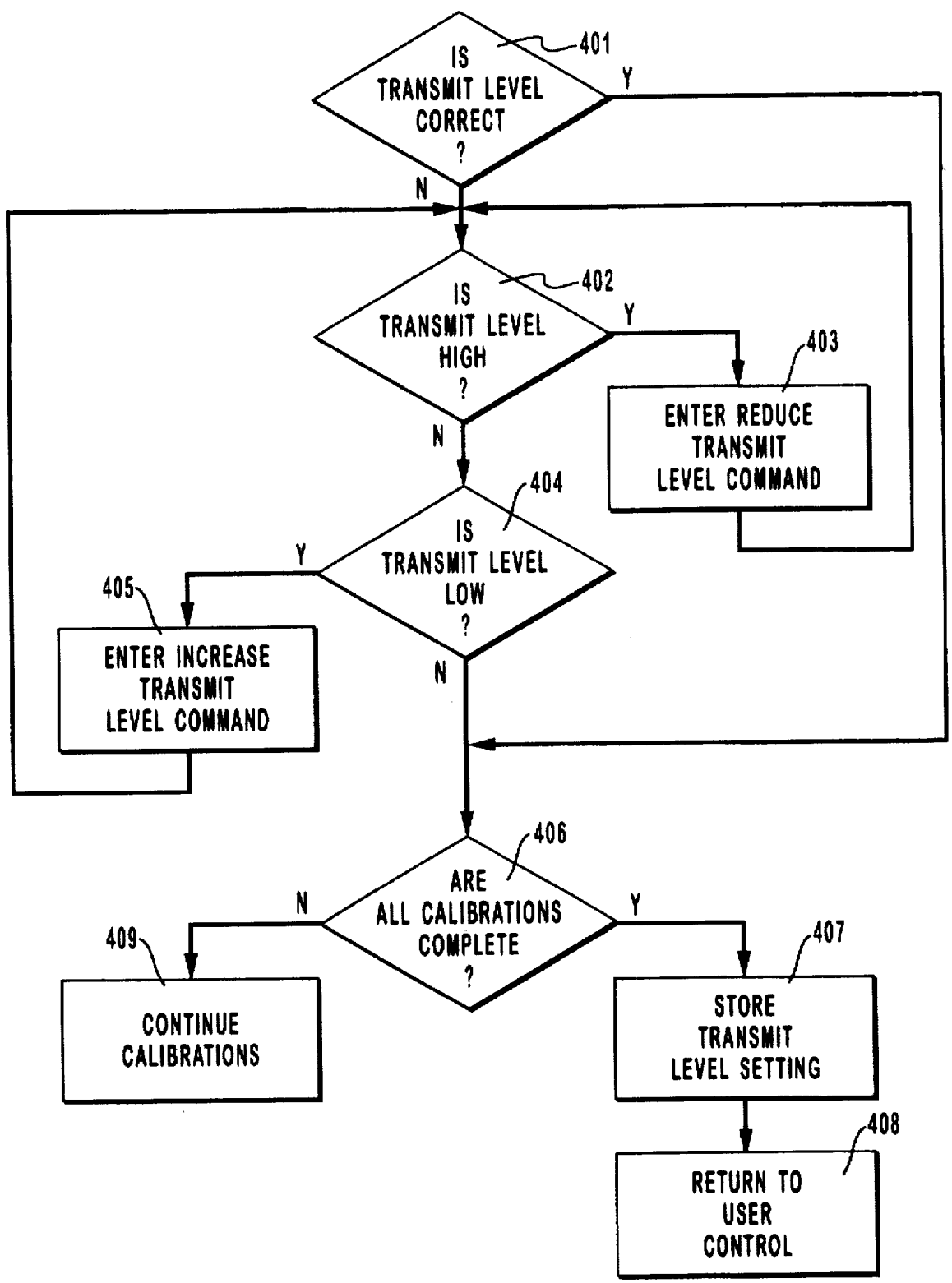
FIG. 4 is a detailed flow diagram of the adjustment of transmit level step of one preferred embodiment of the process steps of the invention.

FIG. 4 provides a detailed flow diagram of the process steps of adjusting the transmit level 104. A test of the transmit level is performed to determine if the level sounds correct 401. For the preferred Jabra 1000, the transmit level test is accomplished by pressing the 2 (303) key on the control keyboard 301. If the transmit level sounds correct the transmit level adjustment step is otherwise skipped, that is the process jumps to checking whether all calibrations are complete 406. If the transmit level is not correct, and therefore requires adjustments, a determination of whether the transmit level is high 402, and if not whether the transmit level is low 404 is performed. If the transmit level is too high, then the reduce transmit level command is entered 403. In the preferred embodiment using the Jabra 1000 is used, the reduce transmit level command is entered by pressing the 1 (302) key on the control keyboard 301. If the transmit level is too low, then the increase transmit level command is entered 405. The increase transmit level command, for the Jabra 1000 is the 3 (304) key. After either increasing 405 or reducing 403 the transmit level, it is again tested to determine whether the transmit level is high 402 or low 404. Once the transmit level is correct, a check as to whether all calibrations are complete 406 is performed. If all calibrations are complete the transmit level settings are stored 407 and control of the headset is returned to the customer-user 408. Storing of the settings 407 is accomplished with the Jabra 1000 by pressing the 9 (310) key of the control keyboard 301. Return to user control is accomplished by the pressing of the 0 (312) key of the control keyboard 301.

Figure 5:
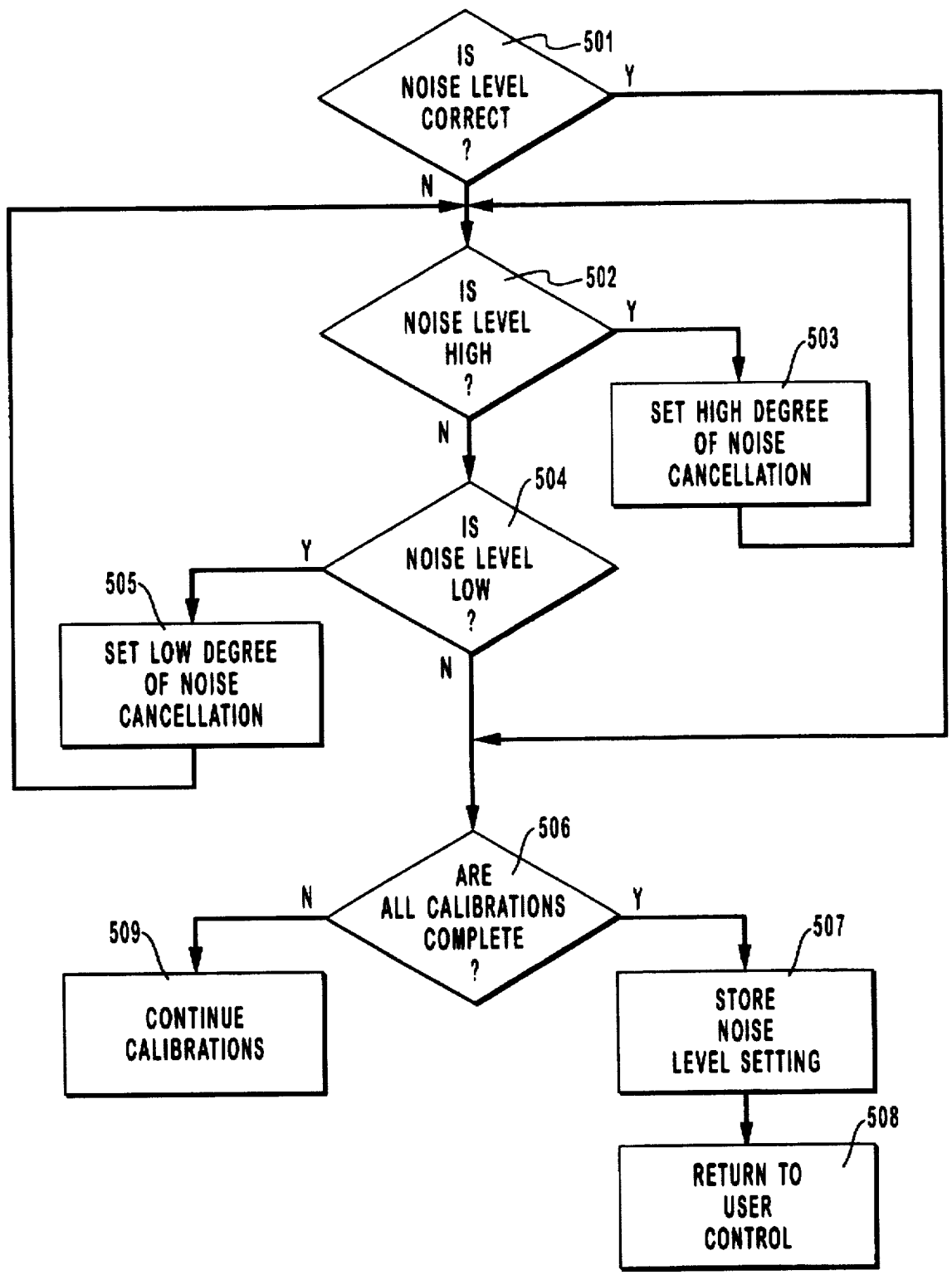
FIG. 5 is a detailed flow diagram of the adjustment of noise level step of one preferred embodiment of the process steps of the invention.

FIG. 5 provides a detailed flow diagram of the process steps of adjusting the noise cancellation level 105. A test of the noise level is performed to determine if the level sounds correct 501. If the noise level sounds correct the noise level adjustment step is otherwise skipped, that is the process jumps to checking whether all calibrations are complete 506. If the noise level is not correct, and therefore requires adjustments, a determination of whether the noise level is high 502, and if not whether the noise level is low 504 is performed. If the noise level is too high, then a high degree of noise cancelation command is entered 503. In the preferred embodiment using the Jabra 1000, the reduce noise level command is entered by pressing the 6 (307) key on the control keyboard 301. If the noise level is low, then a low degre of noise canelation command is entered 505. The high noise cancelation command, for the Jabra 1000 is the 6 (307) key. The low noise cancelation command, for the Jabra 1000 is the 4 (305) key. After either increasing 505 or reducing 503 the noise cancelation level, it is again tested to determine whether the noise level is now high 502 or low 504. Once the noise level is correct, a check as to whether all calibrations are complete 506 is performed. If all calibrations are complete the noise level settings are stored 507 and control of the headset is returned to the customer-user 508. Storing of the settings 507 is accomplished with the Jabra 1000 by pressing the 9 (310) key of the control keyboard 301. Return to user control is accomplished by the pressing of the 0 (312) key of the control keyboard 301.

Figure 6:
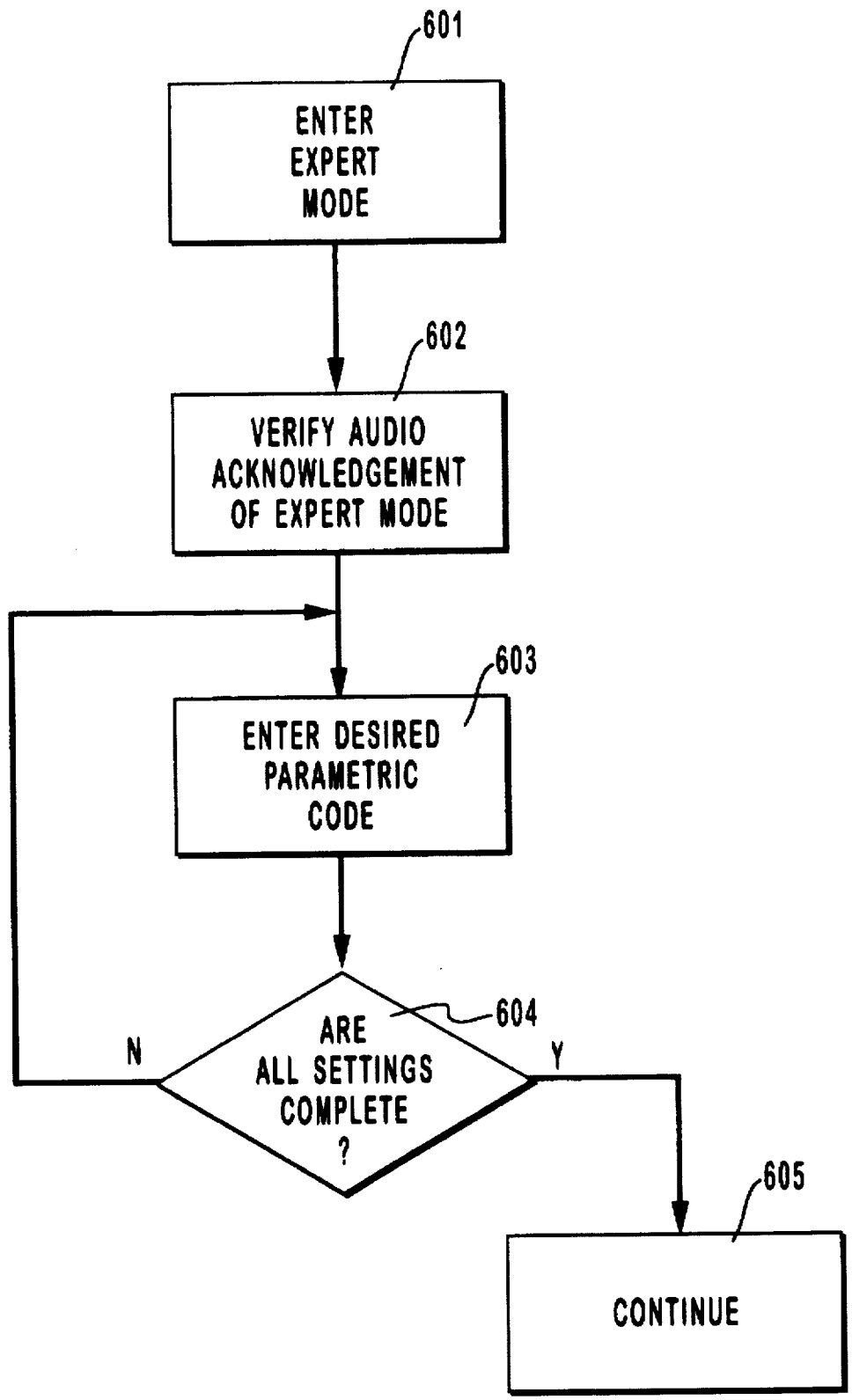
FIG. 6 is a detailed flow diagram of the adjustment of advanced audio parameters of one preferred embodiment of the invention.

FIG. 6 provides a more detailed flow diagram of the adjustment of advanced parameters 106 step of the invention. The calibration process in this invention includes the capability to adjust a wide variety of specific advanced audio processing parameters in the headset. The defined list of these parameters will naturally depend on the headset being calibrated and on the programmability of the headset. The preferred embodiment of the invention in its current best mode of operation works with the Jabra 1000. Therefore, the advanced audio processing parameters the invention is capable of calibrating in the Jabra 1000 include: sample rate, noise cancellation, speaker gain adjustments, echo adjustments, filter adjustments and filter functions, attenuation adjustments, as well as diagnostics and write to memory functions.

Before any parametric calibrations may be done the headphone must be placed in expert mode 601. Expert mode is accessed by pressing the 8 (309) key on the control keyboard 301. An audio acknowledgement of entering expert mode is produced 602. In the Jabra 1000, this audio acknowledgement is a burst of audio tones. Once in the expert mode preprogrammed microcoded routines may be initiated, functions may be activated, and variable thresholds may be set. Each by entering the desired parametric code 603 as a numeric sequence. In the current best mode of the invention, these numeric sequences consist of three or four numbers. When entering the numeric sequences, in the expert mode, a low frequency acceptance tone is given after each number. A slightly higher tone is generated after the last number in the sequence is accepted. At that point, a decision is made to determine if all desired parametric calibrations have been completed 604. If additional calibrations are necessary, they may be entered. If all calibrations are completed the process continues 604 to the storage step 107.

The storage of the settings 107 is accomplished in preferred embodiment of the invention by entering a 999 or 998 code sequence from the expert mode. Audio tones are generated informing customer service that the settings have been stored into memory.

Hitting the 0 (312) key three times producing a 000 code exits the expert mode, plays a "pink" noise, and returns the headset to general mode, entering a final 0 (312) key returns the headset to user control 108. At this point the user may use the calibrated headset in normal telephone communications.

Figure 7:
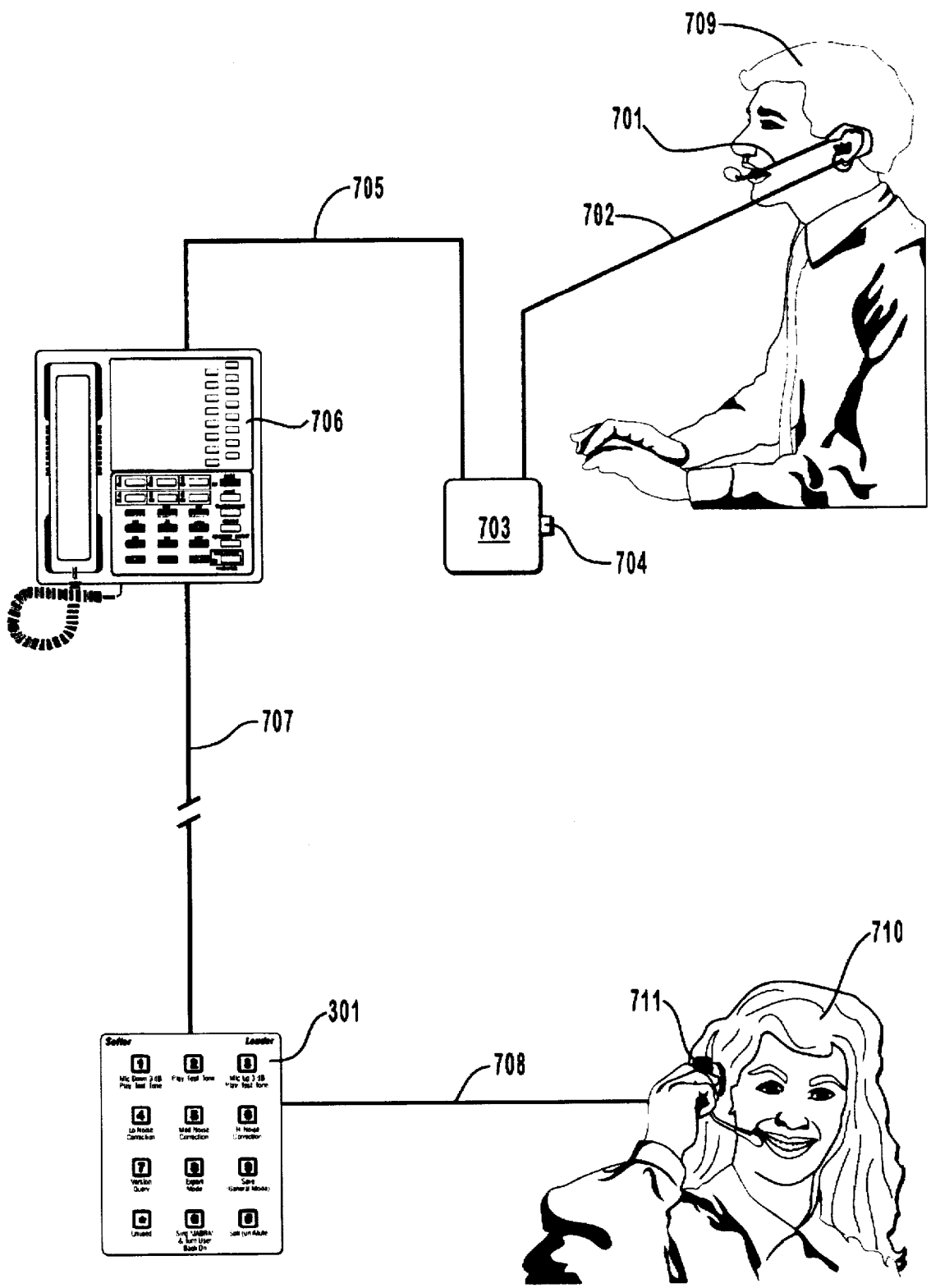
FIG. 7 is a depiction of the remote telephone calibration system showing the components used in a preferred embodiment of the method of the invention.

FIG. 7 shows a drawing of the system in which the invention operates. A customer-user 709 is wearing a headphone 701. The headphone 701 is electrically connected with insulated conductors 702 to a base unit 703. The base unit 703 has an activation button 704 which the customer-user presses to initialize the headset 102. The base unit 703 is electrically connected by standard telephone conductors 705 to a standard telephone unit 706. Once the customer calibration request 101 telephone call is made to customer service, this standard telephone unit 706 is connected through the telephone communication system 707 to a control keyboard 301. The control keyboard 301 is electrically connected, through standard telephone conductors 708, to a telephone receiver or telephone headset 711 to a customer service representative 710. This customer service representative 710 employs the capabilities of the control keyboard 301 and the circuitry and programs inherent in the headphone base unit 703 to perform the steps of this calibration invention. Note please that in alternative embodiments of the invention the customer service representative 710 may be replaced by full automated test equipment and the headphone base unit 703 may become directly incorporated in the headphone 701 itself or in the standard telephone unit 706. Also, alternative embodiments of the control keyboard 301 device may be achieved by programmable automatic test equipment.

In the preferred embodiment, the method of the invention is performed on a Jabra 1000 that has a base unit with the necessary calibration and programmability capabilities to make full use of the steps of the invention. However, it is possible to implement the invention on various other headphone hardware configurations, though naturally the specific functions and commands transmitted during the steps of the invention would differ. The current best mode of the invention relies on the operation of software programmed into the Jabra 1000 base unit. The Software Appendix which is included as a part of the disclosure of this patent application shows in detail how the functional steps described above are performed once the commands are received by the Jabra 1000.

The following software source code is provide as this software is the embodiment of the current best mode of much of the method of this invention. For this invention to perform in the current best mode, the following software source code listing is compiled and stored in the Jabra 1000 base unit.

However, it is possible to implement the invention on
various other headphone hardware configurations, though
naturally the specific functions and commands transmitted
during the steps of the invention would differ. The current
best mode of the invention relies on the operation of
software programmed into the Jabra 1000 base unit. The
Software Appendix which is included as a part of the
disclosure of this patent application shows in detail how
the functional steps described above are performed once the
commands are received by the Jabra 1000.

The following software source code is provide as
this software is the embodiment of the current best mode of
much of the method of this invention. For this invention to
perform in the current best mode, the following software
source code listing is compiled and stored in the Jabra 1000
base unit.

```
/*************************************************************
************/
/* Module: rwr2.c            */
/*                           */
/* routines    to write to   Atmel Flash*/
/*                           */
/* Rev 1.0     10 Feb 1995   DTR*/
/*                           */
/*************************************************************
************/ include    <math.h>
include    "globals.h"
#include    "dtmf.h"

#define         PageSize    128

Pragma_Sect_text
```

```
Error RewriteParams(Boolean    dtmfAtStartup)
{
        short     pageArray[PageSize];
        short *   p;
        Error     err;

err  = noErr;

p = &pageArray[0];

/* NumberOfBurns    */
        if (0xFF ==    FetchWordInRom((short
*)&PromParams)) {
                *p++ = 1; /* we do this in case the rom gets
written to all FF's */
        }
        else {
                *p++ = 1 + FetchWordInRom((short
*)&PromParams);      /* add one */
        }

/* DtmfAtStartup    */
        *p++ = (short)dtmfAtStartup;

/* J1kMode          */
        *p++ = (short)commonOperatingMode;

/* DcaPolarity      */
        *p++ = (short)((DcadB2dB(commonDcaLevel) >=0) ? 1
: 0);

/* DcaLevel         */
```

```
            *p++ = (short)((DcadB2dB(commonDcaLevel) >=0) ?
DcadB2dB(commonDcaLevel) :    -DcadB2dB(commonDcaLevel));

/* MicAttn           */
            *p++ = (short)commonMicAttn* 3;/* convert to dB
before    storing   */

/* SpkAttn           */
            *p++ = (short)commonSpkAttn* 3;/* convert to dB
before    storing   */

/* romDtmfGainPre    */
            *p++ = (short)commonDtmfGainPre;

/* romSpkGainPre     */
            *p++ = (short)commonSpkGainPre;

/* romSpkGainPost    */
            *p++ = (short)commonSpkGainPost;

/* overrideEnable    */
            *p++ = (short)commonOverrideEnable;

/* overrideThreshold*/
            *p++ =
(short)HexdB2absdB((HexdB)commonOverrideThreshold);

/* MicMeterRiseTime */
            *p++ =
(short)HexdB2absdB((HexdB)mic.mtr.riseTime);

/* MicMeterFallTime */
```

```
1              *p++ =
2     (short)HexdB2absdB((HexdB)mic.mtr.fallTime);
3
4              /* other required codes saved here */
5
6              while (p < &pageArray[PageSize]) {
7                   *p++ = 0; /* filloutremainder of page */
8              }
9
10             if (err    = WritePageToAtmel(&pageArray[0], (short
11    *)&PromParams)) {
12                  err  = atmelTimeOut;/* timeout error detected
13    */
14             }
15
16             if (False == CompareRomToRam( &pageArray[0],
17    (short    *)&PromParams, PageSize)) {
18                  err  = atmelBadCompare;/* copydidn't match */
19             }
20
21             return err;
22    }
23    /*************************************************************
24    ************/
25    /* Module: rewrite.c         */
26    /*                           */
27    /* routines to write to Atmel Flash*/
28    /*                           */
29    /* Rev 1.0    10 Feb 1995    DTR*/
30    /*          Initial revision.   */
31    /*                           */
32    /*************************************************************
33    ************/
34
```

```
1    #include   "globals.h"
2    #include   "dtmf.h"
3
4    #define          PageSize   128
5
6               Pragma_Sect_text
7
8    short      DetermineATT(short SCL)
9    {
10              switch(SCL) {
11                   case 0x0001:
12                        return(0);/* -0 dB */
13
14                   case 0x0002:
15                        return(1);/* -6 dB */
16
17                   case 0x0004:
18                        return(2);/* -12 dB */
19
20                   case 0x0008:
21                        return(3);/* -18 dB */
22
23                   case 0x0010:
24                        return(4);/* -24 dB */
25
26                   case 0x0020:
27                        return(5);/* -30 dB */
28
29                   case 0x0040:
30                        return(6);/* -36 dB */
31
32                   case 0x0080:
33                        return(7);/* -42 dB */
34
```

```
                default:
                        return(0);/* 0 dB */
                }
        }

Boolean CompareRomToRam( short *ramWhere, short * romWhere,
short size)
{
        short i;

while (size--) {
                if ( (0x00FF & *ramWhere) == (0x00FF &
FetchWordInRom(romWhere)) ) {
                        ramWhere++;
                        romWhere++;
                }
                else {
                        return(False);
                }
        }
        return(True);
}

Pragma_Sect_text

Error WriteDefaultsToProm(void)
{
        short   pageArray[PageSize];
        short   i;
        Error   err;

err = noErr;

/* copy defaults into RAM */
```

```
        for (i=0;i<PageSize;i++) {
                pageArray[i] = FetchWordInRom((short
*)&PromParams + i);    /* fill in page */
        } if (err = WritePageToAtmel(&pageArray[0], (short
*)&Defaults)) {
                err = atmelTimeOut;/* timeout error detected
*/
        }
        if (False == CompareRomToRam( &pageArray[0],
(short *)&Defaults, PageSize)) {
                err = atmelBadCompare;/* copy didn't match */
        } return err;
}

Error RestoreDefaultsFromProm(void)
{
        short   pageArray[PageSize];
        short   i;
        Error   err;

err = noErr;

i = FetchWordInRom((short *)&Defaults + 2);
        if (i > 2 || i <= 0)
            return;

/* copy defaults into RAM */
        for (i=0;i<PageSize;i++) {
                pageArray[i] = FetchWordInRom((short
*)&Defaults + i);      /* fill in page */
```

```
            }

/* don't reset the number of times the prom has
been burned */
            pageArray[0] = 1 + FetchWordInRom((short
*)&NumberOfBurns);

/* store defaults to PROM */
            if (err = WritePageToAtmel(&pageArray[0], (short
*)&PromParams)) {
                    err = atmelTimeOut;/* timeout error detected
*/
            }

/* verify write to PROM */
            if (False == CompareRomToRam( &pageArray[0],
(short *)&PromParams, PageSize)) {
                    err = atmelBadCompare;/* copy didn't match */
            } return err;
    }

Error   PokeRomByte(ushort * pokeAddress,ushort pokeValue)
    {
            ushort          pageArray[PageSize];
            ushort          i;
            ushort *  pageStart;
            ushort          pageIndex;
            Error      err;

err = noErr;

```

```
1              pageStart = (ushort *)(0xFF80 &
2     (ushort)pokeAddress);    /* mask out low seven bits, point
3     to start of writable page */
4              pageIndex = (ushort)pokeAddress -
5     (ushort)pageStart;  /* calculate the desired index into the
6     page */
7
8              /* copy defaults into RAM */
9              for (i=0;i<PageSize;i++) {
10                     pageArray[i] = FetchWordInRom((short
11    *)pageStart + i);        /* copy in what was already there
12    */
13             }
14
15             /* factor in our one new byte */
16             pageArray[pageIndex] = pokeValue;
17
18             /* store defaults to PROM */
19             if (err = WritePageToAtmel((short *)&pageArray[0],
20    (short *)pageStart)) {
21                     err = atmelTimeOut;/* timeout error detected
22    */
23             }
24
25             /* verify write to PROM */
26             if (False == CompareRomToRam((short
27    *)&pageArray[0], (short *)&PromParams, PageSize)) {
28                     err = atmelBadCompare;/* copy didn't match */
29             }
30
31             return err;
32    }
33
```

```
1    /*************************************************
2    ************/
3    /* Module:     remote4.c      */
4    /* Examples of                */
5    /* Remote control for 4-key sequences*/
6    /*                            */
7    /*************************************************
8    ************/
9
10   #ifdef Copyrights
11   static char copyrightNotice[] = "Copyright (c)1994, 1995,
12   JABRA Corporation";
13   #endif /* Copyrights */
14
15   #include "Globals.h"
16   #include "Dtmf.h"
17
18
19           Pragma_Sect_text
20
21   void Process4CharCodes(void)
22   {
23           switch (dtmfHistory[thirdMostRecent]) {
24                   case Three:
25                           switch (dtmfHistory[secondMostRecent]) {
26                                   /* 34xx: INITSTR */
27                                   case Four:
28                                           commonINITSTR = Last2Digits();
29                                           XmitHiBeep();
30                                           break;
31                                   /* 36xx: commonDTMICON */
32                                   case Six:
33                                           commonDTMICON =
34   Last2DigitsToHexdB();
```

```
                            XmitHiBeep();
                            break;
                    default:
                            XmitErrorTone();
                            break;
                }
                InitDtmfHistory();
                break;
        default:
                XmitErrorTone();
                InitDtmfHistory();
                break;
        }
}
/*************************************************************
************/
/* Module:    rmt3.c        */
/* Examples of             */
/* Remote control for 3-key sequences*/
/*                         */
/*************************************************************
************/ ifdef Copyrights
static char copyrightNotice[] = "Copyright (c)1994, JABRA
Corporation";
endif /* Copyrights */ include "Globals.h"
include "Dtmf.h"

void Process3CharCodes(void)
{
```

```
1                switch(dtmfHistory[secondMostRecent]) {
2                    case Zero:
3                        switch(dtmfHistory[mostRecent]) {
4                            case Zero:
5                                switch(dtmfHistory[current]) {
6                                /* 000: return control to
7   user*/
8                                case Zero:
9                                    remoteControlMode = Tuning;/*
10  return back to tuning mode */
11                                   XmitTestTone();
12                                   break;
13
14                               /* 001: set sample rate to 8k
15  */
16                               case One:
17                                   if (PIUMULTI ==
18  commonActelType) {
19                                   dynSampleRate = kHz8;
20                                   XmitHiBeep();
21                                   }
22                                   else {
23                                   XmitErrorTone();
24                                   }
25                                   break;
26
27                               /* 002: set sample rate to 10k
28  */
29                               case Two:
30                                   if (PIUMULTI ==
31  commonActelType) {
32                                   dynSampleRate = kHz10;
33                                   XmitHiBeep();
34                                   }
```

```
                            else {
                            XmitErrorTone();
                            }
                            break;

/* 003: set sample rate to 11k
   */
                            case Three:
                            if (PIUMULTI ==
   commonActelType) {
                            dynSampleRate = kHz11;
                            XmitHiBeep();
                            }
                            else {
                            XmitErrorTone();
                            }
                            break;

/* 004: set sample rate to 13k
   */
                            case Four:
                            if (PIUMULTI ==
   commonActelType) {
                            dynSampleRate = kHz13;
                            XmitHiBeep();
                            }
                            else {
                            XmitErrorTone();
                            }
                            break;
                            default:
                            XmitErrorTone();
                            break;
                            }
```

```
1                              InitDtmfHistory();
2                              break;
3                          }
4                      default:
5                          break;
6                      }
7                  break;
8
9              case One:
10                 switch(dtmfHistory[mostRecent]) {
11                     case Zero:
12                         switch(dtmfHistory[current]) {
13                         case Zero:
14                         break;
15                         default:
16                         break;
17                         }
18                     default:
19                         break;
20                     }
21                     break;
22             default:
23                 XmitErrorTone();
24                 InitDtmfHistory();
25                 break;
26         }
27 }
28
29 /*************************************************************
30 *************/
31 /* Module:    remote.c          */
32 /*                              */
33 /* Remote control DTMF decoding*/
34 /*                              */
```

```
1   /* Rev 1.0     21 Jan 1994    DTR*/
2   /*         Initial revision.   */
3   /*         Added ProcessMeterLEDs to Wait loop4-24-95Med*/
4   /*                              */
5   /*************************************************************
6   *************/
7
8   #ifdef Copyrights
9   static char copyrightNotice[] = "Copyright (c)1994, JABRA
10  Corporation";
11  #endif /* Copyrights */
12
13  #include "Globals.h"
14  #include "Dtmf.h"
15
16  #define HoldDuration    1500 /* number of milliseconds for
17  a long-duration hold rather than a 50 millisecond tap */
18
19          Pragma_Sect_text
20
21  void Wait(Time milliseconds)   /* up to about 8 secs @ 8k, 4
22  secs @ 16k */
23  {
24  #if !Sim  /* not much need for delays like this in the
25  simulator */
26          Time countdown;
27
28          countdown =
29  Msecs2Samples(milliseconds,commonSampleRate);
30
31          if (Zero == countdown)
32              return;
33
```

```
1    DelayLoop:                      /* this is like a mini
2    event-loop */
3               if (--countdown) {
4                    ProcessMeterLeds();
5                    ToggleWatchdog();
6                    Idle();
7                    goto DelayLoop;
8               }
9    #endif /* Sim */
10   }
11
12   #if UseForDebugging
13              Pragma_Sect_text2
14
15   void RomToggleWatchdog(void)
16       {       /* version of ToggleWatchdog compiled into ROM */
17               /* for use before Ram code is initialized */
18               actelShadow = (leds & ledOnMask) | (( ledOffMask &
19   actelShadow ) ^ 0x0001 );
20              SetActel(actelShadow);
21       }
22
23   void Delay(long milliseconds)
24       {
25              /* since Wait() only works if the interrupts are
26   turned on, */
27              /* Delay works if the interrupts are turned off */
28              long i;
29
30              RomToggleWatchdog();
31   #if !Sim
32              for (i=0;i<milliseconds;i++) {
33                   asm ("     rptz #20000");
34                   asm ("           nop");
```

```
1              }
2     #endif /* !Sim */
3     }
4
5     void LedCountdown(void)
6     {
7             leds = xxxx;
8             Delay(200);
9             leds = xxxo;
10            Delay(200);
11            leds = xxoo;
12            Delay(200);
13            leds = xooo;
14            Delay(200);
15            leds = oooo;
16            Delay(200);
17    }
18
19    void LedCountup(void)
20    {
21            leds = xxxx;
22            Delay(200);
23            leds = oxxx;
24            Delay(200);
25            leds = ooxx;
26            Delay(200);
27            leds = ooox;
28            Delay(200);
29            leds = oooo;
30            Delay(200);
31    }
32
33    void LedFlash(void)
34    {
```

```
1              leds = xxxx;
2              Delay(200);
3              leds = oxxo;
4              Delay(200);
5              leds = xoox;
6              Delay(200);
7              leds = oxxo;
8              Delay(200);
9              leds = oooo;
10             Delay(200);
11     }
12
13     void LedFlash1(void)
14     {
15             leds = oooo;
16             Delay(200);
17             leds = ooox;
18             Delay(200);
19             leds = oooo;
20             Delay(200);
21             leds = ooox;
22             Delay(200);
23             leds = oooo;
24             Delay(200);
25     }
26
27     void LedFlash2(void)
28     {
29             leds = oooo;
30             Delay(200);
31             leds = ooxx;
32             Delay(200);
33             leds = xxoo;
34             Delay(200);
```

```
1              leds = ooxx;
2              Delay(200);
3              leds = oooo;
4              Delay(200);
5       }
6       #endif /* UseForDebugging */
7
8       void XmitSetOfFour(void)
9       {
10             XmitHiBeep();
11             Wait(125);
12             XmitBeepTone();
13             Wait(125);
14             XmitBeepTone();
15             Wait(125);
16             XmitBeepTone();
17             Wait(125);
18      }
19
20             Pragma_Sect_text
21
22      void XmitVersionNumber(void)
23      {
24             ushort versionNum;
25
26             versionNum = FetchWordInRom((short
27      *)&VersionNumber);
28
29             Wait(100);
30             XmitDtmfTone((versionNum & 0xF000)>>12);
31             Wait(150);
32             XmitDtmfTone((versionNum & 0x0F00)>>8);
33             Wait(150);
34             XmitDtmfTone((versionNum & 0x00F0)>>4);
```

```
1               Wait(150);
2               XmitDtmfTone(versionNum & 0x000F);
3               Wait(150);
4       }
5
6       void XmitWordValue(ushort theWord)
7       {
8               ushort digit;
9
10              if (theWord >= 10000) {
11                      digit = theWord/10000;
12                      theWord -= digit * 10000;
13                      XmitDtmfTone(digit);
14              }
15              else {
16                      XmitDtmfTone(Zero);
17              }
18              Wait(150);
19              if (theWord >= 1000) {
20                      digit = theWord/1000;
21                      theWord -= digit * 1000;
22                      XmitDtmfTone(digit);
23              }
24              else {
25                      XmitDtmfTone(Zero);
26              }
27              Wait(150);
28              if (theWord >= 100) {
29                      digit = theWord/100;
30                      theWord -= digit * 100;
31                      XmitDtmfTone(digit);
32              }
33              else {
34                      XmitDtmfTone(Zero);
```

```
1               }
2               Wait(150);
3               if (theWord >= 10) {
4                       digit = theWord/10;
5                       theWord -= digit * 10;
6                       XmitDtmfTone(digit);
7               }
8               else {
9                       XmitDtmfTone(Zero);
10              }
11              Wait(150);
12              XmitDtmfTone(theWord);
13      }
14
15      void XmitDtmfWave(void)
16      {
17              Wait(50);
18              PlayMicSnd(&Dtmf1Start,&DtmfPoundEnd,0,
19      FetchWordInRom((short *)&pinkToneLevel));
20      }
21
22      void PlayDtmfWave(void)
23      {
24              Wait(50);
25              PlaySpkSnd(&Dtmf1Start,&DtmfPoundEnd,0,
26      FetchWordInRom((short *)&pinkToneLevel));
27      }
28
29              Pragma_Sect_text
30
31      void XmitPinkTone(void)
32      {
33              PlayMicSnd(&PinkToneStart,&PinkToneEnd,5,
34      FetchWordInRom((short *)&pinkToneLevel));
```

```
1      }
2
3      void XmitTestTone(void)
4      {
5
6      PlayMicSnd(testToneStart,testToneEnd,testToneLoops,testToneL
7      evel);
8      }
9
10     void XmitLoBeep(void)
11     {
12             PlayMicSnd(&Sine500Start,&Sine500End,13,
13     FetchWordInRom((short *)&sineToneLevel));
14     }
15
16     void XmitBeepTone(void)
17     {
18             PlayMicSnd(&Sine1kStart,&Sine1kEnd,26,
19     FetchWordInRom((short *)&sineToneLevel));
20     }
21
22     void XmitHiBeep(void)
23     {
24             PlayMicSnd(&Sine2kStart,&Sine2kEnd,52,
25     FetchWordInRom((short *)&sineToneLevel));
26     }
27
28     void PlayWaitingTone(void)
29     {
30             Wait(60);
31             PlaySpkSnd(&Sine1kStart,&Sine1kEnd,26, minus40dB);
32             Wait(600);
33             PlaySpkSnd(&Sine2kStart,&Sine2kEnd,52, minus40dB);
34             Wait(600);
```

```
1              PlaySpkSnd(&Sine1kStart,&Sine1kEnd,26, minus40dB);
2              Wait(600);
3              PlaySpkSnd(&Sine500Start,&Sine500End,13,
4      minus36dB);
5              Wait(600);
6              PlaySpkSnd(&Sine1kStart,&Sine1kEnd,26, minus40dB);
7              Wait(600);
8              PlaySpkSnd(&Sine2kStart,&Sine2kEnd,52, minus40dB);
9              Wait(580);
10             PlaySpkSnd(&Sine500Start,&Sine500End,13,
11     minus36dB);
12     }
13
14     void XmitExpertTone(void)
15     {
16             Wait(60);
17             PlayMicSnd(&Sine1kStart,&Sine1kEnd,26,
18     FetchWordInRom((short *)&sineToneLevel));
19             Wait(200);
20             PlayMicSnd(&Sine2kStart,&Sine2kEnd,52,
21     FetchWordInRom((short *)&sineToneLevel));
22             Wait(100);
23             PlayMicSnd(&Sine2kStart,&Sine2kEnd,52,
24     FetchWordInRom((short *)&sineToneLevel));
25             Wait(100);
26             PlayMicSnd(&Sine1kStart,&Sine1kEnd,26,
27     FetchWordInRom((short *)&sineToneLevel));
28     }
29
30     void PlayExpertTone(void)
31     {
32             Wait(60);
33             PlaySpkSnd(&Sine1kStart,&Sine1kEnd,26,
34     FetchWordInRom((short *)&sineToneLevel));
```

```
            Wait(200);
            PlaySpkSnd(&Sine2kStart,&Sine2kEnd,52,
FetchWordInRom((short *)&sineToneLevel));
            Wait(100);
            PlaySpkSnd(&Sine2kStart,&Sine2kEnd,52,
FetchWordInRom((short *)&sineToneLevel));
            Wait(100);
            PlaySpkSnd(&Sine1kStart,&Sine1kEnd,26,
FetchWordInRom((short *)&sineToneLevel));
} void XmitDtmfTone(DtmfState tone)
{
        if (Listenable == responseType) {
            XmitListenableNumber(tone);
        }
        else {
            switch(tone) { case Zero:
                PlayMicSnd(&Dtmf0Start,&Dtmf0End,0,
FetchWordInRom((short *)&pinkToneLevel));
                break;

case One:
                PlayMicSnd(&Dtmf1Start,&Dtmf1End,0,
FetchWordInRom((short *)&pinkToneLevel));
                break;

case Two:
                PlayMicSnd(&Dtmf2Start,&Dtmf2End,0,
FetchWordInRom((short *)&pinkToneLevel));
                break;
```

```
1                  case Three:
2                          PlayMicSnd(&Dtmf3Start,&Dtmf3End,0,
3       FetchWordInRom((short *)&pinkToneLevel));
4                          break;
5
6                  case Four:
7                          PlayMicSnd(&Dtmf4Start,&Dtmf4End,0,
8       FetchWordInRom((short *)&pinkToneLevel));
9                          break;
10
11                 case Five:
12                         PlayMicSnd(&Dtmf5Start,&Dtmf5End,0,
13      FetchWordInRom((short *)&pinkToneLevel));
14                         break;
15
16                 case Six:
17                         PlayMicSnd(&Dtmf6Start,&Dtmf6End,0,
18      FetchWordInRom((short *)&pinkToneLevel));
19                         break;
20
21                 case Seven:
22                         PlayMicSnd(&Dtmf7Start,&Dtmf7End,0,
23      FetchWordInRom((short *)&pinkToneLevel));
24                         break;
25
26                 case Eight:
27                         PlayMicSnd(&Dtmf8Start,&Dtmf8End,0,
28      FetchWordInRom((short *)&pinkToneLevel));
29                         break;
30
31                 case Nine:
32                         PlayMicSnd(&Dtmf9Start,&Dtmf9End,0,
33      FetchWordInRom((short *)&pinkToneLevel));
34                         break;
```

```
1                  case Star:
2
3        PlayMicSnd(&DtmfStarStart,&DtmfStarEnd,0,
4        FetchWordInRom((short *)&pinkToneLevel));
5                      break;
6
7                  case Pound:
8
9        PlayMicSnd(&DtmfPoundStart,&DtmfPoundEnd,0,
10       FetchWordInRom((short *)&pinkToneLevel));
11                     break;
12
13                 default:
14                     XmitErrorTone();
15                     break;
16                 }
17             }
18       }
19
20       void XmitListenableNumber(DtmfState code)
21       {
22             switch(code) {
23                 case 0:
24                     XmitBeepTone();
25                     Wait(80);
26                     XmitBeepTone();
27                     Wait(80);
28                     break;
29
30                 case 1:
31                     XmitHiBeep();
32                     Wait(125);
33                     break;
34
```

```
1          case 2:
2                  XmitHiBeep();
3                  Wait(125);
4                  XmitBeepTone();
5                  Wait(125);
6                  break;
7
8          case 3:
9                  XmitHiBeep();
10                 Wait(125);
11                 XmitBeepTone();
12                 Wait(125);
13                 XmitBeepTone();
14                 Wait(125);
15                 break;
16
17         case 4:
18                 XmitSetOfFour();
19                 break;
20
21         case 5:
22                 XmitSetOfFour();
23                 XmitHiBeep();
24                 Wait(125);
25                 break;
26
27         case 6:
28                 XmitSetOfFour();
29                 XmitHiBeep();
30                 Wait(125);
31                 XmitBeepTone();
32                 Wait(125);
33                 break;
34
```

```
            case 7:
                    XmitSetOfFour();
                    XmitHiBeep();
                    Wait(125);
                    XmitBeepTone();
                    Wait(125);
                    XmitBeepTone();
                    Wait(125);
                    break;

case 8:
                    XmitSetOfFour();
                    XmitSetOfFour();
                    break;

case 9:
                    XmitSetOfFour();
                    XmitSetOfFour();
                    XmitHiBeep();
                    Wait(125);
                    break;
            }
            Wait(600);    /* let human digest the number */
    } void XmitDcaLevel(DcadB level)
    {
            DtmfState firstDigit;
            DtmfState secondDigit;

if (level > dcaUnityGain) {
                    firstDigit = Nine;
                    secondDigit = DcadB2dB(level);/* +1 thru +6
    are sent as 91 thru 96 */
```

```
        }
        else {          /* 0 thru minus66 end up here */
                firstDigit = abs(DcadB2dB(level))/10;
                secondDigit = abs(DcadB2dB(level))%10;
        }

Wait(100);
        XmitDtmfTone(firstDigit);
        Wait(500);
        XmitDtmfTone(secondDigit);
        Wait(100);
} void XmitSpkAttLevel(ComboDB level)
{
        /* the speaker attenuation has 8 units of
attenuation: steps 0 thru 7 */
        /* we transmit this number directly in a single
digit. */
        Wait(200);
        XmitDtmfTone(level);
} void XmitNC2Status(void)
{
        /*  */
        /* we transmit this number directly in a single
digit. */
        Wait(200);
        XmitDtmfTone( commonOperatingMode == eModeNC1 ?
Four : (NC2HiLo ? Six : Five ));
} void XmitJ1kStatus(void)
```

```
1      {
2              XmitVersionNumber();
3              XmitDcaLevel(commonDcaLevel);
4              XmitNC2Status();
5      }
6
7      void XmitNC2HiTone(void)
8      {
9              PlayMicSnd(&Sine2kStart,&Sine2kEnd,52,
10     FetchWordInRom((short *)&sineToneLevel));
11             Wait(120);
12             PlayMicSnd(&Sine2kStart,&Sine2kEnd,52,
13     FetchWordInRom((short *)&sineToneLevel));
14     }
15
16     void XmitNC2LoTone(void)
17     {
18             PlayMicSnd(&Sine1kStart,&Sine1kEnd,26,
19     FetchWordInRom((short *)&sineToneLevel));
20             Wait(120);
21             PlayMicSnd(&Sine1kStart,&Sine1kEnd,26,
22     FetchWordInRom((short *)&sineToneLevel));
23     }
24
25     void XmitNC1Tone(void)
26     {
27             PlayMicSnd(&Sine500Start,&Sine500End,13, -6 +
28     FetchWordInRom((short *)&sineToneLevel));
29             Wait(120);
30             PlayMicSnd(&Sine500Start,&Sine500End,13, - 6 +
31     FetchWordInRom((short *)&sineToneLevel));
32     }
33
34     void XmitErrorTone(void)
```

```
1      {
2              PlayMicSnd(&PinkTone3Qtr,&SilenceEnd,3,
3      minus10dB);
4      }
5
6      void PlayErrorTone(void)
7      {
8              PlaySpkSnd(&PinkTone3Qtr,&SilenceEnd,3,
9      minus10dB);
10     }
11
12     void XmitOverrideTone(void)
13     {
14             PlayMicSnd(&PinkTone3Qtr,&SilenceEnd,5,
15     unityGain);
16             #if Lab
17                     PlaySpkSnd(&PinkTone3Qtr,&SilenceEnd,5,
18     unityGain);
19             #endif /* Lab */
20             if (eModeNC2 != commonOperatingMode) {/*
21     interrupts are turned off if we're coming from NC2 */
22                     Wait(338);   /* override tone is 337 msecs
23     long */
24             }
25     }
26
27     void AdjustDca(dB gainChange)
28     {
29             commonDcaLevel = dB2DcadB(gainChange +
30     DcadB2dB(commonDcaLevel));
31     }
32
33     void EnableRemoteControl(void)
34     {
```

44

```
1               remoteControl = True;
2               SetSampleRate(kHz8);
3               micMode = Mute;
4               spkMode = Thru;
5               remoteControlMode = Tuning;
6               commonShortOverrideTimeOut = 0;
7               InitSpkInFifo(SpkInDelay,SpkInPreQ);/* reset the
8       dtmf fifo */
9               InitDtmfHistory();
10      }
11
12      void ActivateRemoteControl(void)
13      {
14              EnableRemoteControl();
15              spkMode = Mute;
16              XmitOverrideTone(); /* this routine blocks until
17      sound is finished */
18              remoteControlMode = NeedCode;
19              overrideCountdown = commonOverrideCodeTime;/* how
20      long do we have to enter code */
21      }
22
23      void DisableRemoteControl(Boolean playSound)
24      {
25              remoteControl = False;
26              remoteControlMode = Tuning;
27              /* commonShortOverrideTimeOut is decremented in 5
28      msec intervals, or 200 Hz */
29              /* when it gets to zero, then the long override
30      duration is required */
31              commonShortOverrideTimeOut = 200 *
32      FetchWordInRom((short *)&shortOverrideTimeOut);
33
34              if (playSound) {
```

```
1                PlayMicSnd(&JabraSndStart,&JabraSndEnd,0,
2      minus9dB);
3                PlaySpkSnd(&JabraSndStart,&JabraSndEnd,0,
4      minus15dB);
5                singOnKey = True;
6            }
7            /* use sample rate set in prm.a or set by DTMF */
8            /* this only makes a difference when using
9      multi-rate actels */
10           SetSampleRate(dynSampleRate);
11
12           micMode = (eModeInOut == commonOperatingMode) ?
13     Thru : dynMicMode;
14
15           if (PIUMULTI == commonActelType && kHz8 <
16     commonSampleRate) {
17               spkMode = Thru;
18           }
19           else {
20               /*    */
21               spkMode = (eModeNC1 == commonOperatingMode) ?
22     dynSpkMode : Thru;
23           }
24           mic.mtr.maxLevel = 99;
25           spk.mtr.maxLevel = 99;
26     }
27
28     void DisableOverrideEverAfter(void)
29     {
30           commonOverrideEnable = False;
31     }
32
33     void ReenableOverrideAfterAll(void)
34     {
```

```
1                 commonOverrideEnable = True;
2        }
3
4        HexdB Last2DigitsToHexdB(void)
5        {
6                 return (dB2HexdB(-(dtmfHistory[mostRecent]*10 +
7        dtmfHistory[current])));
8        }
9
10       ushort Last2Digits(void)
11       {
12                return (dtmfHistory[mostRecent]*10 +
13       dtmfHistory[current]);
14       }
15
16       ushort * CalculateAddress(void)
17       {
18                /* convert 5-digit decimal number into hex address
19       */
20                ushort result;
21
22                result = 10000 * dtmfHistory[fourthMostRecent];
23                result += 1000 * dtmfHistory[thirdMostRecent];
24                result += 100 * dtmfHistory[secondMostRecent];
25                result += 10 * dtmfHistory[mostRecent];
26                result += dtmfHistory[current];
27                return((ushort *)result);
28       }
29
30       void OutputAddressContents(ushort * address)
31       {
32                extern ushort saram_start;
33                extern ushort saram_end;
34
```

```
            register ushort a;

/* audibly output value of word at RAM address */
            /* first make sure we're reading from valid data
    RAM */ a = (ushort)address;

if ((a >= (short)&saram_start && a <=
    (short)&saram_end)
                || (a >= 0x60 && a <= 0x7F)
                || (a >= 0x100 && a <= 0x4FF)) {
                /* in valid data ram range */
                XmitWordValue(*address);
            }
            else {
                XmitErrorTone();
            }
    } void RemoteControl(register DtmfState state, ushort
    prevDuration)
    {
            ushort   i;
            ushort   dtmfOverrideCode;
            ushort   pokeValue;

dtmfOverrideCode = FetchWordInRom((short
    *)&overrideCode);

/* duration is in # of chunks */
            /* convert into milliseconds */
            if (prevDuration <= 65535/5) {
                prevDuration *= 5;
```

```
            }
    else {
            prevDuration = 65535/5; /* make sure we don't
overflow a ushort */
    } if DtmfLeds
            /* these are always displayed, regardless of
commonLedMode */
            switch (state) {
                case One:
                    leds = ooox;
                    break;
                case Two:
                    leds = ooxo;
                    break;
                case Three:
                    leds = ooxx;
                    break;
                case Four:
                    leds = oxoo;
                    break;
                case Five:
                    leds = oxox;
                    break;
                case Six:
                    leds = oxxo;
                    break;
                case Seven:
                    leds = oxxx;
                    break;
                case Eight:
                    leds = xooo;
                    break;
```

```
                        case Nine:
                                leds = xoox;
                                break;
                        case Zero:
                                leds = xoxo;
                                break;
                        case Star:
                                leds = xoxx;
                                break;
                        case Pound:
                                leds = xxoo;
                                break;
                        case Ring:
                                leds = xxox;
                                break;
                        case Busy:
                                leds = xxxo;
                                break;
                        case DialTone:
                                leds = xxxx;
                                break;
                        case Silence:
                                leds = oooo;
                                break;
                        default:
                                leds = oooo;
                                break;
                }
            #endif /* DtmfLeds */

/* newest element is [0], oldest element is
        [HistorySize-1] */
                /* age everything by one DTMF state by shifting
        down the line, bucket brigade style */
```

```
1
2                if (Silence != state) {/* only store non-silence
3     characters to DTMF history */
4                   for (i= HistorySize-1;i>0;i--) {
5                        dtmfHistory[i] = dtmfHistory[i-1];
6                   }
7                   dtmfHistory[current] = state;
8                }
9
10               /* the pound and star keys interact adversely with
11    PBX and call control */
12               /* systems, especially when they're held down for
13    a while */
14               /* We now use the 8 key to switch modes instead of
15    the pound key */
16               /* and the pound key itself is used to toggle the
17    speaker mute in tuning mode */
18               /* and is used as a clear line key in expert mode
19    */
20
21               /* Tuning keys are activated just after
22    transitioning to silence */
23               if (Tuning == remoteControlMode && Silence ==
24    state) {
25                    ProcessTuning(state, prevDuration);
26               }
27               else
28               /* get the value stored in data space (typically
29    RAM) at the specified address */
30               if (DataAddress == remoteControlMode && Silence ==
31    state) {
32                    if (Unknown != dtmfHistory[fourthMostRecent]
33    && Unknown == dtmfHistory[fifthMostRecent]) {
```

```
                    /* response for the 5th digit of the
address */
                    Wait(20);
                    XmitDtmfTone(dtmfHistory[current]);
                    Wait(500);

OutputAddressContents(CalculateAddress());
                    remoteControlMode = Expert;
                    InitDtmfHistory();
            }
              else {
                    /* response for the first 4 digits of
the address */
                    Wait(20);
                    XmitDtmfTone(dtmfHistory[current]);
                    Wait(200);
              }
        }
        else
        /* get the value stored in program space
(typically ROM) at the specified address */
            if (ProgAddress == remoteControlMode && Silence ==
state) {
                if (Unknown != dtmfHistory[fourthMostRecent]
&& Unknown == dtmfHistory[fifthMostRecent]) {
                    /* response for the 5th digit of the
address */
                    Wait(20);
                    XmitDtmfTone(dtmfHistory[current]);
                    Wait(500);
                    /* output value of Prog rom at this
address*/
                    i = (ushort)FetchWordInRom((short
*)CalculateAddress());
```

```
                        OutputAddressContents(&i);
                        remoteControlMode = Expert;
                        InitDtmfHistory();
                }
                else {
                        /* response for the first 4 digits of
the address */
                        Wait(20);
                        XmitDtmfTone(dtmfHistory[current]);
                        Wait(200);
                }
        }
        else
        /* poke a 5-digit value into PROM */
        if (PokeValue == remoteControlMode && Silence ==
state) {
                if (Unknown != dtmfHistory[fourthMostRecent]
&& Unknown == dtmfHistory[fifthMostRecent]) {
                        /* response for the 5th digit of the
address */
                        Wait(20);
                        XmitDtmfTone(dtmfHistory[current]);
                        Wait(500);
                        pokeValue = (ushort)CalculateAddress();
/* it's really the value, not the address */
                        if (noErr !=
PokeRomByte(pokeAddress,pokeValue)) {
                                XmitErrorTone();
                        }
                        else {
                                /* output value of Prog rom at this
address*/
                                i = (ushort)FetchWordInRom((short
*)CalculateAddress());
```

53

```
                    OutputAddressContents(&i);
                }
                remoteControlMode = Expert;
                InitDtmfHistory();
            }
            else {
                /* response for the first 4 digits of
the value */
                Wait(20);
                XmitDtmfTone(dtmfHistory[current]);
                Wait(200);
            }
        }
        else
        /* get the address to poke a 5-digit value into */
        if (PokeAddress == remoteControlMode && Silence ==
state) {
            if (Unknown != dtmfHistory[fourthMostRecent]
&& Unknown == dtmfHistory[fifthMostRecent]) {
                /* response for the 5th digit of the
address */
                Wait(20);
                XmitDtmfTone(dtmfHistory[current]);
                Wait(500);
                XmitHiBeep();
                Wait(200);
                XmitHiBeep();
                /* output value of Prog rom at this
address*/
                pokeAddress = CalculateAddress();
                remoteControlMode = PokeValue;
                InitDtmfHistory();
            }
            else {
```

```
                    /* response for the first 4 digits of
the address */
                    Wait(20);
                    XmitDtmfTone(dtmfHistory[current]);
                    Wait(200);
                }
            }
        else
            /* Parametric mode requires sequences of 3 or 4
keys */
            /* Parametric keys are activated just after
transitioning to silence */
            if (Expert == remoteControlMode && Silence ==
state) {
                Wait(20);
                /*XmitDtmfTone(dtmfHistory[current]);*/
                XmitBeepTone();
                if (Pound == dtmfHistory[current]) {
                    /* clear current entry */
                    InitDtmfHistory();
                    XmitHiBeep();
                    Wait(80);
                    XmitHiBeep();
                    if (DataAddress == remoteControlMode
                        || ProgAddress == remoteControlMode) {
                        remoteControlMode = Expert;
                        XmitErrorTone();
                    }
                    return;
                }

/********** Three character codes:
************/
                /* the thirdMostRecent must be unknown */
```

```
                /* hitting the pound key resets the DTMF
history */ if ((Unknown !=
dtmfHistory[secondMostRecent]) && (Unknown ==
dtmfHistory[thirdMostRecent])) {
                    Process3CharCodes();
                }
                else
                /********** Four character codes:
************/
                if ((Unknown != dtmfHistory[thirdMostRecent])
&& (Unknown == dtmfHistory[fourthMostRecent])) {
                    Process4CharCodes();
                }
            }
            else
            /* if override key is zero, then no security code
required */
            if (NeedCode == remoteControlMode && 0x0000 ==
dtmfOverrideCode) {
                remoteControlMode = Tuning;

#if Lab
                    spkMode = Thru;
                    XmitDtmfWave();
                    remoteControlMode = Expert;
                #else
                    XmitPinkTone();
                    PlayWaitingTone();
                    spkMode = Mute;
                #endif /* Lab */

InitDtmfHistory();
```

```
                return;
        }
        else
        /* NeedCode mode looks for the secret decoder ring
code and nothing else */
        if (NeedCode == remoteControlMode && Silence ==
state) {
                state = dtmfHistory[current]; /* use the
state just prior to silence */
                XmitBeepTone(); /* key click response during
security sessions */
                if (((dtmfOverrideCode & 0x0F00)>>8) ==
dtmfHistory[secondMostRecent]) {
                        if (((dtmfOverrideCode & 0x00F0)>>4) ==
dtmfHistory[mostRecent]) {
                                if ((dtmfOverrideCode & 0x000F) ==
dtmfHistory[current]) {
                                        remoteControlMode = Tuning;
                                        spkMode = Mute;
                                        XmitPinkTone();
                                        InitDtmfHistory();
                                        PlayWaitingTone();
                                }
                        }
                }
        }
} void ProcessTuning(register DtmfState state, ushort
prevDuration) {
        switch(dtmfHistory[current]) {
                case Zero:
                        DisableRemoteControl(True);/* play sound
and return control to user */
```

```
                InitDtmfHistory();
                break;

case One:
                if (commonDcaLevel > dcaMinus36dB){
                        AdjustDca(-3);
                        XmitTestTone();
                }
                else {
                        XmitErrorTone();
                }
                InitDtmfHistory();
                break;

case Two:
                if (prevDuration < HoldDuration) {
                        XmitTestTone();
                }
                else {
                        /* change frequency/type of test tone */
                        /* no adjustment of DCA */
                        if (testToneStart ==
&PinkToneStart) {;
                                testToneStart = &Sine500Start;
                                testToneEnd = &Sine500End;;
                                testToneLoops = 800;
                        }
                        else
                        if (testToneStart == &Sine500Start)
{;
                                testToneStart = &Sine1kStart;
                                testToneEnd = &Sine1kEnd;;
                                testToneLoops = 1600;
```

```
                        }
                        else
                        if (testToneStart == &Sine1kStart)
{;
                                testToneStart = &Sine2kStart;
                                testToneEnd = &Sine2kEnd;;
                                testToneLoops = 3200;
                        }
                        else /* default */
                        if (testToneStart == &Sine2kStart)
{;
                                testToneStart =
&PinkToneStart;
                                testToneEnd = &PinkToneEnd;;
                                testToneLoops = 2;
                        }
                        XmitTestTone();
                }
                InitDtmfHistory();
                break;

case Three:
                if (commonDcaLevel < dcaPlus6dB) {
                        AdjustDca(+3);
                        XmitTestTone();
                }
                else {
                        XmitErrorTone();
                }
                InitDtmfHistory();
                break;

/*  */
        case Four:
```

```
                commonOperatingMode = eModeNC1;

XmitNC1Tone();
        InitDtmfHistory();
        break;

/* */
case Five:
        commonOperatingMode = eModeNC2;
        XmitNC2LoTone();
        InitDtmfHistory();
        break;

/*   */
case Six:
        commonOperatingMode = eModeNC2;
        XmitNC2HiTone();
        InitDtmfHistory();
        break;
/* send out version number */
case Seven:
        if (prevDuration > HoldDuration) {
                responseType = Listenable;
        }
        else {
                responseType = Dtmf;
        }
        XmitJ1kStatus();
        InitDtmfHistory();
        break;
case Eight:
        remoteControlMode = Expert;
        XmitDtmfWave();
        InitDtmfHistory();
```

```
                        break;

/* burn in settings without going to advanced
    mode */
                case Nine:
                    /* False therefore no DTMF at startup */
                    switch(RewriteParams(False)) {
                        case noErr:
                            XmitExpertTone();
                            break;

case atmelTimeOut:
                            XmitErrorTone();
                            Wait(500);
                            XmitErrorTone();
                            break;

case atmelBadCompare:
                            XmitErrorTone();
                            Wait(500);
                            XmitErrorTone();
                            Wait(500);
                            XmitErrorTone();
                            break;

default:
                            XmitErrorTone();
                            break;
                    }
                    break;

case Pound:     /* pound key toggles spk mute
    */
                    if (spkMode == Mute) {
```

```
                        XmitLoBeep();
                        Wait(100);/* let the operator hear
the beep, but not the user */
                        spkMode = Thru;
                    }
                    else {
                        spkMode = Mute;
                        XmitHiBeep();
                    }
                    InitDtmfHistory();
                    break;
            }
    }

/*****************************************************
************/
/* Module: Metr.c            */
/*                           */
/* metering and signal detection*/
/*                           */
/* Rev 1.0     15 Nov 1994    DTR*/
/*        Initial revision.   */
/*                           */
/*****************************************************
************/ include "globals.h"

Pragma_Sect_ramcode

MeterPtr tmpMtr;
Speech tmpIn;

dB ProcessMeter(MeterPtr mtr, Speech input)
```

```
{
        tmpMtr = mtr;
        tmpIn  = input;
        asm ("     .global    _ProcessPeakMeter");
        asm ("     .global    _tmpMtr");
        asm ("     .global    _tmpIn");

asm ("    larp AR3   ");
        asm ("    ldpk _tmpMtr");
        asm ("    lar       AR3,_tmpMtr");

asm ("    ldpk _tmpIn");
        asm ("    lacl _tmpIn");
        asm ("    call _ProcessPeakMeter");
}
/*
        File:      DTMF2.c Contains: more Routines For analyzing DTMF sound samples Copyright:    ┤ 1994, JABRA Corporation, all rights reserved worldwide.

This file contains DTMF detection state machine & init code.

*/ include "globals.h"
include "dtmf.h"
```

```
1   /**************************************************
2   **************************
3   *
4   *       processChunkState(DtmfParamsPtr dtmfPtr)
5   *
6   *
7   *       If the state changes and remains constant for
8   MinStateDuration number
9   *       of chunks, processChunkState() will usually call
10  dtmfPtr->callBackRoutine()
11  *       passing the state to the callBackRoutine.
12  However, it looks for patterns of
13  *       pulsing ringing or busy tones and will not repeat
14  calls the callBackRoutine
15  *       in the case of ringing or busy. (It DOES call the
16  callBackRoutine ONCE in
17  *       the cases of ringing or busy.
18  *       Note! Does not call UNDETERMINED (although detects
19  it).
20  **************************************************
21  **************************/
22
23          Pragma_Sect_text2
24
25  void ProcessChunkState( register DtmfParamsPtr dtmfPtr)
26  {
27          if (dtmfPtr->stateDuration == MinStateDuration &&
28  dtmfPtr->state != Unknown){
29  #if UsingAllFilters
30              if ( (
31                  !(dtmfPtr->state == Busy &&
32                      dtmfPtr->previous_state == Silence
33  &&
```

```
                                    dtmfPtr->previous_previous_state ==
Busy)

&&  !(dtmfPtr->state == Silence &&
                            dtmfPtr->previous_state == Busy &&
                            dtmfPtr->previous_previous_state ==
Silence)

&&  !(dtmfPtr->state == Ring &&
                            dtmfPtr->previous_state == Silence
&&
                            dtmfPtr->previous_previous_state ==
Ring)

&&  !(dtmfPtr->state == Silence &&
                            dtmfPtr->previous_state == Ring &&
                            dtmfPtr->previous_previous_state ==
Silence) )

||
                        (dtmfPtr->state == Silence &&
                            dtmfPtr->stateDuration ==
SilenceTimeout) ){

/* The state has officially changed */
                        /* take action */
                        if(dtmfPtr->callBackRoutine!=0){

(*(dtmfPtr->callBackRoutine))(dtmfPtr->state,dtmfPtr->prevDu
ration);
                        }
                    }
#else       /* not UsingAllFilters */
                    if(dtmfPtr->callBackRoutine!=0){
```

```
         (*(dtmfPtr->callBackRoutine))(dtmfPtr->state,dtmfPtr->prevDu
         ration);
                }
#endif
                dtmfPtr->previous_previous_state =
dtmfPtr->previous_state;
                dtmfPtr->previous_state = dtmfPtr->state;
           }
}

Pragma_Sect_text2 void InitDtmf( register DtmfParamsPtr dtmf )
{
           short i;

if (0 == dtmf) {
                return;
           } dtmf->state = Unknown;
           dtmf->stateDuration = 0;
           dtmf->prevDuration = 0;
           dtmf->previous_state = Unknown;
           dtmf->previous_previous_state = Unknown;

dtmf->inputPtr = 0;
           dtmf->callBackRoutine = RemoteControl;

dtmf->inputGain = 32767;
           dtmf->inputDiffState = 0;
           dtmf->inputIntState = 0;
```

```
 1
 2  InitMeter(&dtmf->dtmfMeter,(Rate)FetchHexdBInRom(&DtmfMeterR
 3  iseTime),(Rate)FetchHexdBInRom(&DtmfMeterFallTime));
 4
 5          /* dtmf recognition is always at 7812.5 hz sample
 6  rate */
 7  #if (False==Sim)              /* simulator uses
 8  pre-calculated coeffs to save time */
 9
10  InitDtmfFilter(dtmf->filterPtr[0]=&filter0,(FilterParmsPtr)&
11  DtmfFilterParms0, kHz8);
12
13  InitDtmfFilter(dtmf->filterPtr[1]=&filter1,(FilterParmsPtr)&
14  DtmfFilterParms1, kHz8);
15
16  InitDtmfFilter(dtmf->filterPtr[2]=&filter2,(FilterParmsPtr)&
17  DtmfFilterParms2, kHz8);
18
19  InitDtmfFilter(dtmf->filterPtr[3]=&filter3,(FilterParmsPtr)&
20  DtmfFilterParms3, kHz8);
21
22  InitDtmfFilter(dtmf->filterPtr[4]=&filter4,(FilterParmsPtr)&
23  DtmfFilterParms4, kHz8);
24
25  InitDtmfFilter(dtmf->filterPtr[5]=&filter5,(FilterParmsPtr)&
26  DtmfFilterParms5, kHz8);
27
28  InitDtmfFilter(dtmf->filterPtr[6]=&filter6,(FilterParmsPtr)&
29  DtmfFilterParms6, kHz8);
30  #if UsingAllFilters
31
32  InitDtmfFilter(dtmf->filterPtr[7]=&filter7,(FilterParmsPtr)&
33  DtmfFilterParms7, kHz8);
```

```
InitDtmfFilter(dtmf->filterPtr[8]=&filter8,(FilterParmsPtr)&
DtmfFilterParms8, kHz8);

InitDtmfFilter(dtmf->filterPtr[9]=&filter9,(FilterParmsPtr)&
DtmfFilterParms9, kHz8);

InitDtmfFilter(dtmf->filterPtr[10]=&filter10,(FilterParmsPtr
)&DtmfFilterParms10, kHz8);

InitDtmfFilter(dtmf->filterPtr[11]=&filter11,(FilterParmsPtr
)&DtmfFilterParms11, kHz8);
endif /* UsingAllFilters */ else
        /* sample rate = 7812.5, freq 697 Hz, gain = 40,
bandwidth = .18 octaves, feedforward paramters have extra 6
dB */
        dtmf->filterPtr[0]   =&filter0;
        dtmf->filterPtr[0]->b2=212;
        dtmf->filterPtr[0]->b1=-553;
        dtmf->filterPtr[0]->b0=441;
        dtmf->filterPtr[0]->a2=16270;
        dtmf->filterPtr[0]->a1=-27656;
        dtmf->filterPtr[0]->x2=0;
        dtmf->filterPtr[0]->x1=0;
        dtmf->filterPtr[0]->y2=0;
        dtmf->filterPtr[0]->y1=0;
        dtmf->filterPtr[0]->nrg=0L;

/* sample rate = 7812.5, freq 770 Hz, gain = 40,
bandwidth = .18 octaves, feedforward paramters have extra 6
dB */
        dtmf->filterPtr[1]   =&filter1;
```

```
1              dtmf->filterPtr[1]->b2=200;
2              dtmf->filterPtr[1]->b1=-532;
3              dtmf->filterPtr[1]->b0=453;
4              dtmf->filterPtr[1]->a2=16258;
5              dtmf->filterPtr[1]->a1=-26580;
6              dtmf->filterPtr[1]->x2=0;
7              dtmf->filterPtr[1]->x1=0;
8              dtmf->filterPtr[1]->y2=0;
9              dtmf->filterPtr[1]->y1=0;
10             dtmf->filterPtr[1]->nrg=0L;
11
12             /* sample rate = 7812.5, freq 852 Hz, gain = 40,
13  bandwidth = .144 octaves, feedforward paramters have extra 6
14  dB */
15             dtmf->filterPtr[2]  =&filter2;
16             dtmf->filterPtr[2]->b2=215;
17             dtmf->filterPtr[2]->b1=-506;
18             dtmf->filterPtr[2]->b0=438;
19             dtmf->filterPtr[2]->a2=16272;
20             dtmf->filterPtr[2]->a1=-25285;
21             dtmf->filterPtr[2]->x2=0;
22             dtmf->filterPtr[2]->x1=0;
23             dtmf->filterPtr[2]->y2=0;
24             dtmf->filterPtr[2]->y1=0;
25             dtmf->filterPtr[2]->nrg=0L;
26
27             /* sample rate = 7812.5, freq 941 Hz, gain = 40,
28  bandwidth = .144 octaves, feedforward paramters have extra 6
29  dB */
30             dtmf->filterPtr[3]  =&filter3;
31             dtmf->filterPtr[3]->b2=203;
32             dtmf->filterPtr[3]->b1=-475;
33             dtmf->filterPtr[3]->b0=450;
34             dtmf->filterPtr[3]->a2=16261;
```

```
dtmf->filterPtr[3]->a1=-23734;
dtmf->filterPtr[3]->x2=0;
dtmf->filterPtr[3]->x1=0;
dtmf->filterPtr[3]->y2=0;
dtmf->filterPtr[3]->y1=0;
dtmf->filterPtr[3]->nrg=0L;

/* sample rate = 7812.5, freq 1209 Hz, gain = 40,
bandwidth = .144 octaves, feedforward paramters have extra 6
dB */
dtmf->filterPtr[4]   =&filter4;
dtmf->filterPtr[4]->b2=168;
dtmf->filterPtr[4]->b1=-367;
dtmf->filterPtr[4]->b0=484;
dtmf->filterPtr[4]->a2=16226;
dtmf->filterPtr[4]->a1=-18371;
dtmf->filterPtr[4]->x2=0;
dtmf->filterPtr[4]->x1=0;
dtmf->filterPtr[4]->y2=0;
dtmf->filterPtr[4]->y1=0;
dtmf->filterPtr[4]->nrg=0L;

/* sample rate = 7812.5, freq 1336 Hz, gain = 40,
bandwidth = .18 octaves, feedforward paramters have extra 6
dB */
dtmf->filterPtr[5]   =&filter5;
dtmf->filterPtr[5]->b2=107;
dtmf->filterPtr[5]->b1=-310;
dtmf->filterPtr[5]->b0=544;
dtmf->filterPtr[5]->a2=16166;
dtmf->filterPtr[5]->a1=-15500;
dtmf->filterPtr[5]->x2=0;
dtmf->filterPtr[5]->x1=0;
dtmf->filterPtr[5]->y2=0;
```

```
1              dtmf->filterPtr[5]->y1=0;
2              dtmf->filterPtr[5]->nrg=0L;
3
4              /* sample rate = 7812.5, freq 1477 Hz, gain = 40,
5       bandwidth = .144 octaves, feedforward paramters have extra 6
6       dB */
7              dtmf->filterPtr[6]   =&filter6;
8              dtmf->filterPtr[6]->b2=133;
9              dtmf->filterPtr[6]->b1=-243;
10             dtmf->filterPtr[6]->b0=519;
11             dtmf->filterPtr[6]->a2=16191;
12             dtmf->filterPtr[6]->a1=-12171;
13             dtmf->filterPtr[6]->x2=0;
14             dtmf->filterPtr[6]->x1=0;
15             dtmf->filterPtr[6]->y2=0;
16             dtmf->filterPtr[6]->y1=0;
17             dtmf->filterPtr[6]->nrg=0L;
18
19             /* sample rate = 7812.5, freq 1633 Hz, gain = 40,
20      bandwidth = .144 octaves, feedforward paramters have extra 6
21      dB */
22      #if UsingAllFilters
23             dtmf->filterPtr[7]   =&filter7;
24             dtmf->filterPtr[7]->b2=112;
25             dtmf->filterPtr[7]->b1=-166;
26             dtmf->filterPtr[7]->b0=539;
27             dtmf->filterPtr[7]->a2=16170;
28             dtmf->filterPtr[7]->a1=-8289;
29             dtmf->filterPtr[7]->x2=0;
30             dtmf->filterPtr[7]->x1=0;
31             dtmf->filterPtr[7]->y2=0;
32             dtmf->filterPtr[7]->y1=0;
33             dtmf->filterPtr[7]->nrg=0L;
34
```

```
            /* sample rate = 7812.5, freq 350 Hz, gain = 40,
bandwidth = .2 octaves, feedforward paramters have extra 6
dB */
            dtmf->filterPtr[8]   =(BiQuadPtr)&f8b2;
            dtmf->filterPtr[8]->b2=263;
            dtmf->filterPtr[8]->b1=-628;
            dtmf->filterPtr[8]->b0=391;
            dtmf->filterPtr[8]->a2=16320;
            dtmf->filterPtr[8]->a1=-31417;
            dtmf->filterPtr[8]->x2=0;
            dtmf->filterPtr[8]->x1=0;
            dtmf->filterPtr[8]->y2=0;
            dtmf->filterPtr[8]->y1=0;
            dtmf->filterPtr[8]->nrg=0L;

/* sample rate = 7812.5, freq 440 Hz, gain = 40,
bandwidth = .125 octaves, feedforward paramters have extra 6
dB */
            dtmf->filterPtr[9]   =(BiQuadPtr)&f9b2;
            dtmf->filterPtr[9]->b2=277;
            dtmf->filterPtr[9]->b1=-614;
            dtmf->filterPtr[9]->b0=377;
            dtmf->filterPtr[9]->a2=16334;
            dtmf->filterPtr[9]->a1=-30691;
            dtmf->filterPtr[9]->x2=0;
            dtmf->filterPtr[9]->x1=0;
            dtmf->filterPtr[9]->y2=0;
            dtmf->filterPtr[9]->y1=0;
            dtmf->filterPtr[9]->nrg=0L;

/* sample rate = 7812.5, freq 480 Hz, gain = 40,
bandwidth = .125 octaves, feedforward paramters have extra 6
dB */
            dtmf->filterPtr[10]  =(BiQuadPtr)&f10b2;
```

```
1              dtmf->filterPtr[10]->b2=272;
2              dtmf->filterPtr[10]->b1=-606;
3              dtmf->filterPtr[10]->b0=382;
4              dtmf->filterPtr[10]->a2=16329;
5              dtmf->filterPtr[10]->a1=-30306;
6              dtmf->filterPtr[10]->x2=0;
7              dtmf->filterPtr[10]->x1=0;
8              dtmf->filterPtr[10]->y2=0;
9              dtmf->filterPtr[10]->y1=0;
10             dtmf->filterPtr[10]->nrg=0L;
11
12             /* sample rate = 7812.5, freq 620 Hz, gain = 40,
13  bandwidth = .2 octaves, feedforward paramters have extra 6
14  dB */
15             dtmf->filterPtr[11]  =(BiQuadPtr)&f11b2;
16             dtmf->filterPtr[11]->b2=214;
17             dtmf->filterPtr[11]->b1=-574;
18             dtmf->filterPtr[11]->b0=440;
19             dtmf->filterPtr[11]->a2=16271;
20             dtmf->filterPtr[11]->a1=-28679;
21             dtmf->filterPtr[11]->x2=0;
22             dtmf->filterPtr[11]->x1=0;
23             dtmf->filterPtr[11]->y2=0;
24             dtmf->filterPtr[11]->y1=0;
25             dtmf->filterPtr[11]->nrg=0L;
26  #endif /* UsingAllFilters */
27  #endif /* False==Sim */
28
29             dtmf->LPFcoef = LPFCOEF;
30             dtmf->inputEnergyLPFstate = 0;
31             dtmf->prevInputLevel = 99;/* minus 90, no power */
32
33             dtmf->inputThreshold =
34  FetchULongWordInRom(&dtmfInputThreshold);
```

```
          dtmf->filterThresholdCoef =
FetchWordInRom(&dtmfFilterThreshold);
          dtmf->filterDifferenceCoef =
FetchWordInRom(&dtmfFilterDifference);

dtmf->filterEnergyLPFstates[0] = 0;
          dtmf->filterEnergyLPFstates[1] = 0;
          dtmf->filterEnergyLPFstates[2] = 0;
          dtmf->filterEnergyLPFstates[3] = 0;
          dtmf->filterEnergyLPFstates[4] = 0;
          dtmf->filterEnergyLPFstates[5] = 0;
          dtmf->filterEnergyLPFstates[6] = 0;
#if UsingAllFilters
          dtmf->filterEnergyLPFstates[7] = 0;
          dtmf->filterEnergyLPFstates[8] = 0;
          dtmf->filterEnergyLPFstates[9] = 0;
          dtmf->filterEnergyLPFstates[10] = 0;
          dtmf->filterEnergyLPFstates[11] = 0;
endif dtmf->dtmfArray[0][0] = One;
          dtmf->dtmfArray[0][1] = Two;
          dtmf->dtmfArray[0][2] = Three;
          dtmf->dtmfArray[0][3] = Akey;
          dtmf->dtmfArray[1][0] = Four;
          dtmf->dtmfArray[1][1] = Five;
          dtmf->dtmfArray[1][2] = Six;
          dtmf->dtmfArray[1][3] = Bkey;
          dtmf->dtmfArray[2][0] = Seven;
          dtmf->dtmfArray[2][1] = Eight;
          dtmf->dtmfArray[2][2] = Nine;
          dtmf->dtmfArray[2][3] = Ckey;
          dtmf->dtmfArray[3][0] = Star;
          dtmf->dtmfArray[3][1] = Zero;
```

```
1              dtmf->dtmfArray[3][2] = Pound;
2              dtmf->dtmfArray[3][3] = Dkey;
3       }
4       /*
5              File:          DTMF.c
6
7              Contains: Routine for detecting DTMF tones
8
9              Copyright:    (c) 1994,1995 JABRA Corporation,
10      all rights reserved worldwide.
11
12             This file contains DTMF detection filter bank.
13
14      */
15
16      #include "globals.h"
17      #include "dtmf.h"
18
19      /***************************************************/
20      #define DtmfChunkSize    40    /* 5 millisecond chunks */
21
22             DtmfParams      dtmfData;
23
24             Pragma_Sect_ramcode
25
26      void ProcessDtmf(register DtmfParamsPtr dtmfParams)
27      {
28             short i;
29             register SpeechPtr s;
30             Speech    spch[DtmfChunkSize];
31             s = spch;
32
33             if (GetSpkInCnt() >= DtmfChunkSize ) {   /* is
34      there enough to dequeue?? */
```

```
                    if (GetSpkInCnt() >= GetSpkInSize()) {
                        /* start over w/ resynced fifo if
overflow has occurred*/
                        InitSpkInFifo(SpkInDelay,SpkInPreQ);
                    }
                    else {
                        for (i=0;i<DtmfChunkSize;i++) {
                            /* get peak meter reading for
absolute DTMF level detection */
                            /* while dequeing the audio data to
be analyzed */

ProcessMeter(&dtmfParams->dtmfMeter,(*s++ = DeqSpkIn()));
                            /* see if we need to count down */
                            if (overrideCountdown && (NeedCode
== remoteControlMode)) {
                                overrideCountdown--;
                            }
                        } dtmfParams->inputPtr = spch;

ProcessChunk( dtmfParams,
DtmfChunkSize);
                        ProcessChunkState( dtmfParams );
                    }
                }
            }

Pragma_Sect_text

/***************************************************/
void ProcessChunk( register DtmfParamsPtr dtmfPtr, short
numSamples)
```

```
1    {
2            short x1, x2, y1, y2;
3            long A;
4            short *input;
5            long energy;
6
7            short i, filterIndex;
8
9            DtmfState newState;
10           short    lowGroupMax, highGroupMax;
11           long filter_pair_sum[4], filter_pair_diff[4];
12
13   /*
14    *       Compute energy for this chunk and store into
15    *               dtmfPtr->inputEnergyLPFstate    .
16    */
17
18           y2 = dtmfPtr->inputGain;
19           x1 = dtmfPtr->inputDiffState;
20           y1 = dtmfPtr->inputIntState;
21           energy = 0;
22           input = dtmfPtr->inputPtr;
23
24           for (i=numSamples; i>0; i--) {
25                   A       =       y1;
26                   A       *=      31130;
27                   A       +=      16384;
28                   A       >>=     (SAMPLE_BITS-1);
29                   x2      =       *(input);
30                   A       +=      x2 - x1;
31                   y1      =       A;
32                   A       *=      y2;
33                   A       +=      16383;
34                   A       >>=     (SAMPLE_BITS-1);
```

```
                *(input++) = A;
                A    *=    A;
                A    >>=   ENERGY_SCALER_SHIFT;
                energy += A;
                x1   =     x2;
        } dtmfPtr->inputDiffState = x1;
        dtmfPtr->inputIntState = y1;

A    =     energy;
        A    -=    dtmfPtr->inputEnergyLPFstate;
        A    +=    16384;
        A    >>=   (SAMPLE_BITS-1);
        dtmfPtr->inputEnergyLPFstate += dtmfPtr->LPFcoef * A;

/*
 *              Adjust gain to limit input level if
necessary.
 */
        if (dtmfPtr->inputEnergyLPFstate >
ENERGY_LIMIT_HIGH) {
                A    =     y2;
                A    *=    GAIN_REDUCTION_STEP;/* drop gain by
1/4 dB */
                A    >>=   (SAMPLE_BITS-1);
                dtmfPtr->inputGain = A;
        }
        else if ( (dtmfPtr->inputEnergyLPFstate <
ENERGY_LIMIT_LOW)
                        && (dtmfPtr->inputGain <
(32767-GAIN_INCREASE_STEP))) {
```

```
1                   /* raise gain very slowly */
2                   dtmfPtr->inputGain = y2 + GAIN_INCREASE_STEP;
3           }
4
5   /*
6    *          Then compute energy for each DTMF filter and
7   store into
8    *          dtmfPtr->filterEnergyLPFstates  .
9    */
10  #if UsingAllFilters
11          for (filterIndex=0; filterIndex<12; filterIndex++)
12  {
13                  if (7 == filterIndex)
14                      continue; /* ignore A,B,C & D for now */
15  #else
16          for (filterIndex=0; filterIndex<7; filterIndex++)
17  {           /* just 0-9, plus * & # */
18  #endif      /* UsingAllFilters */
19
20              dtmfPtr->filterPtr[filterIndex]->nrg = 0L;
21              input = dtmfPtr->inputPtr;
22
23              for (i=numSamples; i>0; i--) {
24                  DoBq(dtmfPtr->filterPtr[filterIndex],
25  *(input++));
26              }
27
28              A       =
29  dtmfPtr->filterPtr[filterIndex]->nrg;
30              A       -=
31  dtmfPtr->filterEnergyLPFstates[filterIndex];
32              A       >>=   (SAMPLE_BITS-1);
33              dtmfPtr->filterEnergyLPFstates[filterIndex]
34  += dtmfPtr->LPFcoef * A;
```

```
            }

/*
 *          Now determine which in the low group has
highest energy.
 *          697, 770, 852, 941 Hz
 */

A = -1;
            i = 0;
            for (filterIndex=0; filterIndex<4; filterIndex++)
{
                if (A <
dtmfPtr->filterEnergyLPFstates[filterIndex])
                {
                    A =
dtmfPtr->filterEnergyLPFstates[filterIndex];
                    i = filterIndex;
                }
            }
            filter_pair_sum[0] = A;
            filter_pair_diff[0] = A;
            lowGroupMax = i;

#if (DtmfLoGroupLeds)
            if (kDtmfLoGroup == commonLedMode) {
                if (0 == lowGroupMax)
                    leds = xooo;
                else if (1 == lowGroupMax)
                    leds = oxoo;
                else if (2 == lowGroupMax)
                    leds = ooxo;
                else if (3 == lowGroupMax)
                    leds = ooox;
```

```
1               }
2               #endif /* DtmfLoGroupLeds */
3   /*
4    *          Now determine which in the high group has
5   highest energy.
6    *          1209, 1336, 1477, 1633 Hz
7    */
8
9           A = -1;
10          i = 4;
11  #if UsingAllFilters
12          for (filterIndex=4; filterIndex<8; filterIndex++)
13  {
14  #else
15          for (filterIndex=4; filterIndex<7; filterIndex++)
16  {
17  #endif
18              if (A <
19  dtmfPtr->filterEnergyLPFstates[filterIndex])
20              {
21                  A =
22  dtmfPtr->filterEnergyLPFstates[filterIndex];
23                  i = filterIndex;
24              }
25          }
26          filter_pair_sum[0] += A;
27          filter_pair_diff[0] -= A;
28          highGroupMax = i - 4;
29
30          #if (DtmfHiGroupLeds)
31          if (kDtmfHiGroup == commonLedMode) {
32              if (0 == highGroupMax)
33                  leds = xooo;
34              else if (1 == highGroupMax)
```

```
                    leds = oxoo;
            else if (2 == highGroupMax)
                    leds = ooxo;
            else if (3 == highGroupMax)
                    leds = ooox;
    }
    #endif /* DtmfHiGroupLeds */

/*
 *      Now compute dial tone, busy, and ring energy and
compare to touch tones.
 */
#if UsingAllFilters
            filter_pair_sum[1]   =
dtmfPtr->filterEnergyLPFstates[8]+
dtmfPtr->filterEnergyLPFstates[9];
            filter_pair_sum[2]   =
dtmfPtr->filterEnergyLPFstates[9]+
dtmfPtr->filterEnergyLPFstates[10];
            filter_pair_sum[3]   =
dtmfPtr->filterEnergyLPFstates[10]+
dtmfPtr->filterEnergyLPFstates[11];

filter_pair_diff[1] =
dtmfPtr->filterEnergyLPFstates[8]-
dtmfPtr->filterEnergyLPFstates[9];
            filter_pair_diff[2] =
dtmfPtr->filterEnergyLPFstates[9]-
dtmfPtr->filterEnergyLPFstates[10];
            filter_pair_diff[3] =
dtmfPtr->filterEnergyLPFstates[10]-
dtmfPtr->filterEnergyLPFstates[11];

A = -1;
```

```
1              i = 0;
2              for (filterIndex=0; filterIndex<4; filterIndex++)
3      {
4                   if (A      <     filter_pair_sum[filterIndex])
5      {
6                        A      =    filter_pair_sum[filterIndex];
7                        i      =    filterIndex;
8                   }
9              }
10
11             if (filter_pair_diff[i] < 0) {
12                  filter_pair_diff[i] = -filter_pair_diff[i];
13             }
14
15     #else /* UsingAllFilters */
16             i=0;
17     #endif /* UsingAllFilters */
18
19     /*
20      *         Finally determine the dtmf state.
21      */
22             energy = dtmfPtr->inputEnergyLPFstate;
23             if (energy > dtmfPtr->inputThreshold) {
24                  /* is the energy in the filter pair a
25     significant portion of the overall energy? */
26                  if ( filter_pair_sum[i]
27                       > (energy>>(SAMPLE_BITS-1)) *
28     dtmfPtr->filterThresholdCoef ) {
29                       /* are the two different tones roughly
30     the same amount of energy? */
31                       if ((filter_pair_diff[i]<<2) <
32
33     (filter_pair_sum[i]>>(SAMPLE_BITS-3)) *
34     dtmfPtr->filterDifferenceCoef) {
```

```
                        if (i <= 0) {
                                newState =
dtmfPtr->dtmfArray[lowGroupMax][highGroupMax];
                        }
#if UsingAllFilters
                        else if (i <= 1) {
                                newState = DIAL_TONE;
                        }
                        else if (i <= 2) {
                                newState = RING;
                        }
                        else {
                                newState = BUSY;
                        }
#endif /* UsingAllFilters */
                }
            }
            else {
                newState = Silence;
            }
        }
        else {
            newState = Silence;
        } if (dtmfPtr->state == newState) {/* we stop
counting if we're longer than 2 1/2 minutes or so */
            if (dtmfPtr->stateDuration < 32767) {
                dtmfPtr->stateDuration++;
            }
        }
        else {
            #define CorrectionFactor0
```

```
1                  /* aHexdBp2dB expects energy to be
2       accumulated over 32 samples */
3                  /* while DTMF accumulates 40 samples */
4
5                  dtmfPtr->state = newState;
6                  dtmfPtr->prevDuration =
7       dtmfPtr->stateDuration;
8
9                  /* max level is determined in negative db. -0
10      is the highest, 99 is lowest */
11                 dtmfPtr->prevInputLevel =
12      dtmfPtr->dtmfMeter.maxLevel;
13                 dtmfPtr->dtmfMeter.maxLevel = 99;
14                 dtmfPtr->stateDuration = 0;
15           }
16           return;
17      }
18
19           Pragma_Sect_ramcode
20
21      BiQuadPtr tempPtr;
22      Speech         tempIn;
23
24      short DoBq(BiQuadPtr bq, Speech in)
25      {
26           tempPtr = bq;
27           tempIn = in;
28           asm ("    .global   _bq");
29           asm ("    ldpk _tempPtr");
30           asm ("    lacl _tempPtr");
31           asm ("    sacb       ");
32           asm ("    ldpk _tempIn");
33           asm ("    lacl _tempIn");
34           asm ("    call _bq   ");
```

```
1    }
2    ;//
3    ;// Meter routines
4    ;//
5    ;//              95-04-26   DTR   Initial revision
6    ;//
7    ;//
8    ;#ifdef Copyrights
9    ;static char copyrightNotice[] = "Copyright (c)1995, JABRA
10   Corporation";
11   ;#endif // Copyrights
12
13           .include aglobals.i
14
15           .sect    ".text"
16
17           .if  RamRun
18               .sect    ".ramcode"
19           .endif   ; RamRun
20
21   ************************************************************
22   ********
23   *********************        _ProcessRmsMeter
24   ******************
25   ************************************************************
26   ********
27   *on entry:
28   *       acc  contains filtered incoming speech word to
29   measure
30   *       accb contains filter energy
31   *       ar3  contains pointer to meter struct
32   *       ar4  contains pointer to filter struct
33   *
34   *on exit:
```

```
1    *          acc contains current meter level in hexdB
2    *
3    *trashes:
4    *          acc, accb, arp, ar3, ar4, PREG, TREG0
5
6    _ProcessRmsMeter:              ; argument is in acc
7              setc sxm
8              larp ar3
9              adrk mtrInput        ; point to mtrInput
10             sacl *               ; save off the (filtered)
11   incoming word
12             sbrk mtrInput        ; point to meter struct
13             sacb                 ; and save in accb as well
14
15             ldpk _numIrqs
16             lacl _numIrqs        ;
17             and      #01fh
18             sub      #1          ; make this always happen on
19   odd sample
20                                  ; that way this usage spike
21   never combines with
22                                  ; ToneDetect, which has a
23   usage spike every 40 words
24             bcnd EveryTime,neq
25
26   MeterUpdate:
27             ; we only come here every thiry-two times (and
28   #01fh)
29
30             ; store away pointers to filter(ar4) and
31   meter(ar3) for future use
32             lamm ar3
33             samm dbmr            ; store ar3 in dbmr
34   temporarily
```

```
                                        ; WARNING: The dbmr register
        is not
                                        ; saved as part of the
        interrupt
                                        ; context swap. Use with
        caution....

lamm ar4                ; get filter address from AR4
                adrk mtrMaxInput        ; point to mtrInput
                sacl *                  ; save filter address, rms
        meter doesn't use this field otherwise
                sbrk mtrMaxInput        ; point to meter struct, lacb                    ; filter energy is in accb ; compensate by 3 db for the mismatch in ENERGY_SCALER_SHIFT
        ; which applies to all filter usage. We would only need
        ENERGY_SCALER_SHIFT = 4
        ; if this were the only place we were using it.

sfl                     ; 3db up (power)
                call _aHexdBp2dB        ; convert energy (power) to dB
                call _adB2HexdB         ; convert dB to hexdB
                sacb                    ; store result in accb lamm dbmr               ; get back pointer to meter
                samm ar3
                larp ar3
                nop                     ; avoid pipeline hit adrk mtrMaxInput        ; get back pointer to filter
        (ar4)
                lar     ar4,*           ; which had borrowed
        mtrMaxInput for a while
```

```
1              sbrk    mtrMaxInput
2
3              larp    ar4
4
5              adrk    BiQuadNrg       ; reset filter energy for next
6      32 samples
7              apl     #0,*+           ; zero out hi word of
8      BiQuadNrg
9              apl     #0,*-           ; zero out lo word of
10     BiQuadNrg
11             sbrk    BiQuadNrg
12
13             larp    ar3
14             adrk    mtrPkInput      ; point to mtrPkInput
15             lacb                    ; get filter energy level (in
16     HexdB)
17             sacl    *               ; store current filter energy
18     level (in HexdB)
19             sbrk    mtrPkInput
20
21     EveryTime:
22             lamm    dbmr
23             samm    ar3
24             larp    ar3
25             nop                     ; avoid pipeline hit
26
27             adrk    mtrPkInput      ; point to mtrPkInput
28             lacc    *               ; load current filter energy
29     level
30                     ; used to output a meter history under simulation
31             sbrk    mtrPkInput
32
33     RiseOrFall:
34             sacb                    ; store mtrPkInput in accb
```

```
1              adrk   mtrPeak         ; point to mtrPeak
2              lacc *                 ;
3              sbrk   mtrPeak         ;
4
5              exar                   ; swap: input in acc, mtrPeak
6      in accb
7              sbb                    ; subtract mtrPeak from target
8      level
9
10     * the following three destinations are at the end of the
11     * _ProcessPeakMeter routine. This saves us from duplicating
12     code
13
14             bcnd   MtrPeakFalling,lt
15             bcnd   MtrPeakRising,gt
16             b      MtrPeakSame
17
18     ************************************************************
19     ********
20     *******************       _ProcessPeakMeter
21     *******************
22     ************************************************************
23     ********
24     *on entry:
25     *       acc  contains incoming speech word to measure
26     *       ar3  contains pointer to meter struct
27     *
28     *on exit:
29     *       acc contains current meter level in hexdB
30     *
31     *trashes:
32     *       acc, accb, arp, ar3, PREG, TREG0
33
34     _ProcessPeakMeter:      ; argument is in acc
```

```
1              setc sxm              ; set sign extension mode
2              samm TREG0            ; stash the unmodified new
3     input word
4              and      #08000h      ; store sign bit in accb
5              sacb                  ;
6              larp AR3              ; point to meter struct
7
8     DidSignChange:
9
10             adrk mtrInput         ; point to mtrInput
11             lacl *                ; load the previous input word
12             sbrk mtrInput         ; point to meter struct
13
14             and      #08000h      ; get the sign bit in acc
15             sbb                   ; compare sign bits
16             bcnd SameSign, eq
17
18    SignChanged:                   ; zero-crossing
19             adrk mtrMaxInput      ; point to mtrMaxInput
20             lacl *                ; copy mtrMaxInput into
21    pkInput
22             sbrk mtrMaxInput
23
24             adrk mtrPkInput       ; point to mtrPkInput
25             sacl *                ; update mtrPkInput
26             sbrk mtrPkInput       ; point to meter struct
27
28             ldpk 0
29             lacc TREG0            ; load unmodified input word
30                                   ; with high bit extended
31
32             adrk mtrInput         ; point to mtrInput
33             sacl *
34             sbrk mtrInput         ; point to meter struct
```

```
1              abs
2
3              adrk mtrMaxInput      ; point to mtrMaxInput
4              sacl *                ; start with abs(newSample) as
5    max for the new half-cycle
6              sbrk mtrMaxInput      ;
7
8              b         ProcessPeakLpf
9
10   SameSign:
11             ldpk 0
12             lacc TREG0            ; load unmodified input word
13   w/ sign bit extended
14             adrk mtrInput         ; point to mtrInput
15             sacl *
16             sbrk mtrInput         ; point to meter struct
17
18             abs                   ; get absolute value
19             sacb                  ; and store it in accb
20
21             adrk mtrMaxInput      ; point to mtrMaxInput
22             lacc *                ; load w/ sign bit extended
23             sbrk mtrMaxInput      ;
24
25             abs                   ; get absolute value
26             sbb
27
28             bcnd ProcessPeakLpf,geq
29
30   NewMtrInputMax:
31             lacb
32
33             adrk mtrMaxInput      ; point to mtrMaxInput
```

```
            sacl *           ; substitute the new higher max
            sbrk mtrMaxInput ;

adrk mtrPkInput  ; point to mtrPkInput
            sub  *           ; get target value
            sbrk mtrPkInput  ; point to meter struct bcnd ProcessPeakLpf,leq NewPkInput:
            lacb
            adrk mtrPkInput  ; point to mtrPkInput
            sacl *           ; update pkInput immediately, rather than
            sbrk mtrPkInput  ; waiting for a zero crossing ProcessPeakLpf:

adrk mtrPeak     ; point to mtrPeak
            lacc *           ; get current value
            sbrk mtrPeak
            sacb             ; target in acc, mtrPeak in accb adrk mtrPkInput  ; point to mtrPkInput
            lacl *           ; get target value
            sbrk mtrPkInput  ; waiting for a zero crossing sbb              ; subtract mtrPeak from target level
            bcnd MtrPeakFalling,lt
```

```
1              bcnd  MtrPeakRising,gt
2
3   MtrPeakSame:
4              adrk  mtrPeak        ; point to mtrPeak
5              lacl  *              ; get current value
6              sbrk  mtrPeak
7              b     MtrPeakDone
8
9   MtrPeakFalling:
10             adrk  mtrFallTime
11             lt    *
12             sbrk  mtrFallTime
13
14             adrk  mtrPkInput
15             mpy   **
16             sbrk  mtrPkInput
17
18             pac
19
20             adrk  mtrFallTimeInv
21             lt    *
22             sbrk  mtrFallTimeInv
23
24             adrk  mtrPeak        ; point to mtrPeak
25             mpy   *              ; multiply by current value
26             apac
27             bsar  15
28             sacl  *
29             sbrk  mtrPeak
30
31             b     MtrPeakDone
32
33  MtrPeakRising:
34             adrk  mtrRiseTime    ; point to mtrPeak
```

```
1               lt      *
2               sbrk mtrRiseTime
3
4               adrk mtrPkInput     ; point to mtrPkInput
5               mpy     *
6               sbrk mtrPkInput
7
8               pac
9
10              adrk mtrRiseTimeInv ; point to mtrPeak
11              lt      *
12              sbrk mtrRiseTimeInv
13
14              adrk mtrPeak        ; point to mtrPkInput
15              mpy     *
16              apac
17              bsar 15
18              sacl *
19              sbrk mtrPeak
20
21   MtrPeakDone:
22   * transform peak (currently in HexdB) into dB
23              call _aHexdB2dB     ; trashes accb, arp, ar3, and
24   TREG0
25
26   *          store the level (in dB) into the level field of
27   the meter struct
28
29              larp ar3
30              adrk mtrLevel
31              sacl *
32              sacb
33              sbrk mtrLevel
34
```

```
1    * check for max level since startup
2             lacb
3             adrk mtrMaxLevel
4             sub     *
5             sbrk mtrMaxLevel
6
7             bcnd MeterDone,geq   ; branch if current level is
8    not higher than maxLevel
9                                  ; in this case, remember that
10   a minus sign is implicit
11                                 ; in the levels: i.e. 0 is
12   greater than (minus)3.
13                                 ; (minus) 6 is greater than
14   (minus) 12, etc
15            lacb
16            adrk mtrMaxLevel     ; switch in new max level
17            sacl *
18            sbrk mtrMaxLevel
19
20   MeterDone:
21            ret
22
23   ;// Module: Isr.a
24   ;//
25   ;// Assembly language Interrupt Service Routines
26   ;//
27   ;// Rev 1.0    18 Nov 1994    DTR
28   ;//            Initial revision.
29   ;//
30   ;//
31   ;#ifdef Copyrights
32   ;static char copyrightNotice[] = "Copyright (c)1994, JABRA
33   Corporation";
34   ;#endif // Copyrights
```

```
1              .include aglobals.i
2              .include qmacros.i
3
4              .text
5
6    ; the bit code used by the BIT instruction, contrary to
7    normal usage
8    bit0       .set 0Fh
9
10   ; declare ports 4, 5, and 6 using macros
11             inx       4
12             outx 5
13             outx 6
14
15   * declare biquad filters using macros
16             biquadFilter   0    ;DTMF
17             biquadFilter   1    ;DTMF
18             biquadFilter   2    ;DTMF
19             biquadFilter   3    ;DTMF
20             biquadFilter   4    ;DTMF
21             biquadFilter   5    ;DTMF
22             biquadFilter   6    ;DTMF
23
24             biquadFilter   20   ;Audio, mic mtr
25             biquadFilter   21   ;Audio, mic signal
26             biquadFilter   22   ;Audio, spk mtr
27             biquadFilter   23   ;Audio, spk signal
28
29   ISRrelay:                     ; this is allocated in ROM
30
31             b         SerialRcvIsr
32
33
34             .sect     ".cpyrite"
```

```
1
2                  ; one letter for each rom (hi and lo)
3                  ; results in a full copyright notice on each rom
4                  .string    "CCooppyyrriigghhtt
5       ((cc))11999944,,11999955,,   JJAABBRRAA
6       CCoorrppoorraattiioonn"
7
8
9       _FifoBufferSize      .set 64
10
11      _micInFifoQ                 .usect".fifo",_FifoBufferSize
12      _micOutFifoQ         .usect    ".fifo",_FifoBufferSize
13      _spkInFifoQ                 .usect".fifo",_FifoBufferSize
14      _spkOutFifoQ         .usect    ".fifo",_FifoBufferSize
15
16      _usMicInFifoHead     .usect    ".fifo2",1
17      _usMicInFifoTail     .usect    ".fifo2",1
18      _usMicInFifoCnt             .usect".fifo2",1
19      _usMicInFifoSize     .usect    ".fifo2",1
20      _usMicInFifoMask     .usect    ".fifo2",1
21      _usMicInFifoDelay    .usect    ".fifo2",1
22
23      _usMicOutFifoHead    .usect    ".fifo2",1
24      _usMicOutFifoTail    .usect    ".fifo2",1
25      _usMicOutFifoCnt     .usect    ".fifo2",1
26      _usMicOutFifoSize    .usect    ".fifo2",1
27      _usMicOutFifoMask    .usect    ".fifo2",1
28      _usMicOutFifoDelay   .usect    ".fifo2",1
29
30      _usSpkInFifoHead     .usect    ".fifo2",1
31      _usSpkInFifoTail     .usect    ".fifo2",1
32      _usSpkInFifoCnt             .usect".fifo2",1
33      _usSpkInFifoSize     .usect    ".fifo2",1
34      _usSpkInFifoMask     .usect    ".fifo2",1
```

```
1    _usSpkInFifoDelay    .usect    ".fifo2",1
2
3    _usSpkOutFifoHead    .usect    ".fifo2",1
4    _usSpkOutFifoTail    .usect    ".fifo2",1
5    _usSpkOutFifoCnt     .usect    ".fifo2",1
6    _usSpkOutFifoSize    .usect    ".fifo2",1
7    _usSpkOutFifoMask    .usect    ".fifo2",1
8    _usSpkOutFifoDelay   .usect    ".fifo2",1
9
10   _hiRamArea               .usect".hiRam",(0080h-18h);
11   allocate the remainder of the page
12                                   ; that's left over after
13   .fifo2 is allocated
14
15
16
17   _dBTableSize         .set 91
18
19   _dummy               .usect    ".dummy",1
20
21          .if    RamRun
22                 .sect    ".ramcode"
23                 .label   _ram_load; isr.a is the first file
24   to be linked in
25                                   ; therefore this location will
26   be the first location
27                                   ; in .ramcode
28          .else
29                 .sect    ".ramcode"
30                 .label   _ram_load
31                    NOP
32                    NOP
33                 .text
34          .endif
```

```
1      ****************************************************************
2      ******
3      ****************************************************************
4      ******
5      SerialRcvIsr:
6
7      ******************** Microphone Processing
8      ********************
9      GetIsrTime:
10             lamm    TIM              ; get the current timing count
11             sacb                     ; and put it into accb
12
13     CheckIsrTiming:
14             ldpk    _xcommonLastTime
15             lacl    _xcommonLastTime ; get the time when we were
16     last here
17             lt      _xcommonLastTime ; and get that value in
18     T also
19             exar
20             sacl    _xcommonLastTime ; store current TIM value
21             exar
22             sbb                      ; subtract new value (accb)
23     from previous value (acc)
24             bcnd    StoreRegs,lt     ; don't store a value if
25     rollover occurred
26
27     NoRollover:
28             ldpk    _xcommonPeriod
29             sacl    _xcommonPeriod
30
31     StoreRegs:
32             smmr    AR3,_tempAR3
33             smmr    AR4,_tempAR4
34
```

100

```
1    MicrophoneInput:
2
3            lamm DRR
4            and      #0fff8h   ; get the input data from
5    codec 1
6
7            call _MixMic0SndOut ; mix in next sound out value
8
9    CheckMicMode:
10           ldpk _micMode      ; point to the mic channel
11   mode switch
12           cpl      #0,_micMode; set tc bit if muting is
13   engaged
14
15           bcnd CheckMicThruMode,ntc; continue processing if
16   muting not engaged
17
18   MicMuteMode:
19           zac                 ; otherwise zero the
20   accumulator
21           b        MicrophoneOutputMixing; and go mix in
22   the output sound, if any
23
24   CheckMicThruMode:
25           cpl      #1,_micMode
26                              ; pass signal thru with no
27   alteration
28           bcnd MicrophoneOutputMixing,tc; continue
29   processing if remote control not engaged
30
31   MicrophoneOutputMixing:
32           call _MixMicSndOut  ; mix in next sound out value
33
34   MicDone:
```

```
1              and      #0fff8h
2              ldpk     _commonMicAttn
3              or       _commonMicAttn
4              samm DXR              ; output new speech value
5
6      ******************** Speaker Processing
7      *******************
8      SpeakerInput:
9
10             ldpk 0
11             lac      TRCV,16
12             and      #0fff8h,16
13
14             ldpk     _commonLastSpkIn
15             sach     _commonLastSpkIn; store away for ToneDetect
16             sacb
17
18     SpeakerInputGainStage:
19             ldpk     _commonSpkGainPre
20             cpl      #0,_commonSpkGainPre
21             bcnd ScaleSpkInTo16,tc
22                                   ; 6 dB boost
23             addb                  ; add accumulator to itself
24             sacb                  ; and hide it back in accb
25             cpl      #1,_commonSpkGainPre
26             bcnd ScaleSpkInTo16,tc
27                                   ; 6 dB boost
28             addb                  ; add accumulator to itself
29             sacb                  ; and hide it back in accb
30             cpl      #2,_commonSpkGainPre
31             bcnd ScaleSpkInTo16,tc
32                                   ; 6 dB boost
33             addb                  ; add accumulator to itself
34             sacb                  ; and hide it back in accb
```

```
1              cpl       #3,_commonSpkGainPre
2         bcnd ScaleSpkInTo16,tc
3                              ; 6 dB boost
4              addb              ; add accumulator to itself
5
6    ScaleSpkInTo16:
7              bsar 16           ; scale word down to 16 bits
8    for fifo
9
10   CheckSpeakerMode:
11             ldpk _spkMode     ; see if spkMode is Mute
12             cpl       #0,_spkMode; set tc bit if muting is
13   engaged
14
15             bcnd CheckSpkThruMode,ntc; continue processing if
16   muting not engaged
17
18   SpkMuteMode:
19             zac               ; otherwise zero the
20   accumulator
21             b         SpeakerOutputGainStage; and go mix in
22   the output sound, if any
23
24   CheckSpkThruMode:
25             cpl       #1,_spkMode
26                              ; pass signal thru with no
27   alteration
28             bcnd SpeakerOutputGainStage,tc; continue
29   processing if remote control not engaged
30
31   SpeakerOutputGainStage:
32   * shift signal from lo to hi word of acc
33             samm TREG0        ; move speech data to T reg
34             ldpk 0
```

```
1          lacc TREG0,16      ; get 16 bit data into high
2   word of acc
3
4          sacb               ; hide audio word in accb
5
6          ldpk _commonSpkGainPost
7          cpl     #0,_commonSpkGainPost
8          bcnd ScaleSpkOutTo16,tc
9                             ; 6 db boost
10         addb               ; add accumulator to itself
11         sacb               ; and hide it back in accb
12
13         cpl     #1,_commonSpkGainPost
14         bcnd ScaleSpkOutTo16,tc
15                            ; 6 db boost
16         addb               ; add accumulator to itself
17         sacb               ; and hide it back in accb
18
19         cpl     #2,_commonSpkGainPost
20         bcnd ScaleSpkOutTo16,tc
21                            ; 6 db boost
22         addb               ; add accumulator to itself
23         sacb               ; and hide it back in accb
24
25         cpl     #3,_commonSpkGainPost
26         bcnd ScaleSpkOutTo16,tc
27                            ; 6 db boost
28         addb               ; add accumulator to itself
29         sacb               ; and hide it back in accb
30
31  ScaleSpkOutTo16:
32         bsar 16            ; scale word down to 16 bits
33  for fifo
34
```

```
1    SpeakerOutputMixing:
2            call  _MixSpkSndOut   ; mix in next sound out value
3
4    SpeakerControl:
5            and       #0fff8h
6            ldpk _commonSpkAttn
7            or        _commonSpkAttn
8            samm TDXR              ; output new speech value
9
10   ******************* Dtmf Stuff *******************
11           ldpk _commonLastSpkIn
12           lacc _commonLastSpkIn,16; tone detect likes to see
13   a 32-bit argument
14
15   DtmfGainStage:
16           sacb
17           ldpk _commonDtmfGainPre
18           cpl       #0,_commonDtmfGainPre
19           bcnd HandleDtmf,tc
20                                  ; 6 dB boost
21           addb                   ; add accumulator to itself
22           sacb                   ; and hide it back in accb
23
24           cpl       #1,_commonDtmfGainPre
25           bcnd HandleDtmf,tc
26                                  ; 6 dB boost
27           addb                   ; add accumulator to itself
28           sacb                   ; and hide it back in accb
29
30           cpl       #2,_commonDtmfGainPre
31           bcnd HandleDtmf,tc
32
33           addb                   ; add accumulator to itself
34           sacb                   ; and hide it back in accb
```

```
            cpl       #3,_commonDtmfGainPre
            bcnd HandleDtmf,tc
                                ; 6 dB boost
            addb                ; add accumulator to itself
            sacb                ; and hide it back in accb HandleDtmf:
            ldpk _remoteControl
            cpl       #1,_remoteControl; are we in full dtmf detection?
            bcnd HandleToneDetect,ntc HandleRemoteControl:
            bsar 16             ; scale word down to 16 bits for fifo
            call _EnqSpkIn      ; and set it off to the upper level
            b         IncNumIrqs HandleToneDetect:
            call ToneDetect     ; otherwise process it right here

******************** System Stuff ******************

IncNumIrqs:
            lack #1
            ldpk _numIrqs
            add       _numIrqs
            sacl _numIrqs RestoreRegs:
            lmmr AR3,_tempAR3
            lmmr AR4,_tempAR4
```

```
1    TimeInterrupt:
2            lamm TIM            ; get the current timing count
3            sacb                ; and put it into accb
4
5            ldpk _xcommonLastTime
6            lacl _xcommonLastTime; get the time when we were
7    the head of the interrupt
8            lt          _xcommonLastTime; and get that value in
9    T also
10           sbb                 ; subtract new value (accb)
11   from previous value (acc)
12           bcnd IsrDone,lt     ; don't store a value if
13   rollover occurred
14
15   NoTimeRollover:
16           sacb
17
18           .if Sim
19           ldpk _xcommonThisIsr
20           sacl _xcommonThisIsr
21           .endif
22
23   CheckLongestIsr:
24           ldpk _xcommonLongestIsr
25           sub       _xcommonLongestIsr
26           bcnd CheckShortestIsr,leq
27
28   NewLongestIsr:
29           lacb
30           sacl _xcommonLongestIsr
31           b         IsrDone
32
33   CheckShortestIsr:
34           lacb
```

```
1               ldpk  _xcommonShortestIsr
2               sub         _xcommonShortestIsr
3               bcnd  IsrDone,geq
4
5       NewShortestIsr:
6               lacb
7               sacl  _xcommonShortestIsr
8
9       IsrDone:
10              larp 1                    ; set back to system standard
11              rete
12
13      ****************************************************************
14      ******
15      ********************* The Sound Mixing Routines
16      ******************
17      ****************************************************************
18      ******
19
20
21              .text
22
23      _MixMicSndOut
24      ; receives a data word to mix sound with in acc
25      ; returns a new data word with the sound mixed in if on,
26      ; or with the same data word passed in, if sound off
27
28      ; sound playback is setup to play back 8k sounds
29      ; so set the sample rate to 8k before playing sounds
30
31              sacb                      ; store acc in accb for a
32      while
33              ldpk  _micSndPtr
34              lacl  _micSndPtr
```

```
            bcnd  ReturnMicZero,eq; is there a sound to play?

ldpk  0
            tblr  TREG0         ; copy the word from program
memory at _sndStart to _sndTemp add       #1        ; point to next snd word
            ldpk  _micSndPtr
            sacl  _micSndPtr ChkMicSndEnd:
            ldpk  _micSndEnd
            lacc  _micSndEnd
            ldpk  _micSndPtr
            sub       _micSndPtr
            bcnd  ReturnMicMixed,neq; is the sound finished
   playing?

ChkMicSndLoops:
            ldpk  _micSndNumLoops; now we're at the end of the
   sound
            lacc  _micSndNumLoops; see if we need to loop
            bcnd  StopMicSnd,eq sub       #1
            sacl  _micSndNumLoops; decrement the loop count ResetMicSndLoop:
            ldpk  _micSndStart   ; loop points are the start
   and end of sound
            lacl  _micSndStart
            ldpk  _micSndPtr     ; reset pointer to start of
   sound
            sacl  _micSndPtr
```

```
            b          ReturnMicMixed

StopMicSnd:
        zac
        ldpk    _micSndStart
        sacl    _micSndStart    ; zero out sound parameters
        ldpk    _micSndPtr      ; so sound won't play next time
        sacl    _micSndPtr
        ldpk    _micSndEnd      ; looped sounds will never get to this point
        sacl    _micSndEnd ReturnMicZero:
        lacb                    ; put accb back into acc, no mixing
        ret ReturnMicMixed:
        ldpk    _micSndLevel    ; multiply speech data (already in TREG0)
        mpy     _micSndLevel;   by playback level
        pac                     ; move product into accumulator
        bsar    15              ; scale result back into lower word ;       addb                    ; add back the speech to mix with
        ret _MixMic0SndOut
; receives a data word to mix sound with in acc
; returns a new data word with the sound mixed in if on,
```

```
         ; or with the same data word passed in, if sound off

; sound playback is setup to play back 8k sounds
         ; so set the sample rate to 8k before playing sounds sacb                    ; store acc in accb for a
         while
                 ldpk  _mic0SndPtr
                 lacl  _mic0SndPtr
                 bcnd  ReturnMic0Zero,eq; is there a sound to play?

ldpk  0
                 tblr  TREG0             ; copy the word from program
         memory at _sndStart to _sndTemp add   #1                ; point to next snd word
                 ldpk  _mic0SndPtr
                 sacl  _mic0SndPtr ChkMic0SndEnd:
                 ldpk  _mic0SndEnd
                 lacc  _mic0SndEnd
                 ldpk  _mic0SndPtr
                 sub         _mic0SndPtr
                 bcnd  ReturnMic0Mixed,neq; is the sound finished
         playing?

ChkMic0SndLoops:
                 ldpk  _mic0SndNumLoops; now we're at the end of the
         sound
                 lacc  _mic0SndNumLoops; see if we need to loop
                 bcnd  StopMic0Snd,eq sub   #1
```

```
                sacl _mic0SndNumLoops; decrement the loop count

ResetMic0SndLoop:
        ldpk _mic0SndStart   ; loop points are the start
and end of sound
        lacl _mic0SndStart
        ldpk _mic0SndPtr     ; reset pointer to start of
sound
        sacl _mic0SndPtr
        b        ReturnMic0Mixed StopMic0Snd:
        zac
        ldpk _mic0SndStart
        sacl _mic0SndStart   ; zero out sound parameters
        ldpk _mic0SndPtr     ; so sound won't play next
time
        sacl _mic0SndPtr
        ldpk _mic0SndEnd     ; looped sounds will never get
to this point
        sacl _mic0SndEnd ReturnMic0Zero:
        lacb                 ; put accb back into acc, no
mixing
        ret ReturnMic0Mixed:
        ldpk _mic0SndLevel   ; multiply speech data
(already in TREG0)
        mpy      _mic0SndLevel; by playback level
        pac                  ; move product into
accumulator
```

112

```
              bsar 15              ; scale result back into lower word ret

_MixSpkSndOut
; receives a data word to mix sound with in acc
; returns a new data word with the sound mixed in if on,
; or with the same data word passed in, if sound off ; sound playback is setup to play back 8k sounds
; so set the sample rate to 8k before playing sounds sacb                 ; store acc in accb for a while
              ldpk _spkSndPtr
              lacl _spkSndPtr      ; get pointer to next word to play
              bcnd ReturnSpkZero,eq; return if null pointer ldpk 0
              tblr TREG0           ; copy the word from program memory at _sndStart to TREG0 add     #1           ; point to next snd word
              ldpk _spkSndPtr
              sacl _spkSndPtr ChkSpkSndEnd:
              ldpk _spkSndEnd
              lacc _spkSndEnd
              ldpk _spkSndPtr
              sub     _spkSndPtr
```

```
            bcnd ReturnSpkMixed,neq; are we at the end of the
sound

ChkSpkSndLoops:
            ldpk _spkSndNumLoops
            lacc _spkSndNumLoops
            bcnd StopSpkSnd,eq   ; should we loop?

sub         #1
            sacl _spkSndNumLoops; decrement the loop count

ResetSpkSndLoop:
            ldpk _spkSndStart    ; loop points are the start
and end of sound
            lacl _spkSndStart
            ldpk _spkSndPtr      ; reset pointer to start of
sound
            sacl _spkSndPtr
            b           ReturnSpkMixed StopSpkSnd:                      ; stop playing the sound
            lack #0
            ldpk _spkSndStart
            sacl _spkSndStart    ; zero out sound parameters
            ldpk _spkSndPtr      ; so sound won't play next
time
            sacl _spkSndPtr
            ldpk _spkSndEnd      ; looped sounds will never get
to this point
            sacl _spkSndEnd ReturnSpkZero:
            lacb                 ; put accb back into acc, no
mixing
```

```
1              ret
2
3    ReturnSpkMixed:
4              ldpk  _spkSndLevel    ; multiply speech data
5    (already in TREG0)
6              mpy        _spkSndLevel; by playback level
7              pac                    ; move product into
8    accumulator
9              bsar 15                ; scale result back into lower
10   word
11
12             ret
13
14   ******************** End of ISR *****************
15   ;// Module: ProgWrit.a
16   ;//
17   ;// Interrupt vectors in lowest 30h words of C5x program
18   memory.
19   ;//
20   ;// Rev 1.0    11 Nov 1994    DTR
21   ;//        Initial revision.
22   ;//
23   ;//
24   ;#ifdef Copyrights
25   ;static char copyrightNotice[] = "Copyright (c)1994, JABRA
26   Corporation";
27   ;#endif // Copyrights
28   ;
29
30             .tab 4
31             .width    120
32             .length   32767
33
34             .version 50
```

```
1              .mmregs
2
3        **************************************************************
4        *         RAM based code
5        **************************************************************
6              .sect      ".ramcode"
7
8
9        ;/**************************************************************
10       **/
11       ;/*      Copy a page from DATA RAM to PROG ram or flash
12       rom               */
13       ;/**************************************************************
14       **/
15       ;Boolean WritePageToAtmel(short * src, short * dst)
16       ;
17       ;          /* destination is always on 128 byte boundary,
18       since lower 7 bits of dst are ignored */
19       ;          /* src can be anywhere, even on the C run-time
20       stack */
21
22              .global    _WritePageToAtmel
23
24       _WritePageToAtmel:
25              .global    _previousReading;
26              .global    _currentReading;
27              .global    _xorResult;
28
29       PageSize   .set 128              ;
30       PollTimeOut    .set 15000        ;
31       RAM_ON         .set 0010h        ;
32       RAM_MASK   .set (0ffh - RAM_ON);
33
34                                        ;
```

```
1              popd *+           ; generate stack frame and
2    pointers to parameters
3              sar      AR0,*+   ;
4              sar      AR1,*    ;
5              lark AR0,1        ;
6              lar      AR0,*0+  ;
7                                ;
8    WritePrep:                  ;
9                                ;
10             ldp      #0       ;
11             sar      AR1,AR4  ; copy the stack pointer into
12   AR4
13             nop               ;
14             nop               ;
15             mar      *,AR4    ; make AR4 the active address
16   register
17             sbrk 4            ; point to src on stack
18                               ;
19             lar      AR3,*-   ; get ptr to src in AR3
20             lacc *            ; get ptr to dest in accum
21             and      #0FF80h  ; mask out low seven bits
22             sacb              ;
23             dint              ; can only write to ROM from
24   RAM
25                               ;
26
27   ;
28   ; Biquad filter     code
29   ; Tonedetect and Manual  override for moving
30   ; outof   current   operating mode intoremote calibration
31
32             .include aglobals.i
33             .include qmacros.i
34
```

```
1               .sect      ".text"
2
3               .if   RamRun
4                    .sect      ".ramcom"
5               .endif    ; RamRun
6
7    ShortOverrideDuration    .set (700/5); in milliseconds,
8    SW1ON            .set 0dh       ; Bit test (2) for SW1ON in
9    Gate Array.
10   TRM_OFF              .set 0fffdh;
11
12           FbqBiQuadFilter    0; coefficients & states
13   allocated in common section
14           FbqBiQuadFilter    1; coefficients & states
15   allocated in common section
16
17   *************************************************************
18   ******
19   ********************* The Biquad Filter Routine
20   ****************
21   *************************************************************
22   ******
23
24   SAMPLE_BITS              .set 16
25   ENERGY_SCALER_SHIFT .set 6
26
27
28   _bq:
29   ; entry:
30   ;         acc  contains the incoming speech inlower 16
31   bits,,   and   returns    the   outgoing
32   ;         accb contains a     pointerto the biquad structure
33   ;
34   ; returns:
```

```
1    ;          acc  contains result(filtered sample inlow16 bits)
2    ;          accb contains accumulated energy
3    ;          the  biquad structure isupdatedwith the most
4    recent state variables
5    ;          and  energy
6    ;
7    ; in use:
8    ;          ar3  handles    the  coefficients inorder:
9    b2,b1,b0,a2,and a1
10   ;          ar4  handles    the  state variablesin order:
11   x2,x1,y2,y1, and energy
12   ;          · This biquad    filter takes advantage of the fact
13   that       the  coefficients
14   ;          and  state variablesareaccessed inor nearly in
15   order.     One  index register
16   ;          is used    to walk   throughthecoefficients, and a
17   second one is used to walk
18   ;          through    the  state variables. The coefficients
19   and state variables must be
20   ;          contained in a BiQuad struct declared in C.The
21   structure MUST NOT VARY
22   ;
23   ; Trashes
24   ;          acc,accb,ar3,ar4,treg0,arp, spm
25   ;
26   ;struct    BiQuad {
27   ;          short      b2;
28   ;          short      b1;
29   ;          short      b0;
30   ;          short      a2;
31   ;          short      a1;
32   ;          Speech     x2;
33   ;          Speech     x1;
34   ;          Speech     y2;
```

```
1    ;         Speech    y1;
2    ;         long nrg;
3    ;};
4    ;typedef struct   BiQuad BiQuad, * BiQuadPtr;
5
6
7    state_ar4  .set ar4
8    coef_ar3   .set ar3
9
10           exar              ; put inputspeech wordinto
11   accb
12
13           samm coef_ar3     ; this generates a pipeline
14   warning, ignore    it
15           larp coef_ar3
16           nop
17           cpl       #0,*
18           bcnd SetUpStatePtr,ntc; filter ison,becauseb2
19   (1st    coeff) isn't zero
20
21           zac               ; return w/input speech word
22   in acc
23           exar              ; and zero energy in accb
24           b         BqDone
25
26   SetUpStatePtr:
27           samm state_ar4    ; this generates a pipeline
28   warning, ignore    it
29           larp state_ar4
30           nop
31           adrk 5            ; the states are after coeffs,
32   which are 5 words long
33
34   ;                          A= b2 * x2;
```

120

```
1   A__eq_b2_X_x2:
2           lt      *+,coef_ar3; x2afterwards state_ar4->x1,
3   ARP =   coef_ar3
4           mpy     *+,state_ar4; *b2afterwards
5   coef_ar3->b1, ARP =     state_ar4
6           pac
7       ;                   A  += b1 * x1;
8   A__pl_eq_b1_X_x1:
9           lt      *,coef_ar3; x1afterwards state_ar4->x1,
10  ARP =   coef_ar3
11          mpy     *+,state_ar4; *b1afterwards
12  coef_ar3->b0, ARP =     state_ar4
13          apac
14
15      ;                   x2= x1;
16      ;                   x1= *(input++);
17  x1__eq_speech:
18          exar            ; stashA in accb, get speech
19  input   in acc
20          sacl *-          ; x1 = inputafterwards
21  state_ar4->x2, ARP =    state_ar4
22
23  x2_eq_x1:
24          lamm TREG0      ; we still havetheoldx1 in the
25  T       reg, so  we use it
26          sacl *+         ; x2 = x1afterwards
27  state_ar4->x1, ARP =    state_ar4
28          lacb            ; get Aback into acc
29
30      ;                   A  += b0 * x1;
31  A__pl_eq_b0_X_x1:
32          lt      *+,coef_ar3; x1afterwards state_ar4->y2,
33  ARP =   coef_ar3
```

121

```
           mpy       *+,state_ar4;   *b0afterwards
coef_ar3->a2, ARP =     state_ar4
           apac
;                               A   -= a2 * y2;
A__mi_eq_a2_X_y2:
           lt        *+,coef_ar3;  y2afterwards state_ar4->y1,
ARP =     coef_ar3
           mpy       *+,state_ar4;   *a2afterwards
coef_ar3->a1, ARP =     state_ar4
           spac
;                               A   -= a1 * y1;
A__mi_eq_a1_X_y1:
           lt        *,coef_ar3;  y1afterwards state_ar4->y1,
ARP =     coef_ar3
           mpy       *,state_ar4;   *a1afterwards coef_ar3->a1,
ARP =     state_ar4
           spac
;                               A   += 8192;
           addk #8192
;                               A >>= (SAMPLE_BITS-2);
           bsar SAMPLE_BITS-2
;                               y2= y1;
;                               y1= A;
y1_eq_A_:
           sacl *-            ; firststore accumA in y1
afterwards state_ar4->y2, ARP =coef_ar3
           sacb               ; and storeA in accb as well y2_eq_old_y1:
           lamm TREG0         ; then store old y1(from
treg0) in y2
           sacl *+            ; then point toy1 again,
which     is equal to      A
           mar       *+       ; now pointto low wordof nrg
```

```
            mar     *+          ; now pointto highword ofnrg lacc *-,16          ; get high wordin acc,point to
    low word
            adds *-             ; add in low word, point back
    to y1    (A)

;           A     *=    A;
            spm     3           ; shiftPREG >>6 when adding to
    ACC
            zpr                 ; zero the product registerso
    nothing is accumulated
            sqra *+             ; get y1 again (A) and load
    into TREG0,   sqr, result   in preg ;           A     >>=   ENERGY_SCALER_SHIFT;
    ;           energy  +=  A;
            apac
            sacl *+             ; storethelowword ofnrg
            sach *              ; storethehigh word of nrg exar                ; return w/result in acc
                                ; and energy inaccb
    BqDone:
            spm     0           ; set PREG auto-shift back to
    none
            ret ;***********************************************************
    ****;
    _fbq:

;       acc contains the incoming speech, and returns the
    outgoing
```

```
1     ;         accb contains a      pointerto the biquad structure
2     ;         in use,
3     ;         ar3  handles    the  coefficients inorder:
4     b2,b1,b0,a2,and a1
5     ;         ar4  handles    the  state variablesin order:
6     x2,x1,y2,y1, and energy
7     ;         This biquad     filter takes advantage of the fact
8     that      the  coefficients
9     ;         and  state variablesareaccessed inor nearly in
10    order.    One  index register
11    ;         is used    to walk    throughthecoefficients, and a
12    second one is used to walk
13    ;         through   the  state variables. The coefficients
14    and state variables must be
15    ;         contained in a BiQuad struct declared in C.The
16    structure MUST NOT VARY
17    ;
18    ;struct   BiQuad {
19    ;         short      b2;
20    ;         short      b1;
21    ;         short      b0;
22    ;         short      a2;
23    ;         short      a1;
24    ;         Speech     x2;
25    ;         Speech     x1;
26    ;         Speech     y2;
27    ;         Speech     y1;
28    ;         long nrg;
29    ;};
30    ;typedef struct    BiQuad BiQuad, * BiQuadPtr;
31
32    SAMPLE_BITS               .set 16
33    ENERGY_SCALER_SHIFT .set 6
34
```

```
1    state_ar4  .set  ar4
2    coef_ar3   .set  ar3
3
4             exar
5             samm  state_ar4       ; this generates a pipeline
6    warning, ignore     it
7             samm  coef_ar3        ; this generates a pipeline
8    warning, ignore     it
9             mar         *,state_ar4
10            adrk  5               ; the states are after coeffs,
11   which are 5 words long
12
13   ;                               A= b2 * x2;
14   ;A__eq_b2_X_x2:
15            lt          *+,coef_ar3; x2afterwards state_ar4->x1,
16   ARP =    coef_ar3
17            mpy         *+,state_ar4; *b2afterwards
18   coef_ar3->b1, ARP =     state_ar4
19            pac
20   ;                               A  += b1 * x1;
21   ;A__pl_eq_b1_X_x1:
22            lt          *,coef_ar3; x1afterwards state_ar4->x1,
23   ARP =    coef_ar3
24            mpy         *+,state_ar4; *b1afterwards
25   coef_ar3->b0, ARP =     state_ar4
26            apac
27
28   ;                               x2= x1;
29   ;                               x1= *(input++);
30   ;x1__eq_speech:
31            exar                   ; stashA in accb, get speech
32   input    in acc
33            sach  *-               ; x1 = inputafterwards
34   state_ar4->x2, ARP =    state_ar4
```

125

```
 1   ;x2_eq_x1:
 2           lamm    TREG0           ; we still havetheoldx1 in the
 3   T       reg, so   we use it
 4           sacl    *+              ; x2 = x1afterwards
 5   state_ar4->x1, ARP =    state_ar4
 6           lacb                    ; get Aback into acc
 7
 8   ;                               A  += b0 * x1;
 9   ;A__pl_eq_b0_X_x1:
10           lt      *+,coef_ar3; x1afterwards state_ar4->y2,
11   ARP =   coef_ar3
12           mpy     *+,state_ar4; *b0afterwards
13   coef_ar3->a2, ARP =     state_ar4
14           apac
15   ;                               A  -= a2 * y2;
16   ;A__mi_eq_a2_X_y2:
17           lt      *+,coef_ar3; y2afterwards state_ar4->y1,
18   ARP =   coef_ar3
19           mpy     *+,state_ar4; *a2afterwards
20   coef_ar3->a1, ARP =     state_ar4
21           spac
22   ;                               A  -= a1 * y1;
23   ;A__mi_eq_a1_X_y1:
24           lt      *,coef_ar3; y1afterwards state_ar4->y1,
25   ARP =   coef_ar3
26           mpy     *,state_ar4; *a1afterwards coef_ar3->a1,
27   ARP =   state_ar4
28           spac
29   ;                               A  += 8192;
30           addk    #8192
31   ;                               A  >>= (SAMPLE_BITS-2);
32           bsar    SAMPLE_BITS-2
33   ;                               y2= y1;
34   ;                               y1= A;
```

```
;y1_eq_A_:
        sacl *-              ; firststore accumA in y1 afterwards state_ar4->y2, ARP =coef_ar3
        sacb                 ; and storeA in accb as well ;y2_eq_old_y1:
        lamm TREG0           ; then store old y1(from treg0) in y2
        sacl *+              ; then point toy1 again, which    is equal to    A
        mar       *+         ; now pointto low wordof nrg
        mar       *+         ; now pointto highword ofnrg lacc *-,16           ; get high wordin acc,point to low word
        adds *-              ; add in low word, point back to y1    (A)

;         A    *=    A;
        spm       3          ; shiftPREG >>6 when adding to ACC
        zpr                  ; zero the product registerso nothing is accumulated
        sqra *+              ; get y1 again (A) and load into TREG0,    sqr, result    in preg ;         A    >>=    ENERGY_SCALER_SHIFT;
;              energy    +=    A;
        apac
        sacl *+              ; storethelowword ofnrg
        sach *-              ; storethehigh word of nrg and point back    to low word
        mar       *-         ; pointback toy1 (A)
```

```
1           lacc *,16           ; get result from y1, shifted
2  into high word of    acc
3           spm       0
4           ret
5
6  ****************************************************************
7  **********
8  ;-----------------------------------;
9  ****************************************************************
10 **********
11 _ModeInOutB          .set 0    ;
12 _ModeNC2             .set 1    ;
13 _ModeDynamics        .set 2    ;
14
15 ToneDetect:
16           sacb                ; speech word is inhigh word
17 of acc, store   it
18
19           ldpk _commonOverrideEnable
20           lacl _commonOverrideEnable
21           bcnd BailOut,eq
22
23           lacb
24           ldpk _commonLastSpkIn
25           sach _commonLastSpkIn; storethehigh word
26
27           smmr AR3,_commonTempAR3
28           smmr AR4,_commonTempAR4
29
30                               ; storeincoming mic samplein
31 acc (already    shifted    into hiword)
32           lacc #_fbqfilter0   ; pointto filter data w/ accb
33           exar                ; get signal word back in acc
34           call _fbq           ; call the filter routine
```

```
1              ldpk  _commonLastSpkIn
2              lacc  _commonLastSpkIn,16
3              sacb
4                                       ; storeincoming mic samplein
5    acc (already   shifted   into hiword)
6              lacc #_fbqfilter1    ; pointto filter data w/ accb
7              exar                 ; get signal word back in acc
8              call _fbq            ; call the filter routine
9
10             ldpk _commonDummyLoad
11             rpt       _commonDummyLoad
12                 nop
13
14   ;         uncomment this line to remove tone detect spike
15   but       keep constant load
16   ;         b         RResetEnergyAndExit
17
18             ldpk _commonOverrideCount
19             lacl _commonOverrideCount
20             add      #1
21             sacl _commonOverrideCount
22
23             sub      #40
24             bcnd ExitToneDetect,leq
25
26   ; we come here every 5 ms to look at the accumulated energy
27
28             ldpk _commonShortOverrideTimeOut
29             lacc _commonShortOverrideTimeOut
30             bcnd AlreadyTimedOut,eq
31
32             sub      #1        ; subtract until wegetto zero,
33   then stop
34             sacl _commonShortOverrideTimeOut
```

```
AlreadyTimedOut:
        ldpk    _commonOverrideThreshold
        lt      _commonOverrideThreshold
        mpy     _commonOverrideThreshold; square the threshold
        pac
        sacb ldpk 1+_fbq0nrg
        lacc 1+_fbq0nrg,16   ; get high wordin acc
        ldpk _fbq0nrg
        adds _fbq0nrg        ; add in low word sbb                  ; compare nrg with threshold
        bcnd ResetAndExit,lt; branch if commonOverrideThreshold > fbq0nrg ldpk 1+_fbq1nrg
        lacc 1+_fbq1nrg,16   ; get high wordin acc
        ldpk _fbq1nrg
        adds _fbq1nrg        ; add in low word sbb                  ; compare nrg with threshold
        bcnd ResetAndExit,lt; branch if commonOverrideThreshold > fbq1nrg ; we only get to here if both filters have accumulated energy
; greater than the overrideThreshold PoundDetected:
        ldpk _commonShortOverrideTimeOut; see if it's only been a short time since lastoverride
        lacc _commonShortOverrideTimeOut
```

```
1               bcnd UseShortDuration,eq
2
3               ldpk _commonOverrideTime; use the standard
4    override  time
5               lacl _commonOverrideTime
6               sacb
7               b       CompareDuration
8
9    UseShortDuration:
10              lack #ShortOverrideDuration; use the shorter
11   duration if it's only   been a short time sincelast setting
12              sacb
13
14   CompareDuration:
15              ldpk _commonOverrideDuration; incrementthecurrent
16   duration
17              lacl _commonOverrideDuration
18              add      #1
19              sacl _commonOverrideDuration
20
21              sbb                  ; see if the duration (in acc)
22   exceeds the required   time (in accb)
23              bcnd ResetEnergyAndExit,lt; set the filter's
24   accumulated energy back to zero and keepon going
25
26   OverrideDetected:            ; both bands have exceeded the
27   threshold for the requisite time
28              ldpk _commonDtmfAtWarmBoot
29              splk #1,_commonDtmfAtWarmBoot; set flag to True
30
31              ldpk 1+_fbq0nrg     ; pointto filter 0accumulated
32   energy
33              lacc 1+_fbq0nrg,16  ; get high wordin acc
```

131

```
1           ldpk  _fbq0nrg         ; pointto filter 0accumulated
2    energy
3           adds  _fbq0nrg         ; add in low word
4           ldpk  1+_commonLastFbq0Nrg
5           sach  1+_commonLastFbq0Nrg; storehigh word
6           ldpk  _commonLastFbq0Nrg
7           sacl  _commonLastFbq0Nrg; storelowword
8
9           ldpk  1+_fbq1nrg       ; pointto filter 0accumulated
10   energy
11          lacc  1+_fbq1nrg,16    ; get high wordin acc
12          ldpk  _fbq1nrg         ; pointto filter 0accumulated
13   energy
14          adds  _fbq1nrg         ; add in low word
15          ldpk  1+_commonLastFbq1Nrg
16          sach  1+_commonLastFbq1Nrg; storehigh word
17          ldpk  _commonLastFbq1Nrg
18          sacl  _commonLastFbq1Nrg; storelowword
19
20          b     ResetEnergyAndExit; now we wait until
21   silence to reboot
22
23   ResetAndExit:
24          ldpk  _commonDtmfAtWarmBoot; see if override was
25   triggered during
26          lacc  _commonDtmfAtWarmBoot; previous tone
27          bcnd  ContinueReset,eq
28
29          ldpk  _commonOperatingMode
30          lacc  _commonOperatingMode
31          sub   #_ModeNC2
32          bcnd  DynamicsReset,neq
33
34   NC2Reset:
```

```
1              apl     #TRM_OFF,PMST; make sureTRMbitis off
2              b       _c_int0   ; warm bootif we're inNC2
3
4    DynamicsReset:
5              ldpk _overrideDetected; no reboot
6              lacc #1
7              sacl _overrideDetected
8
9    ContinueReset:
10             zac
11             ldpk _commonOverrideDuration
12             sacl _commonOverrideDuration; resetduration, in
13   units of 5     milliseconds
14
15   ResetEnergyAndExit:
16             zac
17             ldpk _commonOverrideCount
18             sacl _commonOverrideCount; resetcounter
19
20             ldpk _fbq0nrg
21             sacl _fbq0nrg
22             ldpk _fbq0nrg+1
23             sacl _fbq0nrg+1       ; resetaccumulatedenergy
24
25             ldpk _fbq1nrg
26             sacl _fbq1nrg
27             ldpk _fbq1nrg+1
28             sacl _fbq1nrg+1       ; resetaccumulatedenergy
29
30   ExitToneDetect:
31             lmmr AR3,_commonTempAR3
32             lmmr AR4,_commonTempAR4
33
34   BailOut:
```

133

```
1               ldpk 0              ; put DP back like NC2 likes
2       it
3
4               ret
5       ;--------------------------------;
6       ;--------------------------------;
7       ManOverrideDetect:          ;
8               smmr AR3,_commonTempAR3;
9               larp AR3            ;
10              lrlk AR3,_commonManOverrideTime;
11              lacc *              ;
12              add     #1          ;
13              sacl *              ; incrementtime
14              sub     #0ffffh     ; if weareat ffffie approx 8s
15      then reset
16              bcnd TEST_SWITCH,NEQ;
17                                  ;
18      RESET_OVER:                 ;
19              zac                 ; zero overridetimeand
20              sacl *              ; overridecount
21              lrlk AR3,_commonManOverrideCount;
22              sacl *              ;
23                                  ;
24      TEST_SWITCH:                ;
25
26              bit     PA4,SW1ON   ; Test SW1ON statusin Gate
27      Array (bit 2).
28              bcnd SWITCH_IN,TC   ; Switch down then branch
29
30      SWITCH_OUT:                 ;
31              lrlk AR3,_commonSwitchIn;
32              lacc *              ;
33              bcnd NO_CHANGE,EQ   ;
34
```

```
1               zac                     ;
2               sacl *                  ; resetswitchin
3               b       NO_CHANGE       ; exittheswitch is off
4
5    SWITCH_IN:                         ;
6               lrlk AR3,_commonSwitchIn;
7               lacc *                  ;
8               bcnd NO_CHANGE,NEQ      ;
9
10              lacc #1                 ;
11              sacl *                  ; resetswitchin
12                                      ; incrementcounters
13              lrlk AR3,_commonManOverrideCount;
14              lacc *                  ;
15              add     #1              ;
16              sacl *                  ;
17              sub     #1              ;
18              bcnd NO_SYNC,GT         ; Don'trestarttheclock
19
20              lrlk AR3,_commonManOverrideTime;   if counter
21   bigger than one
22              zac                     ;
23              sacl *                  ;
24
25   NO_SYNC:                           ;
26              lrlk AR3,_commonManOverrideCount;
27              lacc *                  ;
28              .if     Lab             ;
29              sub     #3              ;
30              .else                   ;
31              sub     #6              ;
32              .endif                  ;
33              bcnd NO_CHANGE,LT       ;
34
```

```
1              lacc #1
2              lrlk AR3,_commonDtmfAtWarmBoot;
3              sacl *              ;
4              apl     #TRM_OFF,PMST; make suretrmbitis OFF
5              b       _c_int0  ; warm bootif we're inNC2
6
7   NO_CHANGE:                      ;
8              lmmr AR3,_commonTempAR3;
9              ret                  ;
10  ;--------------------------------; end of manualoverride
11  detect
12  ;
13  ; DTMF tone generation
14  ;
15             .global    _Dtmf0Start
16             .global    _Dtmf0End
17             .global    _Dtmf1Start
18             .global    _Dtmf1End
19             .global    _Dtmf2Start
20             .global    _Dtmf2End
21             .global    _Dtmf3Start
22             .global    _Dtmf3End
23             .global    _Dtmf4Start
24             .global    _Dtmf4End
25             .global    _Dtmf5Start
26             .global    _Dtmf5End
27             .global    _Dtmf6Start
28             .global    _Dtmf6End
29             .global    _Dtmf7Start
30             .global    _Dtmf7End
31             .global    _Dtmf8Start
32             .global    _Dtmf8End
33             .global    _Dtmf9Start
34             .global    _Dtmf9End
```

```
1               .global    _DtmfStarStart
2               .global    _DtmfStarEnd
3               .global    _DtmfPoundStart
4               .global    _DtmfPoundEnd
5
6    SaveRomSpace    .set 1    ; leave out star and pound tones to
7    save space
8
9    _Dtmf1Start
10            .word    00000h, 00000h, 00000h, 00000h, 00020h,
11   0fe1ah, 0f809h, 0f1eah    ;       7
12            .word    00430h, 0389ch, 04f9ch, 01222h, 0bd1ah,
13   09064h, 09c07h, 0df5eh    ;4      15
14            .word    01ce8h, 02efch, 02330h, 012e3h, 02490h,
15   04aafh, 05d94h, 03ba0h    ;12     23
16            .word    0e7d3h, 097ebh, 08002h, 0aea0h, 0fa34h,
17   038e8h, 04965h, 029d7h    ;       31
18            .word    005b3h, 0fbedh, 00a90h, 01292h, 0f73fh,
19   0c203h, 09e2ch, 0af7eh    ;28     39
20            .word    0f12dh, 03d54h, 06cc5h, 05df5h, 019c6h,
21   0db81h, 0c4c6h, 0d8f9h    ;       47
22            .word    0f70ch, 0f9c5h, 0e711h, 0d9bfh, 0f36dh,
23   03213h, 06d7fh, 07629h    ;       55
24            .word    03796h, 0dab8h, 09713h, 0928eh, 0c74eh,
25   004c8h, 02257h, 019bfh    ;       63
26            .word    0087dh, 00dach, 02c4ch, 04407h, 02fdbh,
27   0ee1ch, 0a4a6h, 0878ah    ;       71
28            .word    0ad41h, 0f8ffh, 03d72h, 05803h, 03b89h,
29   00bdbh, 0f58dh, 0fe24h    ;       79
30            .word    00d10h, 00154h, 0d73eh, 0b10eh, 0b823h,
31   0f359h, 0401ch, 073c6h    ;       87
32            .word    0698fh, 0223fh, 0d606h, 0b29ch, 0c171h,
33   0e9a5h, 0fc08h, 0f29fh    ;       95
```

```
        .word   0e35eh, 0f028h, 02441h, 05c90h, 06ba9h,
03818h, 0dd97h, 0946eh  ;       103
        .word   08851h, 0bcc1h, 003beh, 02e97h, 02d5ch,
015e1h, 00d85h, 02024h  ;       111
        .word   03744h, 02e03h, 0f648h, 0af42h, 08c9bh,
0ab70h, 0f77dh, 04094h  ;       119
        .word   0628ah, 04a10h, 01119h, 0eccah, 0ec03h,
0fe06h, 000d6h, 0e312h  ;       127
        .word   0c00fh, 0bec8h, 0f06ch, 03a84h, 072a4h,
07069h, 029e6h, 0d4d9h  ;       135
        .word   0a573h, 0ae45h, 0dc68h, 0fe83h, 000ceh,
0f26ch, 0f4aah, 01a85h  ;       143
        .word   04dfdh, 06293h, 0395bh, 0e4f6h, 0994fh,
08675h, 0b55ch, 0fe7ah  ;       151
        .word   03353h, 03bf7h, 02159h, 00b97h, 012dfh,
02783h, 02826h, 0fde6h  ;       159
        .word   0bd7ah, 097e2h, 0adc9h, 0f2cbh, 03dcch,
068ceh, 0535fh, 0159eh  ;       167
        .word   0e4b2h, 0d77eh, 0ebe8h, 0fbedh, 0ed1fh,
0cf2dh, 0c590h, 0ec67h  ;       175
        .word   0340fh, 06f00h, 071edh, 0327eh, 0d9ffh,
09e8dh, 0a0d9h, 0d0d9h  ;       183
        .word   00117h, 010f4h, 0045dh, 0fc53h, 01365h,
03ebeh, 056bdh, 03930h  ;       191
        .word   0ebb7h, 09ed1h, 084b6h, 0aea6h, 0f9d2h,
03830h, 04a2dh, 02d72h  ;       199
        .word   00c1eh, 005deh, 015b3h, 01dfch, 0020eh,
0cad2h, 0a21ch, 0af9bh  ;       207
        .word   0f1d2h, 03eb0h, 06cd2h, 05ed9h, 01c2bh,
0de49h, 0c781h, 0d7f8h  ;       215
        .word   0f3f4h, 0f548h, 0df47h, 0d131h, 0eb47h,
02bach, 0683ah, 072cdh  ;       223
        .word   038c6h, 0dcd7h, 09983h, 0923fh, 0c459h,
00212h, 01daah, 01648h  ;       231
```

```
        .word    006ech, 00e5fh, 03049h, 0498eh, 036feh,
0f378h, 0a69bh, 08760h   ;    239
        .word    0ac23h, 0f676h, 039e1h, 055dfh, 03b69h,
00e4eh, 0fa44h, 0027dh   ;    247
        .word    01132h, 0046fh, 0d7abh, 0af92h, 0b411h,
0ee4ah, 03bdbh, 07121h   ;    255
        .word    06964h, 024f0h, 0daa2h, 0b828h, 0c518h,
0e921h, 0f9ech, 0ee29h   ;    263
        .word    0de81h, 0ec90h, 021efh, 05c9fh, 06e0bh,
03cb0h, 0e32fh, 098bch   ;    271
        .word    089aah, 0baeeh, 0fecah, 02a1bh, 029bbh,
01275h, 00cach, 0217fh   ;    279
        .word    03aa3h, 0321dh, 0f9b8h, 0b07ch, 08ae0h,
0a796h, 0f18ah, 03b88h   ;    287
        .word    05f7ch, 048d7h, 01318h, 0f041h, 0ef59h,
00158h, 00266h, 0e239h   ;    295
        .word    0bdc1h, 0baabh, 0ecach, 037d3h, 0711fh,
07131h, 02d3fh, 0d9feh   ;    303
        .word    0a9d4h, 0b153h, 0dc48h, 0fcf7h, 0fe11h,
0ede1h, 0f146h, 018e2h   ;    311
        .word    04eeeh, 0662eh, 03dfdh, 0e9cch, 09ae5h,
083f5h, 0b1c0h, 0fbfeh   ;    319
        .word    030e1h, 0392fh, 0203eh, 00c7bh, 01595h,
02b25h, 02b86h, 0006ah   ;    327
        .word    0bd44h, 0940eh, 0a85ah, 0eeeeh, 03b72h,
066e2h, 05571h, 0183eh   ;    335
        .word    0e879h, 0ddaeh, 0ee4ah, 0fdbfh, 0ec26h,
0cbdch, 0c2cfh, 0e81bh   ;    343
        .word    0308bh, 06d43h, 073b1h, 03597h, 0deb7h,
0a30dh, 0a2d7h, 0d206h   ;    351
        .word    0fde8h, 00c77h, 0fff5h, 0f898h, 012cfh,
040c0h, 05b9ch, 03eb1h   ;    359
        .word    0f121h, 0a11dh, 08223h, 0a9e6h, 0f5d0h,
034a9h, 047b7h, 02d4ah   ;    367
```

```
        .word   00caeh, 0088ah, 0193eh, 021cch, 004aeh,
0caf2h, 09f8fh, 0aaf2h  ;   375
        .word   0ec66h, 039fah, 06b20h, 06043h, 020a2h,
0e2ebh, 0cb12h, 0dc1ch  ;   383
        .word   0f576h, 0f3dah, 0dc74h, 0cc7ah, 0e6deh,
0293ah, 06902h, 075d7h  ;   391
        .word   03cc5h, 0e1f0h, 09cfah, 09429h, 0c3e0h,
0fdadh, 01964h, 012c9h  ;   399
        .word   003a5h, 00de9h, 0326ch, 04e12h, 03c92h,
0f6e7h, 0a82ah, 084f3h  ;   407
        .word   0a5d1h, 0f19eh, 03681h, 0525dh, 03aa4h,
01065h, 0fe0eh, 006ffh  ;   415
        .word   014edh, 0067dh, 0d610h, 0ab96h, 0aef8h,
0e92dh, 03762h, 06efdh  ;   423
        .word   06a87h, 0286ch, 0e016h, 0bc65h, 0c845h,
0eaffh, 0f8f9h, 0eb6dh  ;   431
        .word   0da4dh, 0e8aah, 01ffch, 05d1dh, 07140h,
04112h, 0e7d9h, 09c25h  ;   439
        .word   088b9h, 0b795h, 0fc09h, 024f6h, 02535h,
0101ch, 00b8dh, 0234eh  ;   447
        .word   03da9h, 03536h, 0fd68h, 0b314h, 08a32h,
0a52eh, 0eda9h, 0361fh  ;   455
        .word   05c95h, 047b6h, 014fdh, 0f4e2h, 0f4dbh,
005c6h, 00560h, 0e36dh  ;   463
        .word   0bbb0h, 0b6d8h, 0e67fh, 03380h, 06e87h,
07104h, 03351h, 0e008h  ;   471
        .word   0afa5h, 0b674h, 0dcf5h, 0fb52h, 0fa8eh,
0ea10h, 0edbeh, 0171ah  ;   479
        .word   05091h, 06987h, 04347h, 0ee7ah, 09d73h,
08463h, 0aeffh, 0f77dh  ;   487
        .word   02c06h, 0357fh, 01d73h, 00b98h, 0169fh,
02dc3h, 02fd3h, 004e1h  ;   495
        .word   0bee6h, 0921ch, 0a420h, 0e8cah, 03638h,
06345h, 05576h, 01ba2h  ;   503
```

```
               .word     0ec6eh, 0e22bh, 0f384h, 00038h, 0ec2fh,
     0c9cbh, 0bd9fh, 0e51ch    ;      511
               .word     02f43h, 06c9eh, 075f2h, 039ceh, 0e331h,
     0a7a2h, 0a53eh, 0d253h    ;      519
               .word     0fc40h, 0084ch, 0fc2eh, 0f560h, 0104ah,
     04019h, 05d22h, 04357h    ;      527
               .word     0f646h, 0a43dh, 08342h, 0a881h, 0f1eeh,
     02ff1h, 042d5h, 02ad5h    ;      535
               .word     00d71h, 00ae1h, 01d6fh, 02538h, 00732h,
     0caa3h, 09c78h, 0a697h    ;      543
               .word     0e74dh, 0363dh, 06981h, 06186h, 022d7h,
     0e5beh, 0cff3h, 0de79h    ;      551
               .word     0f626h, 0f2c1h, 0d83bh, 0c88fh, 0e300h,
     026c7h, 0689fh, 07837h    ;      559
               .word     041b9h, 0e718h, 0a1e3h, 096deh, 0c3f2h,
     0fab5h, 01731h, 018d7h    ;      567
               .word     01173h, 01000h, 00bfbh, 00422h, 00231h,
     00291h, 004a6h, 004adh   ;564     575
     _Dtmf2Start:
               .word     0003dh    ;  572
     _Dtmf1End:
               .word     0009ah, 00165h, 0ff36h, 0f2b3h, 0e39ah,
     0f367h, 02c98h              ;573     583
               .word     05a63h, 04523h, 0f3e7h, 09e3fh, 086a8h,
     0bc33h, 00651h, 02b18h    ;      591
               .word     02216h, 0110fh, 0218dh, 04b1ch, 0581bh,
     023b3h, 0c719h, 08776h    ;      599
               .word     096b0h, 0dec7h, 0207fh, 030a6h, 017a2h,
     0099ch, 02371h, 0472dh    ;      607
               .word     0408dh, 0fba1h, 0a4b1h, 0831eh, 0b266h,
     003fbh, 037a8h, 0374dh    ;      615
               .word     0168ah, 00a20h, 0251ah, 03aech, 02107h,
     0d56eh, 0915dh, 0966eh    ;      623
```

```
        .word   0dd3dh, 02bffh, 04ee6h, 03804h, 00f04h,
00700h, 01e2bh, 027b8h  ;   631
        .word   0ff32h, 0b75ah, 090bch, 0b5e6h, 008deh,
04c9ch, 0571fh, 02b3ch  ;   639
        .word   0fce0h, 0f9ddh, 00ffeh, 00eb0h, 0e14dh,
0a769h, 0a18dh, 0de5ch  ;   647
        .word   03064h, 0636ch, 0523ah, 0127bh, 0e87bh,
0ee37h, 0028fh, 0fb8fh  ;   655
        .word   0cc6bh, 0a739h, 0be8eh, 0099dh, 05848h,
07008h, 03f3dh, 0f7dbh  ;   663
        .word   0d5bch, 0e38dh, 0fa47h, 0ed45h, 0c382h,
0b3f1h, 0e1feh, 0363ch  ;   671
        .word   072f8h, 0682ah, 01ec4h, 0d6f6h, 0c432h,
0dd07h, 0f46dh, 0e647h  ;   679
        .word   0c5c4h, 0cbdbh, 008ddh, 058f0h, 07b69h,
04daah, 0f55ch, 0b865h  ;   687
        .word   0b81bh, 0df0bh, 0f697h, 0e568h, 0d00bh,
0e66eh, 02e3dh, 071a7h  ;   695
        .word   07245h, 02908h, 0cbabh, 0a08ch, 0ba65h,
0eb90h, 0fe3bh, 0eda7h  ;   703
        .word   0e21fh, 00551h, 04a52h, 073e7h, 0526dh,
0f7b6h, 0a89eh, 0998ch  ;   711
        .word   0c9b8h, 000bdh, 00dbeh, 0faf7h, 0f71ah,
02122h, 05a4eh, 06690h  ;   719
        .word   02974h, 0c8d7h, 08bf1h, 09e57h, 0e3c2h,
01868h, 01cd8h, 0065ch  ;   727
        .word   00866h, 031d0h, 058cdh, 0485dh, 0f926h,
0a30ah, 086f4h, 0b87fh  ;   735
        .word   00437h, 02e20h, 0259dh, 00bc5h, 0129eh,
038cch, 04ce8h, 02444h  ;   743
        .word   0cce5h, 08c12h, 0962ch, 0ddc9h, 02603h,
03eech, 02731h, 00a82h  ;   751
        .word   01479h, 0336eh, 03428h, 0feb5h, 0ade7h,
08b41h, 0b61ch, 005bdh  ;   759
```

```
        .word   0426ah, 04703h, 01faah, 003c0h, 010a9h,
02748h, 018ebh, 0da68h  ;       767
        .word   09b3fh, 09b47h, 0dd80h, 02e5dh, 058c1h,
044c3h, 01062h, 0f714h  ;       775
        .word   00681h, 01665h, 0fd9ch, 0c0b3h, 09b94h,
0bb0bh, 00a19h, 051ffh  ;       783
        .word   0649dh, 035e7h, 0f7a8h, 0e6cbh, 0f9b1h,
00454h, 0e666h, 0b2f3h  ;       791
        .word   0a948h, 0e157h, 03649h, 06d02h, 05f98h,
01a67h, 0de5eh, 0d856h  ;       799
        .word   0f050h, 0f805h, 0d7a2h, 0b36ah, 0c2e5h,
00b45h, 05b0bh, 076a7h  ;       807
        .word   047e9h, 0f65eh, 0c679h, 0cd90h, 0ece8h,
0f2c3h, 0d395h, 0c13eh  ;       815
        .word   0e4bfh, 033abh, 07490h, 06e9bh, 02308h,
0cef2h, 0af99h, 0c975h  ;       823
        .word   0efc6h, 0f1bfh, 0d7edh, 0d447h, 00623h,
0550eh, 07d87h, 0542eh  ;       831
        .word   0f6adh, 0ad86h, 0a6f8h, 0d2ech, 0fa9ah,
0f953h, 0e34ah, 0edc8h  ;       839
        .word   02855h, 06736h, 06d94h, 02854h, 0c99bh,
0964ch, 0aca1h, 0e8e7h  ;       847
        .word   00cc0h, 00550h, 0f47fh, 00704h, 03f9eh,
0698fh, 04f7ch, 0f75eh  ;       855
        .word   0a077h, 08c00h, 0c06dh, 00383h, 01fc8h,
01104h, 00214h, 01adah  ;       863
        .word   04aadh, 059e6h, 024c8h, 0c9b1h, 08b1fh,
09888h, 0e019h, 01fe4h  ;       871
        .word   02ec7h, 0167fh, 0092ch, 024e3h, 048aeh,
04021h, 0fb16h, 0a6b2h  ;       879
        .word   0879bh, 0b67eh, 005a5h, 037d8h, 0364bh,
014dah, 00a39h, 024f2h  ;       887
        .word   03a35h, 01f37h, 0d42fh, 092eeh, 097ffh,
0de21h, 02a9dh, 04d0eh  ;       895
```

```
        .word   036c4h, 00bdeh, 005fdh, 01e3ah, 0261bh,
0fdf3h, 0b628h, 091bdh ;    903
        .word   0b665h, 007a7h, 04c81h, 056e5h, 02976h,
0fd3ah, 0fbffh, 011dfh ;    911
        .word   01051h, 0dfe6h, 0a56fh, 0a0cch, 0df69h,
03342h, 064ebh, 0532ah ;    919
        .word   01463h, 0e98ah, 0eec3h, 003e9h, 0fb71h,
0cc47h, 0a739h, 0be56h ;    927
        .word   00b60h, 05876h, 06e7eh, 03d8bh, 0f568h,
0d56fh, 0e3adh, 0f9b9h ;    935
        .word   0ed44h, 0c23dh, 0b4f1h, 0e417h, 0361ch,
071fbh, 06745h, 01bd0h ;    943
        .word   0d4f6h, 0c418h, 0dc31h, 0f5d8h, 0e502h,
0c44bh, 0cba1h, 00906h ;    951
        .word   05b9fh, 07ca3h, 04f11h, 0f51eh, 0b66bh,
0b928h, 0dffbh, 0f603h ;    959
        .word   0e531h, 0cfd7h, 0e755h, 02f71h, 0721ah,
0715ch, 0272eh, 0cb25h ;    967
        .word   0a0c3h, 0ba9ch, 0ec36h, 0ff41h, 0ed99h,
0e298h, 00600h, 04b43h ;    975
        .word   074c3h, 052d4h, 0f778h, 0a56dh, 097f1h,
0cae1h, 000a5h, 00d07h ;    983
        .word   0fa72h, 0f77fh, 021f3h, 05a76h, 06582h,
026dbh, 0c6eeh, 08dadh ;    991
        .word   09fe4h, 0e42dh, 019f3h, 01bbch, 005ach,
008d7h, 0329ch, 059f0h ;    999
        .word   047a2h, 0f855h, 0a22ch, 0875bh, 0b9c5h,
00471h, 02de7h, 0243bh ;    1007
        .word   00af8h, 012f9h, 03901h, 04cfdh, 023deh,
0ccc8h, 08ae5h, 094d3h ;    1015
        .word   0de14h, 02661h, 03eb5h, 0269dh, 00b4ah,
015e0h, 0355eh, 03583h ;    1023
        .word   0fd01h, 0aadah, 087f8h, 0b559h, 007d5h,
0440bh, 047a7h, 01f95h ;    1031
```

```
1          .word    00423h, 01194h, 0278ah, 01889h, 0d973h,
2    09b7dh, 09cb3h, 0de70h  ;   1039
3          .word    02eb8h, 05925h, 04427h, 00ee6h, 0f799h,
4    007b8h, 0172ah, 0fd5fh  ;   1047
5          .word    0bfe3h, 09b87h, 0baa2h, 009d2h, 05263h,
6    06324h, 03301h, 0f686h  ;   1055
7          .word    0e773h, 0faefh, 004e1h, 0e686h, 0b289h,
8    0a9e6h, 0e266h, 0373eh  ;   1063
9          .word    06e71h, 05e4ch, 017e0h, 0dddfh, 0d93eh,
10   0f155h, 0f8cah, 0d80ch  ;   1071
11         .word    0b53dh, 0c5e6h, 00b79h, 05a74h, 07671h,
12   04712h, 0f4b6h, 0c375h  ;   1079
13         .word    0cddah, 0eda7h, 0f096h, 0d299h, 0c0abh,
14   0e55fh, 034ech, 07492h  ;   1087
15         .word    06e0eh, 0213bh, 0cdf5h, 0b15fh, 0cb0bh,
16   0f05dh, 0f209h, 0d6eah  ;   1095
17         .word    0d4beh, 00805h, 05618h, 07bebh, 05288h,
18   0f7f9h, 0aeaah, 0a8a0h  ;   1103
19         .word    0d5beh, 0fab5h, 0f792h, 0e26bh, 0ed1dh,
20   02926h, 06973h, 06e42h  ;   1111
21         .word    02602h, 0c6e6h, 094bah, 0acc6h, 0e9fah,
22   00bf4h, 00439h, 0f32ah  ;   1119
23         .word    00703h, 04128h, 068b0h, 04dbah, 0f6b9h,
24   0a284h, 08f93h, 0c1afh  ;   1127
25         .word    00437h, 01febh, 00f70h, 000d9h, 01b51h,
26   04b8dh, 05a37h, 0243eh  ;   1135
27         .word    0c73dh, 088e0h, 0981ch, 0e09fh, 02030h,
28   03131h, 01f38h, 010f3h  ;1132
29         .word    01249h, 00f19h, 007f3h, 00247h ; 1140
30   _Dtmf3Start:
31         .word    0fffeh   ; 1144
32   _Dtmf2End:
33         .word    0ff6bh, 0fcdch, 0f8f2h;1145
```

```
        .word   00030h, 01be1h, 025a1h, 0fb94h, 0e016h,
0ff76h, 00f6fh, 0ebbdh  ;   1159
        .word   0b277h, 0a14ch, 0e25ah, 033d8h, 05ac2h,
04705h, 01c49h, 01d28h  ;   1167
        .word   03172h, 02318h, 0df24h, 096a9h, 0967eh,
0dbe7h, 024edh, 03786h  ;   1175
        .word   01a73h, 00c38h, 02b53h, 045a0h, 01f33h,
0c662h, 08845h, 09c33h  ;   1183
        .word   0e8a6h, 01d80h, 01892h, 005dch, 0198dh,
04dbdh, 05c82h, 01ae4h  ;   1191
        .word   0bb83h, 0918dh, 0ba0fh, 0fb1ch, 012b8h,
0007dh, 0fea5h, 031cch  ;   1199
        .word   06a68h, 05f64h, 00a1ch, 0b394h, 0a1f0h,
0d04bh, 0f9eeh, 0f2fch  ;   1207
        .word   0df92h, 0fb67h, 0458bh, 07640h, 0529eh,
0f620h, 0b4adh, 0bba7h  ;   1215
        .word   0e442h, 0ed8fh, 0d101h, 0cc21h, 00562h,
057f8h, 07472h, 03d87h  ;   1223
        .word   0eab3h, 0c702h, 0dd56h, 0f274h, 0dc05h,
0b860h, 0cb74h, 01910h  ;   1231
        .word   0609ah, 066c3h, 025cfh, 0e65bh, 0e34bh,
0fa6dh, 0f37fh, 0c3dah  ;   1239
        .word   0a623h, 0d218h, 025deh, 05eddh, 05079h,
01396h, 0f3cdh, 004d4h  ;   1247
        .word   010d4h, 0e8beh, 0aa91h, 09e53h, 0de5eh,
02ff9h, 052ebh, 0363ch  ;   1255
        .word   00a0bh, 00caah, 0272ch, 0193bh, 0d58eh,
09654h, 0a228h, 0ecffh  ;   1263
        .word   030e9h, 03e5ah, 01d48h, 00e0dh, 02d20h,
04128h, 0164ah, 0bf20h  ;   1271
        .word   08b5fh, 0add2h, 0fac5h, 02a1fh, 02260h,
00b71h, 01df1h, 04c31h  ;   1279
        .word   04e52h, 0073ah, 0ac2fh, 08d78h, 0bfc6h,
0046eh, 018aeh, 00544h  ;   1287
```

```
 1          .word    00506h, 0353eh, 064f2h, 04ec4h, 0f666h,
 2    0a43bh, 09e45h, 0d651h    ;   1295
 3          .word    0004dh, 0faadh, 0e956h, 00815h, 04e48h,
 4    07255h, 044a4h, 0e662h    ;   1303
 5          .word    0abeeh, 0bb31h, 0e85ch, 0f24ah, 0d930h,
 6    0d994h, 01649h, 0636ah    ;   1311
 7          .word    073c9h, 03052h, 0dafch, 0bdb7h, 0d7feh,
 8    0f02bh, 0db91h, 0be52h    ;   1319
 9          .word    0d898h, 02696h, 069d9h, 063f1h, 01ae2h,
10    0dbceh, 0da8dh, 0f4d1h    ;   1327
11          .word    0ece2h, 0c172h, 0aea0h, 0e1e2h, 035bah,
12    065fah, 04ca5h, 00966h    ;   1335
13          .word    0ebcah, 0fe21h, 0069ah, 0e07dh, 0a92dh,
14    0a9cah, 0eedah, 03cbch    ;   1343
15          .word    0586fh, 0325dh, 00397h, 006cfh, 01e5dh,
16    00d3ch, 0cae5h, 09527h    ;   1351
17          .word    0ada1h, 0fcdch, 03cbfh, 041e0h, 01b23h,
18    00b29h, 0272ah, 03513h    ;   1359
19          .word    0064fh, 0b571h, 08ddah, 0ba59h, 0088bh,
20    03349h, 02682h, 00cd5h    ;   1367
21          .word    01ee2h, 0479bh, 04080h, 0f691h, 0a1e1h,
22    08ee3h, 0cb3fh, 01070h    ;   1375
23          .word    020b3h, 00b4dh, 00c47h, 039f8h, 06089h,
24    03f75h, 0e443h, 09b11h    ;   1383
25          .word    0a09bh, 0def4h, 00916h, 00187h, 0f22eh,
26    011c5h, 05457h, 06d64h    ;   1391
27          .word    033b2h, 0d51bh, 0a17bh, 0b9cch, 0ec16h,
28    0f6bdh, 0df30h, 0e499h    ;   1399
29          .word    023eeh, 06b45h, 06ef4h, 02227h, 0ccb1h,
30    0b6a1h, 0d682h, 0effeh    ;   1407
31          .word    0dcddh, 0c490h, 0e5d1h, 035e3h, 07246h,
32    05e71h, 00c13h, 0d0f1h    ;   1415
33          .word    0d4a8h, 0f054h, 0e9afh, 0c141h, 0b80ah,
34    0f160h, 04407h, 06c69h    ;   1423
```

```
        .word   04694h, 0fe84h, 0e2c9h, 0f6d4h, 0feeOh,
0d9a9h, 0a91dh, 0b429h  ;       1431
        .word   0ff71h, 04a2ch, 05c17h, 02cadh, 0fd5fh,
0013dh, 015d5h, 00352h  ;       1439
        .word   0c3b5h, 097b1h, 0b985h, 00befh, 0485dh,
044bfh, 018b3h, 00845h  ;       1447
        .word   021b9h, 02ba6h, 0f922h, 0aafah, 090ech,
0c82dh, 0166dh, 03c22h  ;       1455
        .word   029cfh, 00d10h, 01ed8h, 041fah, 03265h,
0e63fh, 098b4h, 0949dh  ;       1463
        .word   0d794h, 01a55h, 027a8h, 00fc6h, 0104fh,
03cc5h, 05acfh, 030c5h  ;       1471
        .word   0d2b8h, 0906eh, 0a24ch, 0e7dbh, 0138fh,
009b5h, 0faeah, 01c24h  ;       1479
        .word   05743h, 065a5h, 022e7h, 0c48bh, 09b01h,
0bcaah, 0f26ch, 0fbc8h  ;       1487
        .word   0e67fh, 0ef0bh, 02dfdh, 06db1h, 0635fh,
0111fh, 0c015h, 0b13fh  ;       1495
        .word   0d9c7h, 0f2d6h, 0dfbah, 0ce46h, 0f3b1h,
043bah, 0764dh, 054d4h  ;       1503
        .word   0fe3eh, 0c605h, 0cf13h, 0ecbbh, 0e7cah,
0c36eh, 0c1f7h, 000f4h  ;       1511
        .word   04f7dh, 06db7h, 03d0dh, 0f3c7h, 0db76h,
0f03dh, 0f95ah, 0d422h  ;       1519
        .word   0aba3h, 0c23ah, 00f3eh, 05552h, 05de2h,
025b6h, 0f410h, 0f9b3h  ;       1527
        .word   00d3fh, 0f887h, 0bd43h, 09d46h, 0c8feh,
01af0h, 05053h, 04479h  ;       1535
        .word   012fah, 00397h, 01c3fh, 020a2h, 0ec77h,
0a46fh, 09739h, 0d646h  ;       1543
        .word   023a7h, 04429h, 02a7ch, 00cb6h, 01d75h,
03a98h, 02675h, 0d96ah  ;       1551
        .word   0944bh, 09d07h, 0e5cbh, 024ddh, 02d79h,
01256h, 0125ah, 03d13h  ;       1559
```

```
        .word     0525fh, 01fdbh, 0c252h, 08cffh, 0abddh,
0f3f8h, 01bdfh, 00fe2h   ;    1567
        .word     001d5h, 0228dh, 058ffh, 05aech, 01126h,
0b46fh, 0948dh, 0c22fh   ;    1575
        .word     0fb2fh, 00432h, 0ef21h, 0fb67h, 0393eh,
06f58h, 05818h, 0ff15h   ;    1583
        .word     0b301h, 0acc9h, 0dbbah, 0f71eh, 0e475h,
0d6e5h, 0003fh, 04f70h   ;    1591
        .word     07817h, 04a6fh, 0ef7dh, 0bae7h, 0ca47h,
0ec37h, 0e709h, 0c6e8h   ;    1599
        .word     0cc5dh, 00e22h, 05c76h, 06fb3h, 03207h,
0e587h, 0d0fch, 0ea15h   ;    1607
        .word     0f312h, 0d038h, 0aee4h, 0cd78h, 02047h,
06130h, 05c89h, 01ca3h   ;    1615
        .word     0ebb9h, 0f2bah, 00609h, 0f007h, 0b810h,
0a2c2h, 0d89bh, 02b6fh   ;    1623
        .word     05adeh, 043e1h, 00cb1h, 0fd5eh, 014b9h,
015a1h, 0dfedh, 09f7ch   ;    1631
        .word     09ec2h, 0e4fdh, 031e1h, 04b43h, 02978h,
00947h, 01a19h, 032b1h   ;    1639
        .word     018f8h, 0cc38h, 090b1h, 0a79bh, 0f480h,
02fc9h, 03303h, 013a7h   ;    1647
        .word     01417h, 03ae0h, 04751h, 00f65h, 0b4ceh,
08a32h, 0b4b8h, 000c4h   ;    1655
        .word     024b2h, 01599h, 00809h, 02805h, 057c0h,
04ecdh, 0fed3h, 0a804h   ;    1663
        .word     09468h, 0cb72h, 0055eh, 00c5ch, 0f844h,
004c2h, 040a9h, 06d6fh   ;    1671
        .word     04bcfh, 0ed22h, 0a2f5h, 0a8d7h, 0df7eh,
0fbc3h, 0eabch, 0df4ch   ;    1679
        .word     00d37h, 05947h, 075deh, 03b65h, 0e038h,
0b38dh, 0c838h, 0ee37h   ;    1687
        .word     0e96dh, 0cbfch, 0d7d3h, 01d6ah, 067a6h,
06d8ch, 02701h, 0da39h   ;    1695
```

```
        .word   0c9a3h, 0e6e0h, 0f02dh, 0cf4ch, 0b5d1h,
0dbe0h, 02fe5h, 06ab5h   ;   1703
        .word   05a23h, 01163h, 0e026h, 0ea48h, 0fd5bh,
0e92fh, 0bbf0h, 0bc56h   ;1700
        .word   0fa3ch, 0fffdh; 1708
_Dtmf4Start:
        .word   0ffffh   ; 1710
_Dtmf3End:
        .word   00004h, 00800h, 01232h, 00942h, 0e0cfh;
1711
        .word   0bcb1h, 0c9a8h, 0093dh, 05613h, 07935h,
05073h, 0f2cah, 09ccfh   ;   1727
        .word   08597h, 0b715h, 0036dh, 03630h, 03853h,
01b25h, 0076bh, 00f1bh   ;   1735
        .word   01f37h, 017b3h, 0eafdh, 0b40eh, 0a2efh,
0ce19h, 01ca9h, 05f44h   ;   1743
        .word   06c95h, 03583h, 0e1d9h, 0ae31h, 0b377h,
0e1eeh, 00e77h, 019b5h   ;   1751
        .word   00bc9h, 00357h, 016e6h, 038ebh, 0439bh,
01d03h, 0d463h, 099c5h   ;   1759
        .word   09ba4h, 0da39h, 02813h, 05b7bh, 05449h,
01530h, 0d962h, 0c516h   ;   1767
        .word   0d8c0h, 0f8beh, 0ff09h, 0ef82h, 0e56bh,
0fd01h, 0342dh, 05fe4h   ;   1775
        .word   0583fh, 01356h, 0ba5ch, 08a4ah, 0a400h,
0eeb5h, 034dfh, 05169h   ;   1783
        .word   0389bh, 0069ah, 0ea48h, 0ef19h, 0ff21h,
0fceeh, 0de5ch, 0c241h   ;   1791
        .word   0cd14h, 006b4h, 04f02h, 07203h, 05091h,
0fbfeh, 0aaefh, 0904eh   ;   1799
        .word   0bbfdh, 002f0h, 0338fh, 03760h, 01978h,
00533h, 00ac9h, 01b9eh   ;   1807
        .word   0187fh, 0ee77h, 0b8dch, 0a3f5h, 0ca51h,
015a7h, 05938h, 06c5fh   ;   1815
```

```
            .word    038c3h, 0e3abh, 0ab9dh, 0ae2fh, 0deb9h,
00d58h, 01c70h, 0107dh  ;   1823
            .word    004d1h, 01542h, 03581h, 042d3h, 0217ch,
0da34h, 09e15h, 09b0ah  ;   1831
            .word    0d5e0h, 0248ah, 05b88h, 0574ch, 01ad6h,
0dc8ah, 0c425h, 0d5e5h  ;   1839
            .word    0f66fh, 000f9h, 0f2e8h, 0e811h, 0fbd7h,
02e58h, 05af5h, 056b2h  ;   1847
            .word    01701h, 0c070h, 08d88h, 0a24ch, 0e947h,
02fc2h, 0517bh, 03b26h  ;   1855
            .word    00836h, 0e8e0h, 0eac7h, 0fd12h, 0fdd2h,
0e2e0h, 0c6a7h, 0cd17h  ;   1863
            .word    00392h, 04af6h, 071aeh, 054aeh, 00179h,
0aebeh, 0910fh, 0b8b6h  ;   1871
            .word    0fedch, 03143h, 038e3h, 01cd4h, 004f2h,
00770h, 0186eh, 01788h  ;   1879
            .word    0f1d3h, 0bd65h, 0a64ah, 0c843h, 01285h,
058b5h, 06e2ch, 03b26h  ;   1887
            .word    0e711h, 0adcdh, 0ab31h, 0da2fh, 00c1ah,
01e47h, 01425h, 00613h  ;   1895
            .word    0133ch, 0320fh, 04103h, 023a5h, 0ddf4h,
09f38h, 0987eh, 0d2bah  ;   1903
            .word    021c6h, 05a13h, 059f5h, 01ee0h, 0df3dh,
0c236h, 0d1c0h, 0f52ah  ;   1911
            .word    00115h, 0f64fh, 0e926h, 0f895h, 02b1bh,
0582dh, 05918h, 01bb4h  ;   1919
            .word    0c36dh, 08d95h, 09da2h, 0e2aeh, 02d6ah,
052ebh, 03dd2h, 00b26h  ;   1927
            .word    0e92dh, 0e83ch, 0fa50h, 0fee5h, 0e670h,
0c96ah, 0cc99h, 0ff52h  ;   1935
            .word    0474bh, 07005h, 0576eh, 00612h, 0b0b2h,
08f44h, 0b37eh, 0fad0h  ;   1943
            .word    031dbh, 03bd6h, 020dfh, 005a6h, 0050eh,
0154eh, 01722h, 0f5e7h  ;   1951
```

```
        .word   0c1a9h, 0a6d4h, 0c4b5h, 00e52h, 0557ch,
06e27h, 0407eh, 0ec95h  ;   1959
        .word   0af2bh, 0a888h, 0d629h, 00b96h, 020a4h,
0175ch, 007adh, 01082h  ;   1967
        .word   02df4h, 03ed9h, 025e6h, 0e276h, 0a20bh,
0982dh, 0cdc8h, 01b33h  ;   1975
        .word   05797h, 05cb8h, 0224eh, 0dff9h, 0c171h,
0ce69h, 0f224h, 00336h  ;   1983
        .word   0f9feh, 0ec44h, 0f902h, 027b4h, 055e7h,
05a23h, 02076h, 0c85ch  ;   1991
        .word   08ea1h, 09ae3h, 0df4bh, 028ffh, 052d6h,
042a3h, 00e41h, 0e9a2h  ;   1999
        .word   0e4feh, 0f7aah, 0ff6fh, 0e989h, 0cdd8h,
0cd3bh, 0fc61h, 04325h  ;   2007
        .word   0702fh, 05bc0h, 00ad6h, 0b494h, 08e03h,
0ae2bh, 0f70fh, 030d5h  ;   2015
        .word   03dc0h, 023e6h, 00680h, 002b0h, 011dbh,
01676h, 0f86fh, 0c59bh  ;   2023
        .word   0a923h, 0c2a9h, 009b4h, 052e4h, 06fb3h,
0459bh, 0f165h, 0afdeh  ;   2031
        .word   0a5b7h, 0d160h, 007cch, 02151h, 019b0h,
008d6h, 00e2ch, 02997h  ;   2039
        .word   03bdch, 02653h, 0e6a4h, 0a568h, 09789h,
0c8c2h, 01843h, 05870h  ;   2047
        .word   05f28h, 02844h, 0e372h, 0bf52h, 0ca28h,
0ef28h, 004f4h, 0fd95h  ;   2055
        .word   0efcbh, 0f84ch, 02343h, 05213h, 05892h,
02289h, 0ccb2h, 0908bh  ;   2063
        .word   097c9h, 0db69h, 02700h, 05263h, 04661h,
011c3h, 0e8d4h, 0e27dh  ;   2071
        .word   0f463h, 0ff84h, 0ecb1h, 0d04ah, 0cd07h,
0f877h, 03f18h, 06e19h  ;   2079
        .word   05d6ah, 01058h, 0b95ch, 08d95h, 0a98fh,
0f1c5h, 02f5dh, 04129h  ;   2087
```

```
        .word   0271bh, 006d3h, 0fffbh, 00df7h, 014c8h,
0faech, 0ca9ch, 0ab93h   ;   2095
        .word   0c103h, 00536h, 04ea8h, 06f3bh, 049cfh,
0f61ah, 0b0a6h, 0a1b2h   ;   2103
        .word   0ccdah, 00741h, 0235fh, 01dadh, 00bc9h,
00cdah, 02704h, 03ad1h   ;   2111
        .word   0290eh, 0eb81h, 0a8e0h, 096d2h, 0c670h,
014c6h, 05431h, 06141h   ;   2119
        .word   02e2bh, 0e6a7h, 0bf86h, 0c6b8h, 0ec0fh,
0044eh, 0ffd1h, 0f1ceh   ;   2127
        .word   0f6dah, 01f97h, 04e1ah, 05843h, 02602h,
0d250h, 093b4h, 095d5h   ;   2135
        .word   0d6e0h, 0240dh, 052e1h, 04ab2h, 0161ch,
0e9cdh, 0e053h, 0f13ah   ;   2143
        .word   0ff52h, 0f043h, 0d48ah, 0ce88h, 0f571h,
03a47h, 06b9eh, 05fcdh   ;   2151
        .word   0161bh, 0bcd2h, 08cbch, 0a60eh, 0ed22h,
02b58h, 04173h, 02951h   ;   2159
        .word   00791h, 0fe5ch, 00af2h, 014ach, 0fe51h,
0cdf9h, 0acdfh, 0be4bh   ;   2167
        .word   001cfh, 04d1ch, 070f2h, 04ffeh, 0faddh,
0b119h, 09e89h, 0c5d7h   ;   2175
        .word   00319h, 024d5h, 020d8h, 00dc1h, 00ba5h,
023b0h, 0377eh, 02916h   ;   2183
        .word   0f009h, 0ae64h, 097e7h, 0c169h, 00f38h,
05354h, 06381h, 031d1h   ;   2191
        .word   0e9a1h, 0bdf3h, 0c2e3h, 0e7c7h, 0037eh,
00353h, 0f451h, 0f69fh   ;   2199
        .word   01b76h, 049b6h, 05712h, 02a4eh, 0d918h,
0971eh, 0957ah, 0d38ch   ;   2207
        .word   02047h, 051c9h, 04d57h, 018eeh, 0e91ah,
0dca3h, 0ed06h, 0fe37h   ;   2215
        .word   0f299h, 0d7f7h, 0cf74h, 0f2c0h, 036d9h,
069fah, 06379h, 01bfeh   ;   2223
```

```
         .word    0bffeh, 08cb0h, 0a24ch, 0e890h, 02a3eh,
04315h, 02e0bh, 00932h   ;    2231
         .word    0fb56h, 0075ch, 0114eh, 0ffa4h, 0d249h,
0b011h, 0becah, 0fdb0h   ;    2239
         .word    04733h, 06f9bh, 0532fh, 00120h, 0b788h,
09ee9h, 0c3bch, 0005bh   ;    2247
         .word    0246bh, 023c0h, 00f5ch, 00ab2h, 01ebeh,
03473h, 029a2h, 0f367h   ;    2255
         .word    0b1bfh, 09831h, 0bfach, 00b07h, 0507fh,
065ech, 03633h, 0ecaeh   ;    2263
         .word    0bdc6h, 0be7eh, 0e587h, 004ffh, 006cbh,
0f914h, 0f821h, 018edh   ;    2271
         .word    04646h, 056f7h, 0301ah, 0e7bbh, 0b702h,
0bd78h, 0d52dh, 0dbcbh   ;2268
         .word    0eac6h, 0fc39h, 00011h, 0000fh;2276
_Dtmf5Start:
         .word    00001h   ;2280
_Dtmf4End:
         .word    00008h, 0ff9bh, 00028h;2281
         .word    0080ah, 019f8h, 01debh, 0f31ch, 0b477h,
0a562h, 0dae8h, 02fabh   ;    2295
         .word    06b00h, 05eaeh, 01771h, 0d7b3h, 0cb6fh,
0e4a2h, 0f599h, 0e46eh   ;    2303
         .word    0cf62h, 0e4d9h, 02a0bh, 06c0bh, 06be3h,
01f93h, 0bf26h, 0941ah   ;    2311
         .word    0b57eh, 0f73ch, 01bc8h, 00fcbh, 0fd08h,
00be3h, 036e2h, 04b59h   ;    2319
         .word    01f17h, 0ca79h, 08f35h, 0a06bh, 0efa9h,
03873h, 04c7ah, 02815h   ;    2327
         .word    0fd59h, 0fb27h, 01006h, 013a1h, 0eaa1h,
0b593h, 0b2edh, 0f041h   ;    2335
         .word    043f2h, 07174h, 051f7h, 0ff64h, 0c3efh,
0c4ebh, 0e8deh, 0fe8bh   ;    2343
```

```
        .word    0ed55h, 0d8a0h, 0f03ah, 032f0h, 06c33h,
05e07h, 00950h, 0ace3h  ;    2351
        .word    08c38h, 0bb7eh, 003c0h, 026aeh, 01a87h,
00415h, 00da3h, 0319bh  ;    2359
        .word    03d0ah, 00e47h, 0bcf9h, 08f06h, 0b0aeh,
00139h, 045a3h, 0526eh  ;    2367
        .word    02508h, 0f3ffh, 0eec8h, 0056bh, 009f6h,
0e5f8h, 0ba83h, 0bfech  ;    2375
        .word    00295h, 0545eh, 07582h, 046efh, 0ef47h,
0b663h, 0bda0h, 0e8b5h  ;    2383
        .word    0037ch, 0f6c1h, 0e58dh, 0fc6ah, 037bbh,
064cdh, 04ce6h, 0f54dh  ;    2391
        .word    09d32h, 08ad9h, 0c5c5h, 0114ch, 0337dh,
0218bh, 0069eh, 00bffh  ;    2399
        .word    028f7h, 02fe9h, 00092h, 0b6a7h, 09455h,
0c0cah, 014eah, 05564h  ;    2407
        .word    05711h, 01ce2h, 0e81eh, 0e300h, 0fa57h,
0032ah, 0e545h, 0c12bh  ;    2415
        .word    0cf15h, 0149bh, 061e0h, 074fch, 038e3h,
0dd7ah, 0a68eh, 0b787h  ;    2423
        .word    0ec88h, 009e7h, 000aeh, 0f10ch, 004e0h,
03abbh, 05c7eh, 03ae5h  ;    2431
        .word    0e0a9h, 09399h, 091d4h, 0d410h, 01f42h,
03c31h, 025dfh, 005b9h  ;    2439
        .word    00685h, 020e3h, 022fdh, 0f4ffh, 0b384h,
09ef8h, 0d354h, 028f2h  ;    2447
        .word    062fch, 0576bh, 01457h, 0db9eh, 0d6f8h,
0f26ah, 0ff8ch, 0e71ch  ;    2455
        .word    0cac4h, 0dd70h, 022bah, 06883h, 06e8dh,
02873h, 0c8cch, 09a24h  ;    2463
        .word    0b598h, 0f1fbh, 014b2h, 00a42h, 0f944h,
00a6ch, 03926h, 0516ah  ;    2471
        .word    026dah, 0cf23h, 08ef2h, 09ba8h, 0e562h,
02f54h, 046fdh, 027fch  ;    2479
```

```
        .word       00077h, 0ff25h, 015e2h, 01821h, 0ece9h,
0b3ech, 0ad08h, 0e820h   ;   2487
        .word       03bafh, 06be9h, 05384h, 00732h, 0cd34h,
0cc73h, 0ebe5h, 0fec5h   ;   2495
        .word       0eaefh, 0d41ch, 0ea23h, 02cech, 06a50h,
0629ch, 013cah, 0b7f7h   ;   2503
        .word       091d9h, 0b878h, 0fc1eh, 0203ch, 01584h,
000dbh, 00d77h, 03448h   ;   2511
        .word       043c8h, 01595h, 0c09dh, 08d7dh, 0a7f8h,
0f8ech, 03fcah, 04ee6h   ;   2519
        .word       0274ch, 0f7fbh, 0f33bh, 00a23h, 00d16h,
0e797h, 0b7d6h, 0ba90h   ;   2527
        .word       0fb47h, 04d44h, 0739fh, 04bc8h, 0f5a9h,
0bc6fh, 0c1bbh, 0e8b0h   ;   2535
        .word       00179h, 0f231h, 0e04eh, 0f7c3h, 03629h,
06959h, 05516h, 0fe1ch   ;   2543
        .word       0a431h, 08cb9h, 0c05eh, 00a64h, 02cc4h,
01d97h, 005e8h, 00cc8h   ;   2551
        .word       02e06h, 0363fh, 00678h, 0b979h, 0926fh,
0b803h, 00ac5h, 04e1eh   ;   2559
        .word       053cbh, 02173h, 0ee2eh, 0e8d7h, 00009h,
005bdh, 0e610h, 0bed1h   ;   2567
        .word       0ca0bh, 00e09h, 05b9ch, 07715h, 03fach,
0e301h, 0ad95h, 0b9b5h   ;   2575
        .word       0e8ach, 0063bh, 0faafh, 0eb1bh, 000d4h,
039c4h, 0614ah, 04296h   ;   2583
        .word       0e992h, 0988bh, 08eeah, 0ce88h, 01a6bh,
038fbh, 02505h, 006f2h   ;   2591
        .word       00907h, 0251fh, 02879h, 0fa4bh, 0b5cfh,
09b84h, 0cb83h, 01ef5h   ;   2599
        .word       05b97h, 056dbh, 0173bh, 0e0ach, 0dc4fh,
0f51dh, 0001ah, 0e53dh   ;   2607
        .word       0c601h, 0d70fh, 01b9eh, 06476h, 07153h,
02fe6h, 0d3bah, 0a158h   ;   2615
```

```
1              .word    0b5f8h, 0ef55h, 00f69h, 005d0h, 0f67eh,
2     0082ah, 039b2h, 055d1h    ;    2623
3              .word    03022h, 0d850h, 0925ch, 09778h, 0dcb9h,
4     02702h, 04288h, 0276ah    ;    2631
5              .word    00236h, 00213h, 019afh, 01bb0h, 0ef82h,
6     0b2b6h, 0a5a6h, 0df06h    ;    2639
7              .word    033d4h, 06765h, 055b3h, 00d80h, 0d3b6h,
8     0d0a9h, 0ede5h, 0ff36h    ;    2647
9              .word    0e8c1h, 0cfbdh, 0e418h, 0288bh, 06b19h,
10    06834h, 01cc0h, 0bffeh    ;    2655
11             .word    09459h, 0b652h, 0f8c9h, 01b21h, 01087h,
12    0fe32h, 00c35h, 03726h    ;    2663
13             .word    04a64h, 01db9h, 0c828h, 08e0fh, 0a1e6h,
14    0eed0h, 03643h, 04ae3h    ;    2671
15             .word    0274bh, 0fb5eh, 0f871h, 00ec9h, 01260h,
16    0ea44h, 0b68dh, 0b4e2h    ;    2679
17             .word    0f23fh, 04472h, 07051h, 04f5fh, 0feb8h,
18    0c441h, 0c4d1h, 0ea2ch    ;    2687
19             .word    00039h, 0ef40h, 0db88h, 0f1cbh, 032beh,
20    06abah, 05bd7h, 008bfh    ;    2695
21             .word    0ae19h, 08e94h, 0bbcch, 0038bh, 027d9h,
22    01aeeh, 0046dh, 00deah    ;    2703
23             .word    03152h, 03d14h, 00ddeh, 0bcf5h, 08eedh,
24    0af97h, 00090h, 0457dh    ;    2711
25             .word    05175h, 023afh, 0f2dfh, 0ed60h, 004b3h,
26    009fch, 0e6a0h, 0bc66h    ;    2719
27             .word    0c346h, 00507h, 05492h, 0747bh, 0452fh,
28    0ecf6h, 0b5b2h, 0bc70h    ;    2727
29             .word    0e897h, 0052ch, 0f777h, 0e721h, 0fd85h,
30    03887h, 0660fh, 04d05h    ;    2735
31             .word    0f4a7h, 09db4h, 08d09h, 0c5f9h, 00fb4h,
32    03248h, 020fah, 0058eh    ;    2743
33             .word    00ac6h, 027ffh, 02efch, 0ff80h, 0b5d2h,
34    09582h, 0c22eh, 016afh    ;    2751
```

157

```
        .word    0562fh, 0573ch, 01da0h, 0e7c9h, 0e26eh,
0f9b3h, 002d9h, 0e50bh    ;    2759
        .word    0c251h, 0d03fh, 01487h, 06166h, 0745fh,
03893h, 0dc16h, 0a56eh    ;    2767
        .word    0b6a6h, 0eb38h, 00a3eh, 0012eh, 0f11eh,
0056dh, 03a57h, 05af0h    ;    2775
        .word    03838h, 0dfdbh, 09407h, 09190h, 0d72fh,
02153h, 03d70h, 0277dh    ;    2783
        .word    00376h, 00450h, 01ed4h, 020dch, 0f4beh,
0b38ch, 0a0f6h, 0d5f3h    ;    2791
        .word    02950h, 06278h, 056afh, 0126dh, 0daa7h,
0d584h, 0f0bdh, 0000dh    ;    2799
        .word    0e778h, 0cb99h, 0ddffh, 02365h, 06a73h,
06ed9h, 0267fh, 0c78dh    ;    2807
        .word    09a17h, 0b567h, 0f215h, 01570h, 00b19h,
0fa55h, 00a8bh, 03796h    ;    2815
        .word    04ec5h, 02504h, 0d00bh, 08f2bh, 09c5bh,
0e8b0h, 03116h, 04810h    ;    2823
        .word    0293eh, 00054h, 0fe27h, 014c2h, 0171dh,
0ecc9h, 0b451h, 0ae40h    ;    2831
        .word    0e9d8h, 03bf7h, 06b8bh, 0521dh, 00439h,
0cae9h, 0ca2bh, 0eaf7h    ;    2839
        .word    0fee9h, 0eb66h, 0d603h, 0eb15h, 02e80h,
06beah, 06188h, 011dah    ;    2847
        .word    0c3f3h, 0b7b6h, 0d2adh, 0de0fh, 00044h,
0ffc3h ;2845
_Dtmf6Start:
        .word    0fff1h    ;2850
_Dtmf5End:
        .word    00026h    ;2851
        .word    0002bh, 0006dh, 00082h, 00073h, 00086h,
0ff26h, 0faf6h, 0f251h    ;    2863
        .word    0f33bh, 013d1h, 032afh, 014d9h, 0edaeh,
0022bh, 01434h, 0f61ah    ;    2871
```

```
        .word   0bb9ch, 098ech, 0cc21h, 022a7h, 058d8h,
04efbh, 015bah, 0fd9ch   ;   2879
        .word   00b1ah, 00c5dh, 0e34ch, 0af3eh, 0b4bfh,
0fcc4h, 04b48h, 05f34h   ;   2887
        .word   02b08h, 0edc3h, 0e722h, 0fd1dh, 0f86ah,
0cc7eh, 0af92h, 0d945h   ;   2895
        .word   02c45h, 062c3h, 04aeah, 0ff85h, 0d27dh,
0dee4h, 0f708h, 0e978h   ;   2903
        .word   0c44bh, 0c8f8h, 00d6bh, 05a6dh, 06b0bh,
028e9h, 0d883h, 0c442h   ;   2911
        .word   0e12ch, 0f653h, 0e20dh, 0cba0h, 0ee20h,
03df3h, 0724dh, 05124h   ;   2919
        .word   0f656h, 0b7f9h, 0c1b3h, 0ebc2h, 0f7aeh,
0e014h, 0dde7h, 0169ch   ;   2927
        .word   05f60h, 069beh, 01ee8h, 0c3c5h, 0a695h,
0cf12h, 0fc93h, 0fd07h   ;   2935
        .word   0e88bh, 0fa6bh, 03b72h, 06914h, 04410h,
0e3ffh, 09e5ch, 0ac14h   ;   2943
        .word   0eb9dh, 01132h, 00566h, 0f8f5h, 01aa4h,
05263h, 057eeh, 00dcch   ;   2951
        .word   0b06bh, 092dbh, 0c859h, 00e1ah, 020cfh,
00b29h, 007c0h, 0300eh   ;   2959
        .word   05245h, 02f48h, 0d520h, 09426h, 0a77eh,
0f2f2h, 0297dh, 0253dh   ;   2967
        .word   00b18h, 01225h, 03867h, 03c88h, 0fd49h,
0aae6h, 09498h, 0d1f3h   ;   2975
        .word   01f06h, 03bb0h, 02253h, 00675h, 01868h,
032f2h, 019bdh, 0cfd8h   ;   2983
        .word   09797h, 0b1c1h, 003f2h, 041f8h, 0403ch,
01413h, 000a0h, 017fch   ;   2991
        .word   0205dh, 0f29fh, 0af70h, 0a14fh, 0e271h,
033d4h, 0537ch, 031b4h   ;   2999
        .word   0fdd2h, 0f895h, 00fe7h, 00603h, 0cfech,
0a50ch, 0c2d7h, 01625h   ;   3007
```

```
         .word    05697h, 05142h, 01398h, 0e865h, 0f329h,
0057dh, 0eebdh, 0bde9h  ;   3015
         .word    0b68ch, 0f46ch, 04522h, 066a3h, 03751h,
0ec11h, 0d641h, 0ed04h  ;   3023
         .word    0f917h, 0dbbdh, 0bb72h, 0d7deh, 026ceh,
0679bh, 05bb9h, 00b99h  ;   3031
         .word    0cc26h, 0cdefh, 0edb0h, 0f1e3h, 0d34ch,
0cc70h, 0047ah, 052cfh  ;   3039
         .word    06f15h, 035a7h, 0dbceh, 0b67dh, 0d1f6h,
0f4b1h, 0ef29h, 0d653h  ;   3047
         .word    0e8a5h, 030f7h, 06d90h, 05989h, 0ff0ch,
0b3f0h, 0b222h, 0e286h  ;   3055
         .word    0fffbh, 0f16ah, 0e532h, 00ca9h, 052fah,
06933h, 0297eh, 0c946h  ;   3063
         .word    09d41h, 0c190h, 0fb74h, 00b95h, 0f8d2h,
0fb6dh, 02dfbh, 05f14h  ;   3071
         .word    0481eh, 0ede6h, 0a002h, 0a063h, 0e16bh,
01756h, 016f5h, 0025dh  ;   3079
         .word    01239h, 04255h, 05242h, 01670h, 0b9bch,
09016h, 0bbf0h, 009c0h  ;   3087
         .word    02c6ah, 019e5h, 00819h, 0221fh, 045b3h,
031fch, 0e135h, 09845h  ;   3095
         .word    0a024h, 0eb2ah, 02cbbh, 03372h, 013ddh,
0091ch, 027afh, 0361dh  ;   3103
         .word    005a1h, 0b591h, 0942bh, 0c9deh, 01c27h,
04538h, 03057h, 007b0h  ;   3111
         .word    008abh, 0235ch, 019a5h, 0db73h, 09ee8h,
0ac8bh, 0fc56h, 0434ch  ;   3119
         .word    04c69h, 01d82h, 0f8fah, 00594h, 01651h,
0f934h, 0bcd9h, 0a5c1h  ;   3127
         .word    0db26h, 02each, 05b74h, 03ed6h, 0ff0fh,
0ea1ch, 0ff84h, 0040ah  ;   3135
         .word    0dce5h, 0b03dh, 0c263h, 00eb2h, 05484h,
05bdfh, 01c8eh, 0e162h  ;   3143
```

160

```
        .word   0e0cfh, 0f91bh, 0f4efh, 0cb5dh, 0b999h,
0ecb5h, 03ffeh, 06ba9h  ;   3151
        .word   044c0h, 0f411h, 0cb32h, 0dd9dh, 0f67ah,
0e7a0h, 0c7e8h, 0d5e0h  ;   3159
        .word   01e5dh, 06452h, 0632fh, 016fah, 0c999h,
0bdb3h, 0e282h, 0f7d8h  ;   3167
        .word   0e250h, 0d274h, 0fbc6h, 0498eh, 07099h,
040cfh, 0e3d2h, 0acf4h  ;   3175
        .word   0c141h, 0f125h, 0fb4fh, 0e5e6h, 0e951h,
02430h, 064a3h, 05ddah  ;   3183
        .word   00971h, 0b324h, 0a421h, 0d653h, 005c4h,
00308h, 0f097h, 0071ch  ;   3191
        .word   043f5h, 0641dh, 03058h, 0d00bh, 09797h,
0b362h, 0f8c5h, 0197bh  ;   3199
        .word   00b35h, 0ffd7h, 02279h, 053d6h, 04a37h,
0f890h, 0a1e8h, 096dch  ;   3207
        .word   0d7b1h, 0192eh, 0258ch, 00d55h, 00b4bh,
03279h, 04a25h, 01d56h  ;   3215
        .word   0c49bh, 09030h, 0b3c1h, 003b4h, 0321bh,
0273bh, 00b1ah, 0135eh  ;   3223
        .word   03632h, 030c0h, 0ed1ch, 0a168h, 09c8ch,
0e314h, 02c92h, 04199h  ;   3231
        .word   0201bh, 00494h, 01681h, 02b7dh, 00c24h,
0c2c0h, 099e1h, 0c328h  ;   3239
        .word   014ffh, 04a59h, 03e65h, 00b64h, 0fb11h,
0127dh, 014d9h, 0e590h  ;   3247
        .word   0aad9h, 0ad67h, 0f468h, 03ffeh, 0559bh,
02840h, 0f4f4h, 0f3cdh  ;   3255
        .word   009a3h, 0fdd1h, 0c949h, 0aa73h, 0d537h,
02949h, 05fffh, 04b6bh  ;   3263
        .word   00668h, 0df7fh, 0ee44h, 0ff72h, 0e7abh,
0bce0h, 0c187h, 006e0h  ;   3271
        .word   0540bh, 06575h, 02956h, 0e08ah, 0d0dfh,
0eb03h, 0f668h, 0d9d2h  ;   3279
```

```
1          .word   0c205h, 0e823h, 03787h, 06b42h, 04eech,
2   0fafbh, 0c1a6h, 0cb30h  ;       3287
3          .word   0ee8fh, 0f0d4h, 0d47ah, 0d62ch, 01401h,
4   05ec0h, 06a2ch, 02356h  ;       3295
5          .word   0cc0fh, 0b0d7h, 0d52bh, 0f9c6h, 0f18fh,
6   0dd60h, 0f6d0h, 03df4h  ;       3303
7          .word   06ef5h, 04a51h, 0ea5bh, 0a5deh, 0b176h,
8   0e9efh, 00650h, 0f6a7h  ;       3311
9          .word   0eed6h, 01949h, 0580dh, 05f26h, 01406h,
10  0b7b2h, 09a7eh, 0ca89h  ;       3319
11         .word   006a2h, 01291h, 0ff3bh, 00497h, 036b0h,
12  05d54h, 037deh, 0d966h  ;       3327
13         .word   093f9h, 0a6a0h, 0f111h, 02170h, 01b2ah,
14  00653h, 01742h, 0436dh  ;       3335
15         .word   046cah, 0021fh, 0ab93h, 09119h, 0cbdfh,
16  01955h, 031f2h, 01b37h  ;       3343
17         .word   00955h, 02260h, 0400fh, 02338h, 0d115h,
18  09385h, 0aca6h, 0fd4bh  ;       3351
19         .word   037feh, 036f6h, 010bfh, 007eah, 02551h,
20  02af1h, 0f5f3h, 0ac6ch  ;       3359
21         .word   09cc7h, 0db44h, 02959h, 0497ch, 02b87h,
22  00138h, 00573h, 01e4ch  ;       3367
23         .word   00e3dh, 0cf92h, 09f00h, 0bbd8h, 00f04h,
24  04efeh, 04b73h, 013cbh  ;       3375
25         .word   0f1b0h, 00141h, 00efch, 0eecfh, 0b684h,
26  0ad3dh, 0ecfbh, 03e74h  ;       3383
27         .word   05fe1h, 0354bh, 0f474h, 0e45eh, 0fa2bh,
28  0fe19h, 0d6e3h, 0b2f4h  ;       3391
29         .word   0d030h, 02119h, 06183h, 0581bh, 00fd1h,
30  0d75ah, 0db9dh, 0f594h  ;       3399
31         .word   0ef4ch, 0c97fh, 0c2b1h, 0fe9fh, 04fdah,
32  06de5h, 03814h, 0e386h  ;       3407
33         .word   0c11ah, 0db12h, 0f4fdh, 0e581h, 0cb4dh,
34  0e2a7h, 02eb7h, 06bc7h  ;       3415
```

```
1              .word    05a01h, 00558h, 0bdd9h, 0bbb6h, 0e552h,
2    0f984h, 0e42dh, 0da5eh   ;   3423
3              .word    00928h, 05020h, 05e82h, 01d36h, 0dfa2h,
4    0e07bh, 0ec84h, 0ea8dh   ;3420
5              .word    0f5d5h, 0f799h, 0f125h, 0f880h, 0fb39h
6    _Dtmf7Start:
7              .word    00038h    ;3433
8    _Dtmf6End:
9              .word    001ddh, 004aeh;3428
10             .word    00423h, 0f983h, 0eea2h, 0fb3dh, 01a77h,
11   026f0h, 009b3h, 0d053h   ;3436
12             .word    0a805h, 0bcb3h, 0079ch, 05b2ch, 07e80h,
13   04e29h, 0ec0eh, 09c3bh   ;   3455
14             .word    09325h, 0cf4ch, 01dc0h, 049fdh, 03ff7h,
15   0156bh, 0f274h, 0ee03h   ;   3463
16             .word    0f918h, 0f91ch, 0e467h, 0cde9h, 0d806h,
17   00ac7h, 04939h, 0613fh   ;   3471
18             .word    035eah, 0dea3h, 097bdh, 094bah, 0d37dh,
19   02674h, 05b99h, 0517dh   ;   3479
20             .word    01223h, 0d457h, 0bfafh, 0d768h, 0febfh,
21   00fb5h, 009aeh, 002e9h   ;   3487
22             .word    01165h, 031ech, 04245h, 0278eh, 0e458h,
23   0a679h, 0a1d8h, 0dd26h   ;   3495
24             .word    02e15h, 065cbh, 05b85h, 00d47h, 0ba70h,
25   09a2bh, 0b98eh, 0fc5eh   ;   3503
26             .word    02e4dh, 034f6h, 01cf4h, 00679h, 00660h,
27   010e0h, 00b46h, 0e930h   ;   3511
28             .word    0c0dfh, 0b9e8h, 0e82fh, 033c8h, 06889h,
29   05b37h, 00e19h, 0b527h   ;   3519
30             .word    08d38h, 0b09bh, 00071h, 04366h, 05492h,
31   02e2eh, 0f69eh, 0dac8h   ;   3527
32             .word    0e1d9h, 0f689h, 0fc4bh, 0eea3h, 0e61eh,
33   0fadch, 02b63h, 053a3h   ;   3535
```

```
        .word    04a5ah, 007c5h, 0b50eh, 08f7bh, 0b320h,
0053fh, 04ef3h, 0656bh   ;   3543
        .word    035e6h, 0e56dh, 0b3c1h, 0b715h, 0e53dh,
01322h, 01ec4h, 01475h   ;   3551
        .word    00a92h, 01609h, 02a7ch, 02828h, 00088h,
0c423h, 0a43ah, 0c24ah   ;   3559
        .word    00cb6h, 05393h, 06a60h, 036b3h, 0da79h,
098e8h, 09b27h, 0dc0eh   ;   3567
        .word    02510h, 04765h, 039ach, 01062h, 0f6deh,
0f800h, 001cah, 0fbbch   ;   3575
        .word    0deb1h, 0c8a7h, 0d7bch, 0117ch, 0526ch,
0655ch, 033e7h, 0da2eh   ;   3583
        .word    0945bh, 0958ah, 0d946h, 02b16h, 05b91h,
04bcdh, 00c03h, 0d5c2h   ;   3591
        .word    0c6dbh, 0df11h, 0fef2h, 006aeh, 0fdc8h,
0fb3ch, 012cfh, 038c8h   ;   3599
        .word    04707h, 0243dh, 0db9dh, 09f7dh, 0a181h,
0e360h, 03448h, 06701h   ;   3607
        .word    056fch, 0070fh, 0b95ah, 09fd6h, 0c2ceh,
001b3h, 02a49h, 02cd2h   ;   3615
        .word    016f4h, 00834h, 0101eh, 01a46h, 00d6dh,
0e35bh, 0b81ah, 0b676h   ;   3623
        .word    0ed81h, 03a73h, 06a59h, 057bfh, 00644h,
0afc1h, 08e42h, 0b5a2h   ;   3631
        .word    00682h, 044afh, 04f41h, 02829h, 0f713h,
0e205h, 0eaf7h, 0fb59h   ;   3639
        .word    0f765h, 0e3e7h, 0dd8ch, 0fb35h, 032c5h,
05935h, 04926h, 001ffh   ;   3647
        .word    0b08bh, 08f0bh, 0b727h, 00b58h, 05258h,
061e7h, 02df3h, 0e287h   ;   3655
        .word    0b84fh, 0c081h, 0ec72h, 01078h, 01649h,
00bd9h, 0086fh, 01cc7h   ;   3663
        .word    032d5h, 02c73h, 0fc01h, 0bb47h, 0a018h,
0c3bfh, 012d0h, 05b26h   ;   3671
```

```
            .word      06a36h, 0301dh, 0d43ch, 0981eh, 0a265h,
0e121h, 02547h, 0413ah  ;     3679
            .word      02fdah, 00de7h, 0fcd2h, 001f7h, 008eah,
0f9beh, 0d676h, 0c06fh  ;     3687
            .word      0d675h, 01731h, 058a1h, 06794h, 02fa0h,
0d366h, 091f1h, 099dch  ;     3695
            .word      0dfa4h, 02ea9h, 0598dh, 044f9h, 007a5h,
0d8d6h, 0d06ah, 0e7c9h  ;     3703
            .word      0fec2h, 0fe87h, 0f3ach, 0f64ah, 01715h,
0419fh, 04d5bh, 02231h  ;     3711
            .word      0d2c5h, 09911h, 0a143h, 0e652h, 037f6h,
066efh, 0505ah, 00003h  ;     3719
            .word      0b92ch, 0a728h, 0cc17h, 005ebh, 02647h,
0244eh, 0118dh, 00b1eh  ;     3727
            .word      01955h, 022d5h, 00f88h, 0dcc6h, 0afe5h,
0b418h, 0f09dh, 04057h  ;     3735
            .word      06d22h, 0533ah, 0fd7fh, 0aa54h, 09107h,
0bda9h, 00b7ah, 04305h  ;     3743
            .word      0489eh, 02167h, 0f6f7h, 0e9cfh, 0f3deh,
0fe7bh, 0f172h, 0d979h  ;     3751
            .word      0d728h, 0fcb5h, 03a22h, 05fa3h, 04948h,
0fbd4h, 0aa5dh, 08f55h  ;     3759
            .word      0be01h, 0118bh, 0532eh, 05d30h, 02673h,
0e0d6h, 0be61h, 0c950h  ;     3767
            .word      0f1aeh, 00db9h, 00d4ch, 00390h, 0083ah,
0246dh, 03c00h, 02f5ch  ;     3775
            .word      0f6f8h, 0b40eh, 09c50h, 0c722h, 01852h,
05bedh, 06779h, 02922h  ;     3783
            .word      0cfa4h, 09ba8h, 0a92eh, 0e938h, 025e8h,
03a51h, 02843h, 00b69h  ;     3791
            .word      00287h, 00b97h, 00ed1h, 0f5ebh, 0cdf4h,
0b9edh, 0d79ch, 01db8h  ;     3799
            .word      05d7fh, 065f1h, 027c5h, 0cc17h, 0902ch,
09dfah, 0e820h, 0349ch  ;     3807
```

165

```
        .word   056feh, 03ed8h, 004ach, 0dd1ch, 0da65h,
0eee0h, 0fe1ah, 0f619h  ;   3815
        .word   0e942h, 0f28fh, 01b5eh, 048a4h, 04f6dh,
01dc4h, 0ccdfh, 09705h  ;   3823
        .word   0a550h, 0ec2eh, 03b66h, 06566h, 047f9h,
0fa46h, 0bb65h, 0adb0h  ;   3831
        .word   0d49dh, 008a6h, 020b5h, 01b75h, 00c90h,
00f3fh, 02269h, 029abh  ;   3839
        .word   00e26h, 0d520h, 0a8cah, 0b2f8h, 0f541h,
04487h, 06d82h, 04ec2h  ;   3847
        .word   0f5b7h, 0a586h, 09381h, 0c2deh, 010b4h,
0434dh, 0412ch, 01d76h  ;   3855
        .word   0fa3ch, 0f2ech, 0fde5h, 0ff7ah, 0eb54h,
0cfedh, 0d157h, 0fed8h  ;   3863
        .word   0418dh, 0668ah, 04870h, 0f4d8h, 0a1fch,
08d96h, 0c2fah, 0168dh  ;   3871
        .word   054fah, 058d6h, 01f81h, 0df99h, 0c497h,
0d22eh, 0f5d3h, 0086ah  ;   3879
        .word   002e8h, 0fc5ch, 009aeh, 02d34h, 04585h,
032c6h, 0f182h, 0ac73h  ;   3887
        .word   09a70h, 0ca2ch, 01cb9h, 05e29h, 062e4h,
02135h, 0cc02h, 09f7eh  ;   3895
        .word   0b1b8h, 0ef58h, 02549h, 03381h, 02078h,
00addh, 00a76h, 015c4h  ;   3903
        .word   013d9h, 0f1f5h, 0c443h, 0b3a4h, 0d925h,
02494h, 06397h, 066cbh  ;   3911
        .word   0221ah, 0c344h, 08dcch, 0a37ch, 0ed97h,
035e7h, 05312h, 037dch  ;   3919
        .word   0022dh, 0e161h, 0e302h, 0f577h, 0fb85h,
0ecfch, 0e032h, 0f0afh  ;   3927
        .word   0218bh, 05141h, 053ech, 019b0h, 0c4f7h,
09259h, 0a6e7h, 0f24dh  ;   3935
        .word   04078h, 06488h, 0423ch, 0f685h, 0bdd1h,
0b5f4h, 0ddb9h, 00a15h  ;   3943
```

```
1           .word    019dbh, 0126dh, 00849h, 013f9h, 02b68h,
2    0300ch, 00d46h, 0ce46h   ;    3951
3           .word    0a277h, 0b413h, 0faf8h, 04827h, 06dadh,
4    046c7h, 0ece8h, 0a3e9h   ;    3959
5           .word    0959fh, 0ca2bh, 0154dh, 0403eh, 03b31h,
6    01790h, 0fd16h, 0fc18h   ;    3967
7           .word    005c8h, 000afh, 0e2dbh, 0c5f3h, 0cc17h,
8    001ddh, 04877h, 06a7ch   ;    3975
9           .word    04592h, 0ed27h, 09d4ah, 08ecbh, 0c907h,
10   01d0fh, 054adh, 05248h   ;    3983
11          .word    01b18h, 0e116h, 0cc8ch, 0dbdeh, 0f949h,
12   0032dh, 0f99ch, 0f5aah   ;    3991
13          .word    00b5fh, 034f5h, 04b4ch, 03212h, 0ec27h,
14   0ab52h, 0a8d7h, 0e647h   ;    3999
15          .word    01ad9h, 01532h, 00973h, 011d7h, 00c3eh,
16   0087ch, 009bah, 000ach   ;    4007
17          .word    0014ch, 0ffd2h, 0fe6bh, 0feffh, 0f722h,
18   0f4e9h, 0f2ach, 0f82ah   ;4004
19   _Dtmf8Start:
20          .word    0ffd6h   ;4012
21   _Dtmf7End:
22          .word    00218h, 008b2h, 009d9h, 0f8e9h, 0edceh,
23   00641h, 01d9bh ;4013
24          .word    005ebh, 0ce7fh, 0a805h, 0c6c9h, 01dc9h,
25   06860h, 0722eh, 02c1dh   ;    4031
26          .word    0d298h, 0abach, 0c816h, 0ff1ch, 01617h,
27   00b8eh, 00227h, 019bch   ;    4039
28          .word    03e03h, 03aa4h, 0fdc3h, 0ac0fh, 08e19h,
29   0c585h, 0208eh, 05bcbh   ;    4047
30          .word    04ea0h, 004deh, 0c808h, 0c42eh, 0e459h,
31   0ff8fh, 0f723h, 0e775h   ;    4055
32          .word    0fd33h, 0365ah, 063fah, 04c91h, 0f5b0h,
33   0a16eh, 09301h, 0d577h   ;    4063
```

```
        .word    02ad2h, 052fbh, 03b18h, 0031fh, 0e55ch,
0f262h, 000d9h, 0f1f0h  ;   4071
        .word    0ce21h, 0c695h, 0fbb8h, 04a4ch, 071f3h,
046b4h, 0e435h, 09692h  ;   4079
        .word    09abeh, 0e267h, 02845h, 03bb0h, 01f43h,
0037dh, 00816h, 0198ch  ;   4087
        .word    00dfdh, 0d97fh, 0aa68h, 0b6bfh, 0023ah,
05506h, 06fb0h, 03583h  ;   4095
        .word    0d576h, 0a11ah, 0b6dch, 0f444h, 01d72h,
01ae6h, 008d6h, 01100h  ;   4103
        .word    031c8h, 03e11h, 01415h, 0c54ch, 0955ah,
0b61bh, 00d80h, 056d2h  ;   4111
        .word    05eceh, 01fffh, 0d586h, 0bd9ah, 0d910h,
0fd7bh, 000c3h, 0ef47h  ;   4119
        .word    0f470h, 020fch, 055f5h, 05473h, 00cbah,
0b177h, 08c24h, 0bc18h  ;   4127
        .word    013c1h, 04f0ah, 047c2h, 00fefh, 0e38ah,
0e49ch, 0f99dh, 0f9d1h  ;   4135
        .word    0dcc5h, 0c8bch, 0eae0h, 035d0h, 06e72h,
059abh, 00038h, 0a76fh  ;   4143
        .word    0916bh, 0cc72h, 01b6fh, 04028h, 02d7eh,
007dfh, 0fe2ch, 00ed3h  ;   4151
        .word    01147h, 0eb72h, 0b86fh, 0b10dh, 0ec55h,
042b5h, 07071h, 04abdh  ;   4159
        .word    0ec34h, 0a530h, 0a780h, 0e1a7h, 01997h,
0244ah, 01114h, 00a86h  ;   4167
        .word    02315h, 03998h, 0217eh, 0db89h, 09d78h,
0a776h, 0f495h, 04754h  ;   4175
        .word    066edh, 037d4h, 0e3d5h, 0b7c5h, 0c964h,
0f36eh, 007dfh, 0fa99h  ;   4183
        .word    0f36bh, 011d0h, 045d2h, 058f8h, 02419h,
0c820h, 08defh, 0a85dh  ;   4191
        .word    0fce9h, 046b3h, 054dch, 021c2h, 0e816h,
0da5dh, 0eeedh, 0fd56h  ;   4199
```

```
1           .word    0eb4eh, 0d165h, 0e014h, 01f69h, 062e0h,
2   06615h, 019bdh, 0b9bah  ;    4207
3           .word    08d1eh, 0b483h, 007dbh, 03eddh, 03aedh,
4   01299h, 0fa1ch, 0043bh  ;    4215
5           .word    01005h, 0f9f7h, 0c8aeh, 0b015h, 0d92bh,
6   02db7h, 06d79h, 06058h  ;    4223
7           .word    008e3h, 0b188h, 09c4dh, 0cc19h, 0103ah,
8   02ab4h, 01b45h, 009d8h  ;    4231
9           .word    014c3h, 02f79h, 02893h, 0f00fh, 0abb1h,
10  09e54h, 0dd37h, 034dah  ;    4239
11          .word    067e2h, 04af1h, 0f7b3h, 0bab9h, 0baeeh,
12  0e64eh, 009ech, 00779h  ;    4247
13          .word    0f935h, 0073ah, 034beh, 05485h, 035cdh,
14  0e241h, 099deh, 09c26h  ;    4255
15          .word    0e625h, 037f7h, 05a6bh, 035c4h, 0f145h,
16  0d264h, 0e14ah, 0f8fdh  ;    4263
17          .word    0f6a8h, 0dbech, 0da9eh, 00bc4h, 05211h,
18  06d3ah, 034b0h, 0d11ch  ;    4271
19          .word    08ff7h, 0a216h, 0f0e5h, 036a4h, 04452h,
20  01f2dh, 0f9d4h, 0f829h  ;    4279
21          .word    008ech, 002c2h, 0da9ah, 0b75ah, 0cb10h,
22  015b1h, 060e5h, 06caah  ;    4287
23          .word    025b4h, 0c44ah, 0963bh, 0b789h, 0ff28h,
24  02c76h, 02760h, 00e40h  ;    4295
25          .word    00ba5h, 022c6h, 02a22h, 00118h, 0bd73h,
26  09c7ch, 0c745h, 01fdbh  ;    4303
27          .word    062f5h, 05eb7h, 01236h, 0c276h, 0af11h,
28  0d447h, 00420h, 010d0h  ;    4311
29          .word    0015ch, 0012bh, 023ceh, 04b01h, 040d7h,
30  0fab1h, 0a9f5h, 093a6h  ;    4319
31          .word    0cfbdh, 027abh, 05aaah, 048e0h, 0028fh,
32  0d041h, 0d38bh, 0ef4ch  ;    4327
33          .word    0fcfbh, 0e8e8h, 0dbe4h, 0fbe3h, 03c99h,
34  067eah, 047a6h, 0ec7ah  ;    4335
```

```
         .word    09ad9h, 093eah, 0da45h, 02ad2h, 04be2h,
030d0h, 0ffc0h, 0ef0ch   ;    4343
         .word    0feach, 0056eh, 0e9c9h, 0c0c1h, 0c137h,
00079h, 05270h, 0735ah   ;    4351
         .word    0409fh, 0dd75h, 09813h, 0a526h, 0ec50h,
028d4h, 0320ch, 0179bh   ;    4359
         .word    006f3h, 015d4h, 02602h, 00e52h, 0d080h,
0a08fh, 0b5f4h, 007e5h   ;    4367
         .word    05854h, 06b3dh, 02c50h, 0d20bh, 0a8b7h,
0c35ah, 0f966h, 015a9h   ;    4375
         .word    00bf1h, 0014ah, 0165eh, 03e22h, 0469dh,
010ach, 0bce6h, 091d7h   ;    4383
         .word    0ba21h, 0111fh, 055f8h, 05733h, 015e7h,
0d6b5h, 0c92bh, 0e36ch   ;    4391
         .word    0fd86h, 0f582h, 0e26bh, 0f17ch, 02924h,
060bfh, 057d7h, 0076ah   ;    4399
         .word    0aad2h, 08c8fh, 0c307h, 0180dh, 04af3h,
03e43h, 00aaeh, 0ea52h   ;    4407
         .word    0f1c6h, 0024eh, 0f62ch, 0cf8eh, 0c009h,
0ec54h, 03d67h, 0728ah   ;    4415
         .word    055fbh, 0f74bh, 0a146h, 096e4h, 0d4dah,
01dbah, 038f6h, 0238bh   ;    4423
         .word    007d5h, 009f4h, 01d75h, 016a2h, 0e4fch,
0abeeh, 0ab65h, 0f13fh   ;    4431
         .word    04786h, 06ec0h, 043c3h, 0e792h, 0a84dh,
0b128h, 0e9d5h, 01735h   ;    4439
         .word    01834h, 00787h, 00d6ch, 02f71h, 044dbh,
0218bh, 0d2c1h, 096c8h   ;    4447
         .word    0a821h, 0f9b8h, 048b6h, 060a9h, 02f5ch,
0e2e6h, 0c127h, 0d5fdh   ;    4455
         .word    0f76bh, 0fe9dh, 0ed53h, 0ec9eh, 016e3h,
05054h, 05d88h, 0203eh   ;    4463
         .word    0c013h, 08c41h, 0ae65h, 00272h, 04498h,
04b91h, 01abfh, 0eb71h   ;    4471
```

```
1           .word    0e697h, 0f9cdh, 0fd47h, 0dfedh, 0c59fh,
2  0ddf8h, 026e4h, 06a9bh   ;    4479
3           .word    06731h, 013fah, 0b35bh, 08ff4h, 0bd7eh,
4  00ce4h, 03b20h, 03083h   ;    4487
5           .word    00d3ch, 00183h, 011cah, 01824h, 0f614h,
6  0bd14h, 0a8afh, 0dc99h   ;    4495
7           .word    032adh, 06bdeh, 0594eh, 000b1h, 0b0c2h,
8  0a56eh, 0d664h, 01087h   ;    4503
9           .word    020deh, 01044h, 00886h, 02035h, 03d14h,
10 02db0h, 0ea5fh, 0a30fh   ;    4511
11          .word    09cdch, 0e2deh, 03910h, 0650ch, 043f4h,
12 0f36bh, 0bf8ch, 0c767h   ;    4519
13          .word    0ed84h, 00421h, 0f8aeh, 0ee0bh, 007eeh,
14 03e90h, 05d2dh, 03452h   ;    4527
15          .word    0da2fh, 09451h, 09each, 0ec3ah, 0394fh,
16 0538dh, 02c02h, 0f19eh   ;    4535
17          .word    0dd99h, 0eeb0h, 0fdcdh, 0ecd9h, 0ce65h,
18 0d49ah, 0109bh, 05ac7h   ;    4543
19          .word    06f6dh, 02f54h, 0c984h, 08f16h, 0a962h,
20 0f7fch, 03635h, 03c0ah   ;    4551
21          .word    018f0h, 0fdceh, 00527h, 01491h, 001e7h,
22 0cf59h, 0aca2h, 0c9aeh   ;    4559
23          .word    01b55h, 06480h, 067dch, 01ab8h, 0bf89h,
24 09c05h, 0c218h, 00519h   ;    4567
25          .word    025fch, 01c35h, 00a23h, 013ffh, 03194h,
26 032b3h, 0fef0h, 0b659h   ;    4575
27          .word    0a2fbh, 0dde6h, 01f1bh, 02394h, 00dfeh,
28 00e40h, 009b5h, 00520h   ;4572
29          .word    00ba8h, 00480h;4580
30 _Dtmf9Start:
31          .word    0feb6h   ; 4582
32 _Dtmf8End:
```

```
        .word   0f855h, 0eb84h, 0ed67h, 01d9eh, 05161h;4580
        .word   02f6ch, 0e3a9h, 0d160h, 0e1c0h, 0eb5ch,
0d883h, 0bf55h, 0e811h  ;       4599
        .word   03a7dh, 072c3h, 05796h, 0f688h, 0b08ch,
0b5feh, 0ee21h, 01159h  ;       4607
        .word   00894h, 000ddh, 01f28h, 04cc3h, 0413fh,
0f0fbh, 09d7bh, 09728h  ;       4615
        .word   0e407h, 03284h, 04297h, 01cfdh, 0fca0h,
006a2h, 01398h, 0f328h  ;       4623
        .word   0b925h, 0a985h, 0e8c2h, 04162h, 0681ch,
039dch, 0e70dh, 0c602h  ;       4631
        .word   0de11h, 0f786h, 0ed44h, 0d8c4h, 0f539h,
03f49h, 0703dh, 0498ah  ;       4639
        .word   0e471h, 09d18h, 0abd2h, 0f1e1h, 01ec0h,
01617h, 0067eh, 01974h  ;       4647
        .word   03c6ch, 03063h, 0e56bh, 09b66h, 09e60h,
0ee23h, 03b6ch, 04a16h  ;       4655
        .word   01c7bh, 0f26eh, 0f9f7h, 00958h, 0f30bh,
0c3eah, 0ba56h, 0fa2fh  ;       4663
        .word   04ea8h, 06e97h, 036f6h, 0dc8fh, 0b917h,
0d5d6h, 0f9f0h, 0f8c3h  ;       4671
        .word   0e6b2h, 0fecah, 0401ch, 067cah, 03b32h,
0d5cbh, 0936dh, 0aa9ah  ;       4679
        .word   0f805h, 02a3fh, 02186h, 009a5h, 012e0h,
02e80h, 022c5h, 0dd7fh  ;       4687
        .word   09b8eh, 0a7a4h, 0fae9h, 0475fh, 0519ah,
01abch, 0e748h, 0ead6h  ;       4695
        .word   0fedch, 0f231h, 0cc7eh, 0c704h, 00644h,
057cfh, 070ach, 030c9h  ;       4703
        .word   0d1bbh, 0ae24h, 0d105h, 0fe3ah, 003e8h,
0f424h, 0043dh, 03bc3h  ;       4711
        .word   05c48h, 02d92h, 0cc33h, 09073h, 0b060h,
0023fh, 0342bh, 02a02h  ;       4719
```

```
            .word   008d4h, 0071eh, 0209fh, 01651h, 0d9bfh,
    0a17bh, 0b2feh, 00820h  ;   4727
            .word   052ddh, 058ffh, 0175bh, 0dbc7h, 0dd69h,
    0f64ch, 0f48dh, 0d644h  ;   4735
            .word   0d33ah, 0103bh, 05d26h, 06eb5h, 026d3h,
    0c4dah, 0a297h, 0cb22h  ;   4743
            .word   0047ah, 010a7h, 0ff16h, 00886h, 035beh,
    04fb4h, 01fddh, 0c1cah  ;   4751
            .word   08e04h, 0b4a7h, 00adch, 03f88h, 031c3h,
    006fch, 0fd4fh, 012b7h  ;   4759
            .word   00c33h, 0d8d9h, 0aa02h, 0c235h, 017e8h,
    05dedh, 05b59h, 0125bh  ;   4767
            .word   0d0eeh, 0d0ddh, 0efedh, 0f80dh, 0e0cfh,
    0dec9h, 017ceh, 0603fh  ;   4775
            .word   06a64h, 01ad1h, 0b94bh, 09ac9h, 0cb20h,
    00b70h, 01be2h, 00912h  ;   4783
            .word   00886h, 02b8eh, 0409dh, 01242h, 0baceh,
    08f7eh, 0bea3h, 01622h  ;   4791
            .word   049a8h, 03789h, 0037eh, 0f1c9h, 00435h,
    00517h, 0db9eh, 0b5d1h  ;   4799
            .word   0d13ch, 024eeh, 069a3h, 05e57h, 00b15h,
    0c415h, 0c4a9h, 0ebd5h  ;   4807
            .word   0fdf8h, 0ee06h, 0eaceh, 01c1dh, 05c21h,
    05e7ch, 00cf5h, 0ac95h  ;   4815
            .word   0935eh, 0cd59h, 01679h, 02a20h, 01225h,
    007b2h, 0215eh, 0315ch  ;   4823
            .word   00564h, 0b71ah, 095b4h, 0cbddh, 024c3h,
    0555ah, 03ceeh, 0fc89h  ;   4831
            .word   0e2f2h, 0f771h, 0fe5dh, 0e08ch, 0c1bdh,
    0dddeh, 02efah, 06d66h  ;   4839
            .word   05b01h, 0008bh, 0b87fh, 0bad7h, 0e9d1h,
    006cbh, 0fa89h, 0f537h  ;   4847
            .word   01dc7h, 054a6h, 05208h, 0fff8h, 0a3f0h,
    091ffh, 0d3f7h, 020a7h  ;   4855
```

```
        .word   033bdh, 0189eh, 00474h, 014f2h, 024d7h,
0fe69h, 0b9dch, 09f20h  ;   4863
        .word   0d7e6h, 03107h, 05d63h, 03ca9h, 0f51ah,
0d70ch, 0eb26h, 0fa9dh  ;   4871
        .word   0e623h, 0cc42h, 0e9ebh, 0387bh, 0707dh,
054f1h, 0f609h, 0ab11h  ;   4879
        .word   0b0efh, 0ea76h, 00f87h, 00724h, 0fd33h,
01c87h, 04ab7h, 04305h  ;   4887
        .word   0f34ah, 09e64h, 0957ch, 0dd15h, 02ae3h,
03df3h, 01b48h, 0fcadh  ;   4895
        .word   00820h, 016dah, 0f83bh, 0bd50h, 0aa43h,
0e6f5h, 03f6bh, 0685ah  ;   4903
        .word   03d32h, 0eb8ch, 0c964h, 0df17h, 0f91fh,
0ef06h, 0d839h, 0f3f1h  ;   4911
        .word   03d76h, 0718ah, 04e9ch, 0e877h, 09d5ch,
0a98ah, 0eea3h, 01a88h  ;   4919
        .word   01312h, 00430h, 01709h, 03cc1h, 03397h,
0e8edh, 09c2ah, 09acbh  ;   4927
        .word   0e8c2h, 03751h, 048e3h, 01e4bh, 0f519h,
0fa7dh, 00b25h, 0f535h  ;   4935
        .word   0c3f4h, 0b868h, 0f638h, 04bb6h, 06e4eh,
03a6ah, 0e194h, 0bcbah  ;   4943
        .word   0d74fh, 0f986h, 0f775h, 0e4c2h, 0fbfeh,
03d5ah, 067d1h, 04011h  ;   4951
        .word   0dc8fh, 0952ah, 0a852h, 0f573h, 02717h,
01fb9h, 008d5h, 011adh  ;   4959
        .word   02f7fh, 025c2h, 0e086h, 09b0bh, 0a28ch,
0f54eh, 04349h, 0513bh  ;   4967
        .word   01df4h, 0eaf2h, 0ed36h, 00120h, 0f443h,
0ccadh, 0c4efh, 002d1h  ;   4975
        .word   055c1h, 0717fh, 033efh, 0d4d8h, 0af48h,
0cedeh, 0fc83h, 00346h  ;   4983
        .word   0f240h, 00407h, 03c19h, 05f43h, 03231h,
0ce3fh, 08fadh, 0aaf5h  ;   4991
```

```
        .word      0fc71h, 03155h, 027f6h, 00a21h, 0091eh,
0211fh, 0193eh, 0dbabh   ;   4999
        .word      0a200h, 0aff8h, 00342h, 050e4h, 057f1h,
019e2h, 0dfaah, 0dec8h   ;   5007
        .word      0f7aeh, 0f521h, 0d487h, 0d000h, 00cc4h,
05b64h, 06f2ch, 02b80h   ;   5015
        .word      0caafh, 0a4c6h, 0cbech, 002e0h, 00fd1h,
0fe6dh, 0070eh, 034a6h   ;   5023
        .word      0502ah, 0236ch, 0c54eh, 08e2ah, 0b0cch,
006d3h, 03d7bh, 0311fh   ;   5031
        .word      0081dh, 0fe56h, 013ach, 00e7bh, 0db45h,
0aa52h, 0be2ah, 0125eh   ;   5039
        .word      05b71h, 05c16h, 013fah, 0d3e3h, 0d244h,
0eebfh, 0f82eh, 0e013h   ;   5047
        .word      0db85h, 013bdh, 05e06h, 06c9ah, 02026h,
0bdf5h, 09aceh, 0c998h   ;   5055
        .word      009f4h, 01a39h, 008dah, 0085eh, 02ccah,
043cch, 01599h, 0bd57h   ;   5063
        .word      08deah, 0ba03h, 01407h, 048aah, 037cah,
005b2h, 0f354h, 0071dh   ;   5071
        .word      0076fh, 0dce2h, 0b3d6h, 0cc42h, 020cfh,
0651fh, 05e6dh, 00f87h   ;   5079
        .word      0c7e5h, 0c5a6h, 0ebddh, 0fda3h, 0ebfbh,
0e868h, 0194fh, 05bf2h   ;   5087
        .word      06244h, 012ceh, 0b102h, 09329h, 0ca81h,
012c0h, 02743h, 0110ch   ;   5095
        .word      007f4h, 0214dh, 03377h, 009c4h, 0b9dbh,
094cdh, 0c689h, 01ef0h   ;   5103
        .word      05217h, 03c18h, 0feaeh, 0e653h, 0f925h,
00073h, 0e160h, 0c071h   ;   5111
        .word      0db62h, 02b72h, 06b47h, 05d99h, 0066ah,
0bb10h, 0baebh, 0e8f9h   ;   5119
        .word      00490h, 0f8a7h, 0f335h, 01c10h, 05503h,
05511h, 004a1h, 0a755h   ;   5127
```

```
            .word       092b8h, 0d1aah, 01c91h, 0329ah, 018aah,
00361h, 0151fh, 0251ah   ;    5135
            .word       0ff45h, 0b9f4h, 09cb3h, 0d314h, 02dddh,
05e09h, 0406ah, 0f8e4h   ;    5143
            .word       0d829h, 0ec18h, 0fc90h, 0ee4ah, 0e1a8h,
00262h, 0084fh, 01492h   ;5140
            .word       0182dh, 0fc70h, 0d299h, 0ccdfh, 0eadfh
_Dtmf0Start:
            .word       0fef9h     ; 5153
_Dtmf9End:
            .word       0f7d1h, 0e98fh;5154
            .word       0fad1h, 033e9h, 06438h, 05688h, 005e7h,
0b10eh, 0a030h, 0dd55h   ;5156
            .word       031b4h, 05a8ch, 035d0h, 0e3f6h, 0b2f9h,
0c124h, 0eff2h, 00f9ah   ;    5175
            .word       00b6ah, 002d2h, 011a4h, 02e53h, 02f42h,
0fbfeh, 0b490h, 09af7h   ;    5183
            .word       0d31ah, 0313eh, 06cdbh, 052a9h, 0f32bh,
0a265h, 09fd9h, 0e4a9h   ;    5191
            .word       02cbfh, 04347h, 02963h, 0086eh, 00341h,
00ca9h, 00152h, 0dadch   ;    5199
            .word       0be53h, 0d9aah, 0276eh, 06867h, 05d07h,
003efh, 0a4f0h, 08d96h   ;    5207
            .word       0cc34h, 02686h, 055b1h, 03d32h, 0fa4bh,
0cf70h, 0d64eh, 0f089h   ;    5215
            .word       0fbd6h, 0f0abh, 0f1d0h, 01709h, 04712h,
04d70h, 00f1eh, 0b903h   ;    5223
            .word       093b7h, 0c311h, 0223bh, 06549h, 057b3h,
0035ch, 0b423h, 0a9c2h   ;    5231
            .word       0db28h, 014f5h, 026b3h, 01715h, 00e35h,
01aa3h, 0275ah, 00ddah   ;    5239
            .word       0d27fh, 0a862h, 0c1f4h, 01724h, 06371h,
06728h, 0152dh, 0b253h   ;    5247
```

```
1            .word    09010h, 0c2f2h, 01853h, 048abh, 03b5ah,
2    00b68h, 0ed54h, 0f34dh   ;   5255
3            .word    0fc95h, 0ef0ch, 0d475h, 0d746h, 00da0h,
4    05139h, 0629bh, 02472h   ;   5263
5            .word    0c14dh, 08cb7h, 0b3feh, 00f83h, 0572ch,
6    057a3h, 011f0h, 0cb91h   ;   5271
7            .word    0bed9h, 0df46h, 0031eh, 00958h, 00029h,
8    00b49h, 02d33h, 043b6h   ;   5279
9            .word    0235ah, 0d68ch, 09c1ch, 0af2ch, 00474h,
10   05893h, 06ae1h, 02368h   ;   5287
11           .word    0c1ebh, 09831h, 0bc5dh, 0065dh, 03525h,
12   02e2bh, 01144h, 00775h   ;   5295
13           .word    01165h, 00f71h, 0ea97h, 0bc06h, 0ba31h,
14   0fa9dh, 050fbh, 071b1h   ;   5303
15           .word    0386fh, 0cf9bh, 08db5h, 0a6e4h, 0fcbfh,
16   04577h, 04f59h, 01d57h   ;   5311
17           .word    0e60eh, 0da2fh, 0ed3ah, 0f9b0h, 0ee06h,
18   0e302h, 0fe40h, 03787h   ;   5319
19           .word    05b3eh, 03a17h, 0e1edh, 09877h, 09eaah,
20   0f029h, 04878h, 0655ch   ;   5327
21           .word    02ff8h, 0d8c4h, 0aeb4h, 0c623h, 0fba5h,
22   01b1eh, 015a6h, 00bf5h   ;   5335
23           .word    0176bh, 02eafh, 02813h, 0f0e2h, 0afb7h,
24   0a4d7h, 0e761h, 042b8h   ;   5343
25           .word    070a7h, 04460h, 0dd00h, 09591h, 0a26ch,
26   0edfah, 0349ch, 041efh   ;   5351
27           .word    02035h, 0fd19h, 0f8d0h, 00353h, 0f917h,
28   0d839h, 0c4f6h, 0e7a2h   ;   5359
29           .word    03383h, 069b6h, 05043h, 0f211h, 09b19h,
30   0944bh, 0df9bh, 037b6h   ;   5367
31           .word    05d74h, 03720h, 0ee69h, 0c95dh, 0d5adh,
32   0f5eeh, 0030fh, 0f8bah   ;   5375
33           .word    0fc0eh, 01e44h, 04634h, 04224h, 00027h,
34   0aef7h, 09731h, 0d563h   ;   5383
```

```
        .word    03367h, 06a06h, 04e7bh, 0ef81h, 0a648h,
0a8efh, 0e3edh, 01fb9h  ;   5391
        .word    02c27h, 0185ah, 00bdah, 015afh, 01ea4h,
002c3h, 0cbc2h, 0ac55h  ;   5399
        .word    0d0dah, 02771h, 06adbh, 05d53h, 001e8h,
0a39dh, 09010h, 0d0d3h  ;   5407
        .word    02704h, 04fcfh, 0377fh, 0017ch, 0e58ah,
0ee03h, 0fa01h, 0ef3ah  ;   5415
        .word    0d9cbh, 0e2edh, 01a0fh, 056e1h, 05b52h,
01258h, 0b258h, 08c6bh  ;   5423
        .word    0c256h, 02137h, 05f6fh, 05163h, 0017eh,
0bf2bh, 0bb9eh, 0e2cdh  ;   5431
        .word    00b1dh, 01040h, 005e6h, 01049h, 02e6bh,
03ccah, 0153fh, 0c97ah  ;   5439
        .word    09c3eh, 0bce8h, 016c6h, 06439h, 065cch,
011beh, 0b170h, 092edh  ;   5447
        .word    0c61dh, 014d6h, 03cd0h, 02dcch, 00d49h,
001a4h, 00a74h, 0071ah  ;   5455
        .word    0e400h, 0bedbh, 0c7cfh, 00c13h, 059e0h,
06b82h, 025cfh, 0bdd5h  ;   5463
        .word    08bd6h, 0b2cfh, 00c0ah, 04e81h, 04bfeh,
0106eh, 0db29h, 0d4b6h  ;   5471
        .word    0ec17h, 0fd24h, 0f366h, 0ec44h, 008b4h,
03c62h, 05675h, 02affh  ;   5479
        .word    0d331h, 094bah, 0aa3ah, 00419h, 057b6h,
06702h, 020e5h, 0c6e2h  ;   5487
        .word    0a5a3h, 0c847h, 004b4h, 0225bh, 01973h,
00d3fh, 015e8h, 02817h  ;   5495
        .word    01b91h, 0e51eh, 0aebdh, 0b0ech, 0f9edh,
051d5h, 07178h, 03481h  ;   5503
        .word    0cb64h, 08f1bh, 0aaabh, 0fcech, 03df2h,
04401h, 01988h, 0f458h  ;   5511
        .word    0f342h, 0fdf3h, 0f64fh, 0d910h, 0cd89h,
0f713h, 03fach, 06807h  ;   5519
```

```
        .word   04024h, 0df26h, 09489h, 09ef6h, 0f252h,
04598h, 05e07h, 02b26h  ;   5527
        .word   0dfabh, 0c0aah, 0d556h, 0fab6h, 0087dh,
0fe83h, 00308h, 02313h  ;   5535
        .word   04401h, 035c1h, 0efa9h, 0a6b0h, 09eabh,
0e6d4h, 04338h, 06e19h  ;   5543
        .word   04061h, 0ddadh, 09d6ah, 0ac99h, 0f020h,
02a15h, 03141h, 017d9h  ;   5551
        .word   0086ah, 0109bh, 01588h, 0f8f5h, 0c71ch,
0b2c0h, 0e1dah, 037dbh  ;   5559
        .word   07031h, 05308h, 0efa2h, 099b5h, 09639h,
0dfadh, 032cdh, 05254h  ;   5567
        .word   02f03h, 0f382h, 0db42h, 0e834h, 0f839h,
0f17fh, 0e0d5h, 0efcfh  ;   5575
        .word   024d8h, 057c8h, 04each, 0ff39h, 0a84dh,
092b0h, 0d41ah, 031e6h  ;   5583
        .word   06404h, 04878h, 0f382h, 0b535h, 0bb5bh,
0ea9eh, 01323h, 0169ah  ;   5591
        .word   00a68h, 01204h, 02b8eh, 03216h, 0063dh,
0bfd9h, 09e27h, 0cb55h  ;   5599
        .word   0278fh, 06a80h, 05b12h, 00035h, 0a616h,
0968ah, 0d4f0h, 0221fh  ;   5607
        .word   0421fh, 02bbch, 0069bh, 0fac6h, 003deh,
0007ah, 0e0c2h, 0c322h  ;   5615
        .word   0d4a2h, 01aa3h, 060a5h, 061f1h, 01197h,
0afb9h, 08bb9h, 0c246h  ;   5623
        .word   0203ch, 05819h, 04766h, 00442h, 0d05ah,
0d0e9h, 0ed79h, 00088h  ;   5631
        .word   0f8c5h, 0f48ah, 01147h, 03f20h, 04de4h,
019f7h, 0c3b1h, 09423h  ;   5639
        .word   0ba2dh, 015b0h, 05f72h, 06006h, 00f68h,
0b9f2h, 0a43ch, 0d0cdh  ;   5647
        .word   00fffh, 029cfh, 01d1eh, 00d0ah, 013c4h,
02213h, 0110fh, 0dbcbh  ;   5655
```

```
        .word   0acd6h, 0bbb4h, 00a1eh, 05d4dh, 06c80h,
0241ah, 0be07h, 08ca2h  ;   5663
        .word   0b668h, 00cbch, 046eeh, 0423ch, 010edh,
0ec68h, 0ec00h, 0f996h  ;   5671
        .word   0f442h, 0db84h, 0d83bh, 00511h, 04894h,
063e1h, 03030h, 0ce46h  ;   5679
        .word   08f40h, 0aa1ch, 002e1h, 05269h, 05e8ah,
01dbah, 0d0aeh, 0b9dfh  ;   5687
        .word   0d711h, 00102h, 00f07h, 0054bh, 008a6h,
0253ch, 03e69h, 027d1h  ;   5695
        .word   0e192h, 0a2b3h, 0a887h, 0f778h, 051e4h,
06fa2h, 03072h, 0cb28h  ;   5703
        .word   095ach, 0b282h, 0fe4fh, 03364h, 0335ch,
0151eh, 0ff1fh, 0ff4bh  ;   5711
        .word   0fed8h, 0f786h, 0f5f6h, 0fbd2h, 00f77h,
02373h, 013d4h, 0dfb1h  ;   5719
        .word   0b542h, 0bb92h, 0fb68h, 04cb5h, 06f37h,
04600h, 0e6e8h, 09844h  ;   5727
        .word   0966fh, 0de84h, 037d7h, 06924h, 04e8ah,
0f8a9h, 0b246h, 0a54dh  ;   5735
        .word   0d3f7h, 01923h, 03d90h, 0363ch, 01425h,
0f9d2h, 0f666h, 0fa90h  ;   5743
        .word   0f5e5h, 0e3fah, 0dacdh, 0f090h, 020a0h,
04815h, 04016h, 001a9h  ;   5751
        .word   0b4fch, 09539h, 0c044h, 01874h, 06165h,
069feh, 02278h, 0c043h  ;   5759
        .word   08dddh, 0a9afh, 0fbd1h, 047c0h, 05d78h,
034deh, 0f405h, 0cc9dh  ;   5767
        .word   0d169h, 0f39ah, 00fbeh, 013f9h, 00c3bh,
00c92h, 01ab2h, 02306h  ;   5775
        .word   00fceh, 0e126h, 0b6bch, 0baf1h, 0f523h,
04160h, 0672eh, 0429ah  ;   5783
        .word   0e86eh, 099fbh, 090c1h, 0d25ch, 02b1eh,
06445h, 0547eh, 0033bh  ;5780
```

```
1           .word    0b57ah, 09f24h, 0ca9bh, 0133ah, 0400eh,
2    03e9bh, 01d33h
3    _DtmfStarStart:
4           .word    0fe38h   ;5795
5    _Dtmf0End:
6           .if    SaveRomSpace
7           .word    0
8           .else
9           .word    0f6a4h, 0faf8h, 0facdh, 0eb93h, 0df4bh,
10   0ee96h, 01a1eh, 04351h  ;5796
11          .word    04168h, 00bc0h, 0c053h, 097ddh, 0b844h,
12   00ac9h, 058b7h, 06c34h  ;5804
13          .word    02eafh, 0cbbdh, 08dc4h, 0a0a9h, 0efc5h,
14   03ed8h, 05f16h, 03cfbh  ;  5823
15          .word    0f904h, 0ccdch, 0cc2dh, 0ed4dh, 00df8h,
16   01650h, 00f98h, 00c04h  ;  5831
17          .word    0179eh, 021b3h, 012fbh, 0e894h, 0bc8dh,
18   0b84eh, 0ead0h, 038c7h  ;  5839
19          .word    06702h, 04d48h, 0f774h, 0a165h, 08ce9h,
20   0c6b2h, 01fcdh, 060b2h  ;  5847
21          .word    05b85h, 01026h, 0bdf7h, 09da7h, 0c1ffh,
22   00953h, 03d36h, 042c2h  ;  5855
23          .word    0232ch, 00125h, 0f38bh, 0f8c9h, 0fba2h,
24   0ef6bh, 0e2e0h, 0ebc3h  ;  5863
25          .word    012b7h, 03da2h, 044edh, 0158ah, 0c9d8h,
26   09a4fh, 0af36h, 0fe21h  ;  5871
27          .word    0512ah, 06e54h, 039f9h, 0d77dh, 09221h,
28   0990ch, 0e21eh, 0379ah  ;  5879
29          .word    05f04h, 04511h, 00217h, 0ce60h, 0c89ch,
30   0e72eh, 00c16h, 018bah  ;  5887
31          .word    01277h, 00c6fh, 01401h, 01f8ch, 015bbh,
32   0f021h, 0c344h, 0b7feh  ;  5895
33          .word    0e265h, 02ca2h, 0612fh, 05251h, 00318h,
34   0ab33h, 08ae1h, 0bad4h  ;  5903
```

```
        .word   01549h, 05bd3h, 06154h, 01db9h, 0c738h,
09db5h, 0b7a2h, 0ff10h  ;   5911
        .word   03acdh, 04758h, 0294fh, 00244h, 0f161h,
0f52ch, 0fb16h, 0f31dh  ;   5919
        .word   0e5d1h, 0ea60h, 00bffh, 037a0h, 044f9h,
01d50h, 0d48ah, 09ea6h  ;   5927
        .word   0aa21h, 0f290h, 045c5h, 06e4eh, 04435h,
0e3ach, 097ach, 0936fh  ;   5935
        .word   0d7b4h, 02c74h, 05d21h, 04d7fh, 00912h,
0d141h, 0c483h, 0e08ah  ;   5943
        .word   00a23h, 01afch, 016f8h, 00d88h, 0115eh,
01caeh, 016cdh, 0f753h  ;   5951
        .word   0caa2h, 0b8e2h, 0db16h, 02322h, 05d9ch,
05769h, 00e65h, 0b5aah  ;   5959
        .word   08c0fh, 0b1f1h, 00987h, 055f0h, 06783h,
0294fh, 0cefch, 09e08h  ;   5967
        .word   0afa9h, 0f447h, 0352fh, 04939h, 02f01h,
00641h, 0f044h, 0f165h  ;   5975
        .word   0fa7dh, 0f67eh, 0ea1fh, 0ea5eh, 0068dh,
0311dh, 0442fh, 02576h  ;   5983
        .word   0df37h, 0a39fh, 0a598h, 0e820h, 03bf0h,
06bfch, 04de6h, 0f14dh  ;   5991
        .word   09f63h, 090f6h, 0cc89h, 02253h, 05c38h,
05517h, 012bbh, 0d43ah  ;   5999
        .word   0bfeeh, 0d901h, 0043eh, 01b88h, 01aa1h,
00f10h, 00e9ah, 0199fh  ;   6007
        .word   0176ch, 0fc5eh, 0d0d4h, 0b960h, 0d4c4h,
0197dh, 0582fh, 05cffh  ;   6015
        .word   01bf1h, 0c07dh, 08d1eh, 0a7d0h, 0fcc0h,
04f75h, 06bd3h, 03538h  ;   6023
        .word   0d952h, 09e54h, 0a686h, 0ea56h, 030fbh,
04bcfh, 0361eh, 00aa0h  ;   6031
        .word   0eebbh, 0ee18h, 0f803h, 0f848h, 0ecceh,
0e9edh, 001bbh, 02a57h  ;   6039
```

```
        .word   04219h, 02a9ah, 0e921h, 0a90eh, 0a156h,
0ddd9h, 032b5h, 06aa6h  ;   6047
        .word   05866h, 0ff9fh, 0a553h, 08ac0h, 0beaah,
01858h, 05737h, 059a2h  ;   6055
        .word   01d86h, 0d9aah, 0bf34h, 0d140h, 0006ch,
01d7ch, 01e0ch, 0126ah  ;   6063
        .word   00d07h, 016c3h, 0178bh, 00195h, 0d839h,
0bc92h, 0cfc9h, 00e33h  ;   6071
        .word   04ff2h, 05e57h, 026e6h, 0cbd0h, 08e93h,
0a0a4h, 0f16ah, 044bdh  ;   6079
        .word   06b97h, 041d9h, 0e550h, 0a155h, 09fd4h,
0dfd2h, 02a21h, 04d09h  ;   6087
        .word   03d21h, 01050h, 0efd6h, 0eaf3h, 0f5fah,
0fa3dh, 0f128h, 0ebb4h  ;   6095
        .word   0fe0bh, 02499h, 03fc7h, 02fe9h, 0f354h,
0b188h, 09f9ch, 0d18fh  ;   6103
        .word   026a1h, 0666eh, 05f64h, 00e5eh, 0af15h,
08a88h, 0b58fh, 00af7h  ;   6111
        .word   052c6h, 05e98h, 02811h, 0e0b7h, 0bd1ah,
0cbb8h, 0f935h, 01cbdh  ;   6119
        .word   021c0h, 01505h, 00cd7h, 0134bh, 016e4h,
00521h, 0deceh, 0bf88h  ;   6127
        .word   0caf7h, 004fbh, 04905h, 060aeh, 03143h,
0d6aah, 092cdh, 0990dh  ;   6135
        .word   0e422h, 03c29h, 06bb9h, 04d3fh, 0f217h,
0a69bh, 09c5eh, 0d34ch  ;   6143
        .word   02088h, 04c07h, 0423ch, 01692h, 0f143h,
0e814h, 0f31bh, 0fb69h  ;   6151
        .word   0f4a3h, 0edbdh, 0fb01h, 01e6eh, 03ca5h,
03396h, 0fc1ah, 0b7c0h  ;   6159
        .word   09d50h, 0c7c5h, 01cedh, 063ach, 0673bh,
01b7bh, 0b8c9h, 089dfh  ;   6167
        .word   0a9c6h, 0ff55h, 04b49h, 0608ch, 03255h,
0e811h, 0bdf7h, 0c56ah  ;   6175
```

183

```
        .word   0f324h, 01acbh, 0243eh, 0194fh, 00c4ah,
00fedh, 01472h, 007a5h   ;    6183
        .word   0e58bh, 0c48eh, 0c921h, 0fabfh, 03f5fh,
06026h, 039bah, 0e2e4h   ;    6191
        .word   099a9h, 09443h, 0d721h, 0307bh, 0678ch,
0532dh, 0fe35h, 0adc0h   ;    6199
        .word   0989ah, 0cabah, 01a8fh, 04befh, 04913h,
01eaeh, 0f435h, 0e61ch   ;    6207
        .word   0efebh, 0fb6eh, 0f826h, 0efebh, 0f848h,
01809h, 037d2h, 0360fh   ;    6215
        .word   005b5h, 0c0adh, 09de9h, 0bfb4h, 010aah,
05abfh, 068e8h, 0296ah   ;    6223
        .word   0c612h, 08aa3h, 0a183h, 0f291h, 0452ch,
063b5h, 03b48h, 0f1c1h   ;    6231
        .word   0bec1h, 0c007h, 0eb38h, 01845h, 0276dh,
01cbdh, 00e06h, 00d45h   ;    6239
        .word   01348h, 00a6dh, 0ebd4h, 0c92fh, 0c6d3h,
0f319h, 03673h, 05df2h   ;    6247
        .word   0437bh, 0f09eh, 0a06fh, 0914fh, 0cca3h,
025d9h, 065c4h, 05d68h   ;    6255
        .word   00aebh, 0b312h, 09415h, 0bd5dh, 00ea4h,
047c6h, 04c11h, 024ebh   ;    6263
        .word   0f654h, 0e3efh, 0ec33h, 0facch, 0fc4fh,
0f456h, 0f887h, 0133ah   ;    6271
        .word   032d6h, 03556h, 00bd8h, 0d751h, 0cd66h,
0e4fbh, 0ef15h, 0f372h   ;    6279
        .word   0fc01h, 00365h, 00a0bh, 011d9h, 008b0h,
0ebc3h, 0e302h, 0fc03h   ;6276
        .endif  ; SaveRomSpace
_DtmfPoundStart:
        .word   00147h   ; 6284
_DtmfStarEnd:
        .if SaveRomSpace
        .word   0
```

```
1               .else
2               .word   0dc49h, 0c066h, 0e181h, 0374bh, 074fah,
3       059cbh, 0fab1h ;6284
4               .word   0b014h, 0b9a7h, 0f82dh, 023dbh, 01dcdh,
5       00989h, 012e4h, 027bfh  ;6292
6               .word   015a5h, 0d2cch, 09db6h, 0ba59h, 01538h,
7       05c50h, 0505fh, 0f9b4h  ;  6311
8               .word   0b1f0h, 0b80eh, 0e82dh, 0059fh, 000ddh,
9       0028bh, 02a97h, 050c3h  ;  6319
10              .word   0382ch, 0e1e7h, 09be4h, 0af41h, 008c3h,
11      052f3h, 051a1h, 01089h  ;  6327
12              .word   0d8f7h, 0dc66h, 0f377h, 0f1c5h, 0dee2h,
13      0ec62h, 02e65h, 066b0h  ;  6335
14              .word   05143h, 0ee61h, 09834h, 09e6bh, 0ee63h,
15      03707h, 03d4eh, 0123ch  ;  6343
16              .word   0f39ah, 0fbc5h, 0005eh, 0dfc9h, 0bb07h,
17      0ce2eh, 02042h, 068b3h  ;  6351
18              .word   05d11h, 0fef0h, 0a50eh, 0a224h, 0e60bh,
19      02279h, 02a0dh, 0136ah  ;  6359
20              .word   012ceh, 0269ah, 01cedh, 0e173h, 0a67ah,
21      0b53bh, 00c1bh, 05d76h  ;  6367
22              .word   05f1fh, 00db2h, 0bb95h, 0b3ffh, 0e2a3h,
23      0086fh, 008a1h, 002e5h  ;  6375
24              .word   02151h, 04929h, 03d98h, 0ee89h, 09ee5h,
25      0a3c5h, 0f79ah, 048e2h  ;  6383
26              .word   0546ch, 01860h, 0d828h, 0d281h, 0ebc4h,
27      0f376h, 0e330h, 0e6fbh  ;  6391
28              .word   020e9h, 05ee5h, 05922h, 0ff0fh, 0a184h,
29      0981dh, 0e25ch, 03349h  ;  6399
30              .word   043ebh, 01bdeh, 0f5c2h, 0f768h, 00178h,
31      0e936h, 0c2a1h, 0c98bh  ;  6407
32              .word   012a9h, 0624ah, 06764h, 0100bh, 0ad25h,
33      09a32h, 0d8c8h, 01e20h  ;  6415
```

```
        .word   02e8bh, 017e1h, 00ed0h, 02005h, 01fd5h,
0ece6h, 0ae91h, 0ae1ch  ;   6423
        .word   0fc92h, 05463h, 06640h, 01e0eh, 0c2b7h,
0ad84h, 0d9cfh, 0070ah  ;   6431
        .word   00debh, 004ffh, 01a49h, 042aeh, 041cfh,
0fba2h, 0a88fh, 09dcbh  ;   6439
        .word   0e71fh, 040c6h, 05baeh, 02472h, 0dc54h,
0cb64h, 0e55bh, 0f4a7h  ;   6447
        .word   0e8abh, 0e55fh, 014edh, 056dfh, 05de3h,
01033h, 0acb1h, 09329h  ;   6455
        .word   0d570h, 02ad4h, 04881h, 0251fh, 0f6d3h,
0f1a7h, 0fee9h, 0ef2dh  ;   6463
        .word   0c9e3h, 0c5b5h, 00619h, 058bfh, 06c43h,
0221eh, 0ba31h, 0964ah  ;   6471
        .word   0cb9fh, 01845h, 0335ah, 01dc3h, 00ddch,
019a8h, 0205ch, 0f710h  ;   6479
        .word   0b6f1h, 0aa7ch, 0ed7eh, 04885h, 06904h,
02b6dh, 0cc82h, 0a8c9h  ;   6487
        .word   0cec2h, 002adh, 01178h, 00789h, 01442h,
03a5dh, 04417h, 008e6h  ;   6495
        .word   0b2cch, 09967h, 0d9b2h, 03699h, 05dfch,
030dah, 0e273h, 0c62ch  ;   6503
        .word   0df43h, 0f569h, 0ee88h, 0e629h, 00ba2h,
04d1fh, 06040h, 01ee5h  ;   6511
        .word   0b9dch, 091a4h, 0c7ffh, 0205dh, 04a3fh,
02e4ch, 0fa5ch, 0ec6bh  ;   6519
        .word   0fad8h, 0f3ceh, 0d160h, 0c358h, 0fa1bh,
0505ah, 07101h, 03147h  ;   6527
        .word   0c62bh, 094c8h, 0c076h, 00ec9h, 033f8h,
0237bh, 00bdbh, 011bdh  ;   6535
        .word   01dddh, 0fe20h, 0c067h, 0a890h, 0e120h,
03f72h, 06ba6h, 039e9h  ;   6543
        .word   0d856h, 0a691h, 0c47dh, 0fe36h, 0174bh,
00c58h, 01089h, 03237h  ;   6551
```

```
1           .word     042edh,  014c8h,  0befch,  09741h,  0cc0ah,
2   02bbeh, 05fbdh,  03e96h   ;     6559
3           .word     0ee70h,  0c389h,  0d786h,  0f50eh,  0f42eh,
4   0e912h, 00328h,  04168h   ;     6567
5           .word     060b1h,  02b3dh,  0c66eh,  08f55h,  0ba1eh,
6   016cdh, 04b42h,  0387bh   ;     6575
7           .word     000ffh,  0e7f0h,  0f5eeh,  0f688h,  0d8f4h,
8   0c417h, 0ee08h,  04385h   ;     6583
9           .word     07114h,  0409fh,  0d644h,  09414h,  0b276h,
10  004eah, 03576h,  02a48h   ;     6591
11          .word     00e4ah,  00cf4h,  01adah,  0057ch,  0ca89h,
12  0a916h, 0d5ceh,  031f5h   ;     6599
13          .word     06b66h,  048e0h,  0e695h,  0a667h,  0bac9h,
14  0f619h, 017a2h,  01123h   ;     6607
15          .word     00d25h,  02997h,  04113h,  01ee3h,  0cc15h,
16  096bah, 0beech,  01eaeh   ;     6615
17          .word     05e7ch,  0496dh,  0f7c6h,  0c28bh,  0cf00h,
18  0f08eh, 0f8d4h,  0ec2eh   ;     6623
19          .word     0fd2fh,  03787h,  05f00h,  0386fh,  0d622h,
20  09309h, 0af12h,  00917h   ;     6631
21          .word     049d5h,  0413dh,  0088ch,  0e543h,  0ef57h,
22  0f7fch, 0e0bdh,  0c7e4h   ;     6639
23          .word     0e4f6h,  0363bh,  06fe5h,  04dadh,  0e4edh,
24  097fbh, 0a951h,  0f76bh   ;     6647
25          .word     03150h,  02f14h,  00f55h,  006a6h,  0158eh,
26  009c3h, 0d4dfh,  0ab5ah   ;     6655
27          .word     0cb15h,  0261eh,  06ae4h,  05598h,  0f4d2h,
28  0a7c0h, 0b0a2h,  0ee01h   ;     6663
29          .word     019a9h,  016fbh,  00d7fh,  022feh,  03da7h,
30  0272ch, 0d89ah,  09b9bh   ;     6671
31          .word     0b587h,  010bah,  05b15h,  053d7h,  004b7h,
32  0c228h, 0c6b8h,  0eb57h   ;     6679
33          .word     0fca4h,  0f295h,  0f9b2h,  02d98h,  059bch,
34  0418bh, 0e536h,  0988bh   ;     6687
```

```
        .word    0a64ah, 0fad6h, 04418h, 04654h, 01069h,
0e4beh, 0e905h, 0f79ah  ;   6695
        .word    0e82eh, 0cd24h, 0ddb3h, 02879h, 06b58h,
05a91h, 0f7ceh, 09e14h  ;   6703
        .word    09effh, 0ea92h, 02ef0h, 03695h, 0152eh,
00368h, 00f8bh, 00c2ah  ;   6711
        .word    0dee5h, 0b040h, 0c337h, 01864h, 064bah,
05e8ah, 0053eh, 0ae09h  ;   6719
        .word    0a7dfh, 0e352h, 01864h, 01d2fh, 00efah,
01c5bh, 037b7h, 02bfdh  ;   6727
        .word    0e5e4h, 0a197h, 0ab71h, 001a4h, 05457h,
05ae9h, 01305h, 0c893h  ;   6735
        .word    0c079h, 0e5a8h, 0fe1fh, 0f6afh, 0f77dh,
02315h, 0557eh, 04a8eh  ;   6743
        .word    0f3fah, 09e0fh, 09c3ah, 0ec7ah, 03dbeh,
04d0fh, 0199dh, 0e413h  ;   6751
        .word    0e1c2h, 0f3edh, 0ed14h, 0d30fh, 0d995h,
01cbah, 063ddh, 06141h  ;   6759
        .word    007eeh, 0a81bh, 09933h, 0dd11h, 02a67h,
03bb6h, 01ad1h, 001f0h  ;   6767
        .word    00964h, 00d8fh, 0e844h, 0b735h, 0bd2dh,
0097fh, 05bb9h, 065d3h  ;   6775
        .word    01667h, 0b5fbh, 0a012h, 0d7dah, 0149eh,
021a6h, 0122ah, 016c6h  ;   6783
        .word    03146h, 02f01h, 0f22fh, 0a961h, 0a5ech,
0f4c3h, 04d1eh, 061bch  ;   6791
        .word    01ff4h, 0cd69h, 0b9e2h, 0dc4ah, 0fe83h,
0fe46h, 0f7b2h, 01a68h  ;   6799
        .word    04cdah, 04e8ah, 00385h, 0a7c4h, 0969ch,
0dea3h, 0372fh, 05218h  ;   6807
        .word    02552h, 0e9bbh, 0db91h, 0f071h, 0f15ah,
0d96eh, 0d6dbh, 00f88h  ;   6815
        .word    05c84h, 068bfh, 01979h, 0b223h, 09330h,
0cfcfh, 02056h, 03e28h  ;   6823
                                188
```

```
1              .word    021abh, 0ff75h, 00244h, 00ba6h, 0efd6h,
2       0bee1h, 0b77eh, 0fc1fh  ;    6831
3              .word    05451h, 06c73h, 0273bh, 0c259h, 09e80h,
4       0ce55h, 00fa8h, 01467h  ;    6839
5              .word    00000h   ;   6841
6              .endif   ; SaveRomSpace
7       _DtmfPoundEnd:
8              .word    00000h
9       /*             DTMF.h   */
10      #ifndef   __DTMF__
11      #define   __DTMF__
12      /***** DTMF detector stuff *************************/
13      #define   LightenUp            False
14      #define   UsingAllFilters      False
15      #define   ENERGY_SCALER_SHIFT  6
16      #define   SAMPLE_BITS          16
17      #define   ENERGY_LIMIT_HIGH    83886080
18      #define   ENERGY_LIMIT_LOW     10485760
19      #define   GAIN_REDUCTION_STEP  31838
20      #define   GAIN_INCREASE_STEP   4
21      #define   LPFCOEF              8483
22      #define   INPUTTHRESHOLD       200000/* 32 bit num
23      representing energy */
24      #define   MinStateDuration     10/* how consecutive chunks
25      for statemachine recognition */
26      #define   SilenceTimeout       50/* how many consec chunks of
27      silence to trigger add'l explicit msg */
28      #define   DIAL_TONE            'd'
29      #define   RING                 'r'
30      #define   BUSY                 'b'
31      #define   SILENCE              's'
32      #define   UNDETERMINED         '?'
33      #if LightenUp
34             #define   FILTERTHRESHOLD 19000
```

```
            #define    FILTERDIFFERENCE 29000/* lower = fewer
false +, more false   */
#else
            #define    FILTERTHRESHOLD 28400
            #define    FILTERDIFFERENCE 16000/* lower = fewer
false +, more false   */
#endif /* LightenUp */
typedef   void (*CallBackRoutinePtr)( DtmfState state,
ushort prevDuration );
typedef struct {
            DtmfState       state;
            DtmfState       previous_state;
            DtmfState       previous_previous_state;
            ushort              stateDuration;
            ushort              prevDuration;
            SpeechPtr       inputPtr;
            short           inputGain;
            short           inputDiffState;
            short           inputIntState;
#if UsingAllFilters
            BiQuadPtr       filterPtr[12];
            long            filterEnergyLPFstates[12];
#else
            BiQuadPtr       filterPtr[7];
            long            filterEnergyLPFstates[7];
#endif
            short           LPFcoef;
            long            inputThreshold;
            long            inputEnergyLPFstate;
            dB                  prevInputLevel;
            short               filterThresholdCoef;
            short               filterDifferenceCoef;

DtmfState       dtmfArray[4][4];
```

While this source code and this description of the hardware requirements of the best mode of this invention are provided to give a complete description of the function and use of the invention, it is, of course, contemplated that the inventive concept may be implemented through other techniques in other embodiments and the detail steps of this invention as described in its current best mode of operation may also change without changing the essential inventive concept of the method, which is the remote calibration of telephone headphone, to provide improved audio quality, in a reliable process, easy to employ by both the customer-user and the customer service representative. Also, while the current best mode use of this invention is in the calibration of a telephone headset, specifically a Jabra 1000, alternative uses of this invention can also be applied to calibrate other telephone communications equipment. All such other uses of the method of this invention should be considered covered by the scope of the claims.

We claim:

1. A method for calibrating telephone equipment to a telephone base unit and to the noise environment, which noise environment includes an environment noise level, in which they exist, comprising the steps of:

(A) receiving a calibration request;

(B) initializing the telephone equipment, said telephone equipment being configured for use by a user in telephone communications and said telephone equipment having audio transmission level circuitry, noise reduction circuitry and a capacity for storing and modifying audio parameters;

(C) taking control of the telephone equipment;

(D) providing an adjustment for the telephone equipment transmission level;

(E) storing said adjustment for the telephone equipment transmission level;

(F) providing an adjustment to compensate for the environment noise level, comprising the steps of:

(i) testing if the noise level is correct;

(ii) entering a command to set the noise cancellation function to a high degree of noise cancellation, if the noise level is high;

(iii) entering a command to set the noise cancellation function to a low degree of noise cancellation, if the noise level is low;

(iv) entering a command to set the noise cancellation function to a medium degree of noise cancellation, if the noise level is neither high nor low;

(v) determining whether all noise level calibrations have been completed;

(vi) storing all calibration adjustments if all calibrations have been completed; and (vii) returning telephone equipment control to the user if all calibrations have been completed and all adjustments have been stored;

(G) storing said environment noise level compensation adjustment;

(H) providing an adjustment for the tuning of the telephone equipment audio parameters;

(I) storing said telephone equipment audio parameter adjustments; and (J) returning control of the telephone equipment to the user.

* * * * *